(12) United States Patent
Kitakado et al.

(10) Patent No.: US 6,295,378 B1
(45) Date of Patent: Sep. 25, 2001

(54) HANDWRITING STROKE INFORMATION ENCODER WHICH ENCODES HANDWRITING STROKE INFORMATION BY SAMPLING

(75) Inventors: Jun Kitakado, Kanagawa; Tetsuji Sawai, Aichi, both of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/389,008

(22) Filed: Sep. 2, 1999

Related U.S. Application Data

(63) Continuation of application No. 08/807,904, filed on Feb. 27, 1997, now abandoned.

(30) Foreign Application Priority Data

Feb. 29, 1996 (JP) .................................................... 8-71444
Mar. 28, 1996 (JP) .................................................. 8-103958

(51) Int. Cl.[7] ....................................................... G06K 9/46
(52) U.S. Cl. ............................ 382/238; 382/202; 345/17
(58) Field of Search .................................. 382/238, 116, 382/160, 181, 187, 188–190, 228, 197, 189, 202, 253, 201, 232, 186; 345/156, 173, 174, 179, 180, 192, 442, 144, 469, 468, 947, 440, 443, 16–17, 141, 146, 104; 172/18; 178/18.01, 18.03, 19.01

(56) References Cited

U.S. PATENT DOCUMENTS

| | | | |
|---|---|---|---|
| 4,199,815 | 4/1980 | Kyte et al. | 345/469 |
| 4,254,468 | 3/1981 | Craig | 345/469 |
| 4,298,945 | 11/1981 | Kyte et al. | 345/469 |
| 4,597,101 | 6/1986 | Kishimoto et al. | 382/253 |
| 4,653,107 | * 3/1987 | Shojima et al. | 382/189 |
| 5,473,742 | * 12/1995 | Polakov et al. | 345/442 |
| 5,528,003 | 6/1996 | Bodin et al. | 172/18 |
| 5,995,081 | * 11/1999 | Kato | 345/156 |

FOREIGN PATENT DOCUMENTS

| | | |
|---|---|---|
| 56-123082 | 9/1981 | (JP) . |
| 3-154122 | 7/1991 | (JP) . |
| 4-54519 | 2/1992 | (JP) . |
| 6-289993 | 10/1994 | (JP) . |

* cited by examiner

Primary Examiner—Leo Boudreau
Assistant Examiner—Ishrat Sherali
(74) Attorney, Agent, or Firm—Armstrong, Westerman, Hattori, McLeland & Naughton, LLP

(57) ABSTRACT

A handwriting stroke information encoder capable of reducing costs resulting from communication and storage of encoded data by reducing the amount of the encoded data. The handwriting stroke information encoder is provided with a processor which calculates forecast coordinates from sampled coordinates to be encoded and coordinates sampled before the sampling of the sampled coordinates, and an encoder which encodes the differences between the forecast coordinates and sampled coordinates of an actual input. The coordinates are forecast as; e.g., coordinates that are in line with the extension of vector, which are connecting together the previously-sampled coordinates and coordinates sampled prior to the previously-sampled coordinates, and are spaced the magnitude of the vector away from the previously-sampled coordinates.

10 Claims, 38 Drawing Sheets

| Zone code No | Difference between quadrant numbers | Difference between zone numbers | Code length (Bit) | Zone codes (The leftmost numeral designates LSB) |
|---|---|---|---|---|
| 1 | 0 | 0 | 2 | 01 |
| 2 | 3 | 0 | 4 | 0001 |
| 3 | 1 | 0 | 4 | 1111 |
| 4 | 0 | 3 | 4 | 0010 |
| 5 | 0 | 1 | 4 | 1011 |
| 6 | 0 | -3 | 4 | 1110 |
| 7 | 3 | 3 | 5 | 10011 |
| 8 | 0 | -1 | 5 | 00111 |
| 9 | 3 | -1 | 6 | 100101 |
| 10 | 3 | -3 | 6 | 100001 |
| 11 | 2 | 0 | 6 | 001101 |
| 12 | 1 | 3 | 6 | 101001 |
| 13 | 1 | 1 | 6 | 100011 |
| 14 | 1 | -3 | 6 | 101011 |
| 15 | 0 | 4 | 6 | 100010 |
| 16 | 0 | 2 | 6 | 000011 |
| 17 | 0 | -2 | 6 | 000001 |
| 18 | 3 | 2 | 7 | 1000001 |
| 19 | 3 | 1 | 7 | 1001001 |
| 20 | 2 | 3 | 7 | 1010100 |
| 21 | 1 | 2 | 7 | 1010001 |
| 22 | 1 | -1 | 7 | 0011001 |
| 23 | 1 | -2 | 7 | 1001000 |
| 24 | 0 | 6 | 7 | 0000001 |
| 25 | 0 | -4 | 7 | 0011000 |
| 26 | 0 | -6 | 7 | 1010000 |
| 27 | 3 | 6 | 8 | 10101010 |
| 28 | 2 | 1 | 8 | 10000001 |
| 29 | 2 | -1 | 8 | 10101011 |
| 30 | 2 | -3 | 8 | 00000001 |
| PLI | | | 3 | 110 |
| EFZ | | | 6 | 000010 |
| NULL | | | 8 | 00000000 |

PLI: Lift-of-pen Indicator
EFZ: Escape from a zone

Related Art

Fig. 3

| Zone code No | Zone numbers | Quadrant numbers | Code length (Bit) | Zone codes (The leftmost numeral designates LSB) |
|---|---|---|---|---|
| 1 | 1 | 1 | 4 | 0001 |
| 2 | 1 | 2 | 4 | 1111 |
| 3 | 1 | 3 | 4 | 0010 |
| 4 | 1 | 4 | 4 | 1011 |
| 5 | 2 | 1 | 4 | 1110 |
| 6 | 2 | 2 | 5 | 10011 |
| 7 | 2 | 3 | 5 | 00111 |
| 8 | 2 | 4 | 6 | 100101 |
| 9 | 3 | 1 | 6 | 100001 |
| 10 | 3 | 2 | 6 | 001101 |
| 11 | 3 | 3 | 6 | 101001 |
| 12 | 3 | 4 | 6 | 100011 |
| 13 | 4 | 1 | 6 | 101011 |
| 14 | 4 | 2 | 6 | 100010 |
| 15 | 4 | 3 | 6 | 000011 |
| 16 | 4 | 4 | 6 | 000001 |
| 17 | 5 | 1 | 7 | 1000001 |
| 18 | 5 | 2 | 7 | 1001001 |
| 19 | 5 | 3 | 7 | 1010100 |
| 20 | 5 | 4 | 7 | 1010001 |
| 21 | 6 | 1 | 7 | 0011001 |
| 22 | 6 | 2 | 7 | 1001000 |
| 23 | 6 | 3 | 7 | 0000001 |
| 24 | 6 | 4 | 7 | 0011000 |
| 25 | 7 | 1 | 7 | 1010000 |
| 26 | 7 | 2 | 8 | 10101010 |
| 27 | 7 | 3 | 8 | 10000001 |
| 28 | 7 | 4 | 8 | 10101011 |
| ZERO | | | 2 | 01 |
| PLI | | | 3 | 110 |
| EFZ | | | 6 | 000010 |
| NULL | | | 8 | 00000000 |

ZERO: Difference of zero
PLI: Lift-of-pen Indicator
EFZ: Escape from a zone

Fig. 9

| Attribute data | X1 | Y1 | ZC(2) | A(2) | EZC(3) | A(3) | ...

... | EZC(N) | A(N) | PLI |

X1: A code of an X-coordinate of the first sampled coordinates
Y1: A code of a Y-coordinate of the first sampled coordinates
ZC(I): A code resulting from encoding of the difference between the I-th sampled coordinates and I-1-th coordinates
EZC(I): A code resulting from encoding of the difference between the I-th sampled coordinates and the forecast coordinates
A(I): A code of an address within an I-th zone
PLI: A code of lift-of-pen information

Fig.11

X1: A code of an X-coordinate of the first sampled coordinates
Y1: A code of a Y-coordinate of the first sampled coordinates
ZC(I): A code resulting from encoding of the difference between the I-th sampled coordinates and I-1-th coordinates
A(I): A code of an address within an I-th zone
PLI: A code of lift-of-pen information

HANDWRITING STROKE INFORMATION ENCODER WHICH ENCODES HANDWRITING STROKE INFORMATION BY SAMPLING

This application is a continuation of application Ser. No. 08/807,904 filed on Feb. 27, 1997 now abandoned.

BACKGROUND OF THE INVENTION

1. Field of the Invention

The present invention relates to an encoder which compresses handwriting stroke information, and a decoder for decoding the data encoded by the encoder. More particularly, the present invention relates to an encoder capable of being used with a handwritten data processing terminal.

2. Description of the Related Art

A zone encoding scheme (refer to JT-T150 recommendations) is now known as an encoding scheme for compressing handwriting stroke information by sampling it.

Handwritten data is characterized such that a sampling range becomes comparatively narrow when letters are written, and in spite of an increase in angular variations the range of one handwriting stroke becomes larger when a map or drawing is drawn.

The zone encoding scheme is a prediction encoding method utilizing these characteristics of the handwritten data.

More specifically, as provided in FIG. 1, a coordinate plane is set by defining the point sampled at some point in time as the origin (0, 0) of the coordinate system according to the zone encoding scheme. The coordinate plane is divided into four quadrants; namely, θ=1–4. Each of the quadrants is numbered. Presume that the origin and the X-axis and Y-axis in the positive direction with respect to the origin belong to the first quadrant; the Y-axis in the negative direction with respect to the origin belongs to the fourth quadrant; and the X-axis in the negative direction pertains to the second quadrant.

Each quadrant is further divided into zones as designated by a solid line provided in FIG. 2. Each zone is assigned a zone number, as provided in FIG. 2. Each of the zones is further divided into inside-of-zone coordinates (or inside-of-zone addresses) as designated by a broken line provided in FIG. 2. As illustrated in FIG. 2, a zone area (i.e., the quadrant) is usually divided into 10 zones and measures 16×16 pixels.

With this arrangement, certain sampled coordinates can be formed into coordinate information comprised of only three items of information; namely, the difference between a quadrant number of the sampled coordinates and a quadrant number of other coordinates sampled immediately before the sampled coordinates; the difference between a zone number of the sampled coordinates and a zone number of the coordinates sampled immediately before the sampled coordinates; and an address of the sampled coordinates within their quadrant number (an inside-of-zone address). Both a quadrant number and a zone number of coordinates of a stroke starting point (i.e., first sampled coordinates) are set to one. The inside-of-zone address designates the position of sampled coordinates in a certain zone and is expressed by the combination of an address in the X-axis direction and an address in the Y-axis direction.

For instance, provided that the second sampled coordinates have a quadrant number 3 and a zone number 4, the quadrant number difference between the quadrant number of the second sampled coordinates and the quadrant number of the first sampled coordinates is obtained as follows: 3−1=2. Similarly, the zone number difference between the zone number of the second sampled coordinates and the zone number of the first sampled coordinates is obtained as follows: 4−1=3.

To compress the amount of the data obtained by direct encoding of the sampled coordinates, the sampled coordinates are encoded by the combination of quadrant number and zone number differences. More specifically, the information is encoded with reference to a zone code table provided in FIG. 3. The zone code table defines the relationship between zone codes and the combination of quadrant number and zone number differences. In this zone code table, fewer bits are allocated to the zone code numbers having higher frequencies of occurrence by utilization of the characteristics of the handwritten data. If the sampled coordinates to be sampled subsequently do not exist in the zone area, or if the combination of the differences of the quadrant and zone numbers between the sampled coordinates and the coordinates to be sampled subsequently, are not included in the combinations provided in FIG. 3, the absolute values of the coordinates to be sampled subsequently, are directly encoded. Here, the absolute values of the stroke starting point are directly encoded without calculating a quadrant difference and a zone difference with regard to the coordinates of the stroke starting point.

According to the zone encoding method, if the difference between certain sampled coordinates ($X_{i-1}$, $Y_{i-1}$) and coordinates ($X_i$, $Y_i$) to be sampled subsequently is (0, 0), the coordinates for which a determination is made as to whether or not they will be decoded, will not be encoded. Further, the coordinates sampled after the certain coordinates are not required to be encoded if the differences between certain sampled coordinates and coordinates sampled after these coordinates, with regard to their X and Y components are respectively 1 or less. More specifically, if the differences between certain sampled coordinates and coordinates sampled after these coordinates are $|X_i-X_{i-1}| \leq 1$ and $|Y_i-(Y_{i-1})| \leq 1$, the coordinates sampled after the certain coordinates are not required to be encoded.

The zone encoding scheme will be described more specifically, provided that a drawing is handwritten as illustrated in FIG. 5, and coordinates I=1–7 are sampled.

The first sampled coordinates I=1 (3, 5) are encoded directly and are represented as 9 bits (000000011000000101).

Next, the differences between the first sampled coordinates (5, 6) and the second sampled coordinates I=2 (3, 5); namely, a quadrant number difference and a zone number difference, are calculated. Given that the coordinates (3, 5) are the relative origin, the coordinates (5, 6) are redefined as diagonally slanted coordinates (2, 1) on the zone area provided in FIG. 2. The second sampled coordinates are located in the first quadrant with respect to the relative origin. In other words, the quadrant number of the second sampled coordinates is one, and its zone number is two. Therefore, the differences between the second sampled coordinates having quadrant number 1 and zone number 2 and the first sampled coordinates having quadrant number 1 and zone number 1, become (0, 1).

The combination of the quadrant number difference and the zone number difference; namely, (0, 1), is applied to the zone code table (see FIG. 3), whereby a zone code (1011) is obtained.

As is evident from FIG. 2, the inside-of-zone address of the second sampled coordinates is defined as 0 in the X-axis direction and 1 in the Y-axis direction; namely, (0 1). This inside-of-address is added to the previously obtained zone code (1011), whereby the second sampled coordinates (5, 6) is encoded into (1011 01).

As in the case of the second sampled coordinates, the third sampled coordinates (7, 7) are encoded with respect to the relative point; namely, the second coordinates sampled immediately before the third coordinates, by use of information about the quadrant number difference, the zone number difference, and the inside-of-zone address.

More specifically, coordinates derived from the differences between the third sampled coordinates (7, 7) and the second sampled coordinates (5, 6), are (2, 1). The third sampled coordinates are located in the first quadrant with respect to the relative origin; namely, the quadrant number of the third sampled coordinates is one. The zone number 2 of the third sampled coordinates is two. Therefore, the third sampled coordinates has quadrant number 1 and zone number 2. The differences between the second sampled coordinates and the third sampled coordinates with regard to the quadrant number and the zone number are 0 and 0, respectively.

"PLI" provided in the zone code table (see FIG. 3) is a symbol denoting that a pen is lifted up. "EFZ" is a symbol denoting that the pen is located out of the zone area. As illustrated in FIG. 2, ten zones are provided in the zone area according to the zone encoding scheme. If the sampled coordinates to be encoded do not belong to any one of these zones, they will be encoded by adding the absolute values of the sampled coordinates to the code (000010) of the EFZ.

According to the above-described zone encoding scheme, the quadrant and zone numbers of coordinates to be sampled subsequently, are obtained while the coordinates sampled immediately before the sampled coordinates are used as the origin. Therefore, as the distance between the two sampled coordinates increases, the differences between them becomes greater. As a result, the number of bits which are allocated when coordinates are encoded, will become greater, thereby resulting in a greater amount of encoded data.

Further, if a sampling period becomes longer, the distance between two sampled coordinates will become greater, and hence the amount of encoded data will become greater accordingly.

Particularly, if the distance between two sampled coordinates becomes longer, the secondly-sampled coordinates are determined to be located out of the zone area and are encoded as such. Eventually, the length of encoded resultant data is increased. Such a greater amount of encoded data results in an increase in communications and storage costs.

Further, if a handwriting large width of a stroke path causes draw areas (or pen areas) of adjacent sampled coordinates to overlap, it results in encoding of undesired sampled coordinates, causing encoded data to increase. Provided that it is possible to select the thickness of a line to be displayed on a display screen from a plurality of thicknesses, if a wide line is selected, the draw areas of the sampled coordinates may overlap. In this case, it is not necessary to decode encoded data of these sampled coordinates.

In either of the cases; e.g., where a sampling rate is slow, and where a handwriting stroke rate is fast, the differences between two sampled coordinates will become large in many situations. Particularly, if the line width is large, large-sized letters or drawings will be drawn often. Eventually, a handwriting stroke rate also increases, and the differences between two sampled coordinates increases. In such a case, the sampled coordinates are often determined to be out of the zone area, and the amount of resultantly encoded data of these sampled coordinates increases. More specifically, if the differences between two sampled coordinates are large, it is determined that the secondly-sampled coordinates will not fall within the zone area provided in FIG. 2. As a result, the secondly-sampled coordinates are determined as to be outside of the zone area. If the size of the zone area is increased to 16×16 pixels or more, if 10 or more zones are provided in the zone area, or if the secondly-sampled coordinates are located in the zone area, in many cases, the secondly-sampled coordinates still fail to correspond to any one of the code numbers provided in the zone code table 3. Therefore, the absolute values of the coordinates are directly encoded, thereby resulting in lengthy encoded data.

SUMMARY OF THE INVENTION

The primary object of the present invention is to provide an encoder and a decoder that are capable of reducing communications and storage costs of encoded data by reducing the length of encoded data.

According to one aspect of the present invention, there is provided a handwriting stroke information encoder which encodes handwriting stroke information by sampling it, the encoder comprising:

a processor which forecasts sampled coordinates to be encoded using one or a plurality of previously-sampled coordinates; and an encoder which encodes the differences between the forecast coordinates and sampled coordinates of an actual input point.

In this handwriting stroke information encoder, the processor forecasts and calculates sampled coordinates to be encoded from previously-sampled coordinates. The encoder encodes the differences between the forecast coordinates calculated by the processor and sampled coordinates of an actual input point. The sampled coordinates are forecast, and the differences between the thus-forecast sampled coordinates and the sampled coordinates of an actual input point are encoded. Therefore, the number of differences can be reduced, whereby the amount of encoded data is reduced.

The forecast coordinates should preferably be calculated from a plurality of sampled coordinates, whereby a forecasting operation with higher accuracy can be performed.

Further, the forecast coordinates should preferably be calculated according to an angle formed between vectors connecting together adjacent sampled coordinates and are adjacent to each other. As a result, differences between two sampled coordinates can be reduced even in the case of a handwriting stroke of curves.

The forecast coordinates should preferably be calculated according to the magnitude of a plurality of vectors connecting together adjacent sampled coordinates. As a result, accurate forecasting operations can be performed in consideration of the size of a path defined between the sampled coordinates.

The present invention provides a stroke information encoder which samples handwriting stroke information and encodes the thus-sampled handwriting stroke information, the encoder comprising:

a processor for selecting one or a plurality of sampled coordinates whose encoding operations are omitted, from a plurality of sampled coordinates; and an encoder for encoding predetermined sampled coordinates according to the result of the selection performed by the processor.

In this handwriting stroke information encoder, the processor selects one or a plurality of sampled coordinates, whose encoding operations are omitted, from a plurality of sampled coordinates. Then, the encoder encodes predetermined sampled coordinates according to the result of such selection performed by the processor. As a result, the sampled coordinates selected by the processor as sampled coordinates whose encoding operations are omitted, are not encoded. Therefore, the mount of encoded data can be reduced.

Further, the processor should preferably determine whether or not sampled coordinates of interest are encoded, using the positional relationship between the sampled coordinates and other sampled coordinates which become the relative origin of the sampled coordinates. As a result, encoding of undesirable sampled coordinates are omitted, thereby reducing the amount of encoded data.

The processor should preferably select at least one sampled coordinate, whose encoding operation is omitted, from a plurality of sampled coordinates whose draw areas partially overlap. As a result, the sampled coordinates which are encoded are reduced, which in turn makes it possible to reduce the amount of encoded data. Furthermore, since there are at least partial overlaps between the draw areas, no problems arise in decoding operations.

The processor should preferably omit the encoding of the sampled coordinates even in a case there is a partial overlap between the draw area of sampled coordinates of interest and the draw area of coordinates most recently sampled before the coordinates.

According to yet another aspect of the present invention, there is provided a handwriting stroke information encoder which encodes stroke information by sampling it, the encoder comprising:

memory which stores a zone dividing method and a zone number designation method corresponding to the characteristics of input drawing data; and an encoder which encodes sampled coordinates corresponding to the zone dividing method and the zone number designation method stored in the memory.

In this handwriting stroke information encoder, the zone division method and the zone number designation method corresponding to the characteristics of input drawing data are stored in the memory. The encoder carries out an encoding operation according to the zone dividing method and the zone number designation method, whereby the amount of encoded data can be reduced.

According to still another aspect of the present invention, there is provided a handwriting stroke information encoder which encodes handwriting stroke information by sampling it, the encoder comprising:

memory for storing a zone dividing method and a zone number designation method in which the number of pixels of one side of a zone having the minimum number of pixels in at least one of the X and Y directions is four or more; and an encoder which encodes sampled coordinates corresponding to the zone dividing method and the zone number designation method stored in the memory.

The number of pixels of the sides of a zone having the minimum number of pixels in the X and Y directions is usually two. However, in the present invention, the number of pixels is set to four or more. Therefore, the possibility of sampled coordinates being included in the zone area is increased. Accordingly, the risk of sampled coordinates being located outside of the zone area so that the amount of encoded data becomes greater, is eliminated.

According to a further aspect of the present invention, there is provided a handwriting stroke information encoder which encodes handwriting stroke information by sampling it, the encoder comprising:

memory for storing a plurality of different types of zone dividing dividing method and zone number designation dividing;

a processor for selecting a zone dividing method and a zone number designation method used in encoding sampled coordinates, from the plurality of types of zone dividing method and zone number designation methods stored in the memory; and an encoder for encoding input sampled coordinates, according to the zone dividing method and the zone number designation method selected by the processor.

In this handwriting stroke information encoder, the processor selects the zone dividing method and the zone number selection method from the memory. Sampled coordinates are encoded according to the thus-selected methods, and hence the amount of encoded data can be reduced by selecting suitable zone dividing methods and one number selection methods.

BRIEF DESCRIPTION OF HE DRAWINGS

FIG. 3 is a zone code table used in the handwriting stroke information encoding scheme defined by JT-T150 recommendations;

FIG. 9 is a zone code table illustrating zone codes used in the encoding operations of the first through third embodiments;

FIG. 11 is a schematic representation illustrating a configuration of a code data sequence of drawing data produced after the encoding operations;

FIG. 22b is a schematic representation for explaining the encoding operations provided in FIG. 22a;

DESCRIPTION OF THE PREFERRED EMBODIMENTS

With reference to the accompanying drawings, preferred embodiments of the present invention will now be described.

Figure 4:
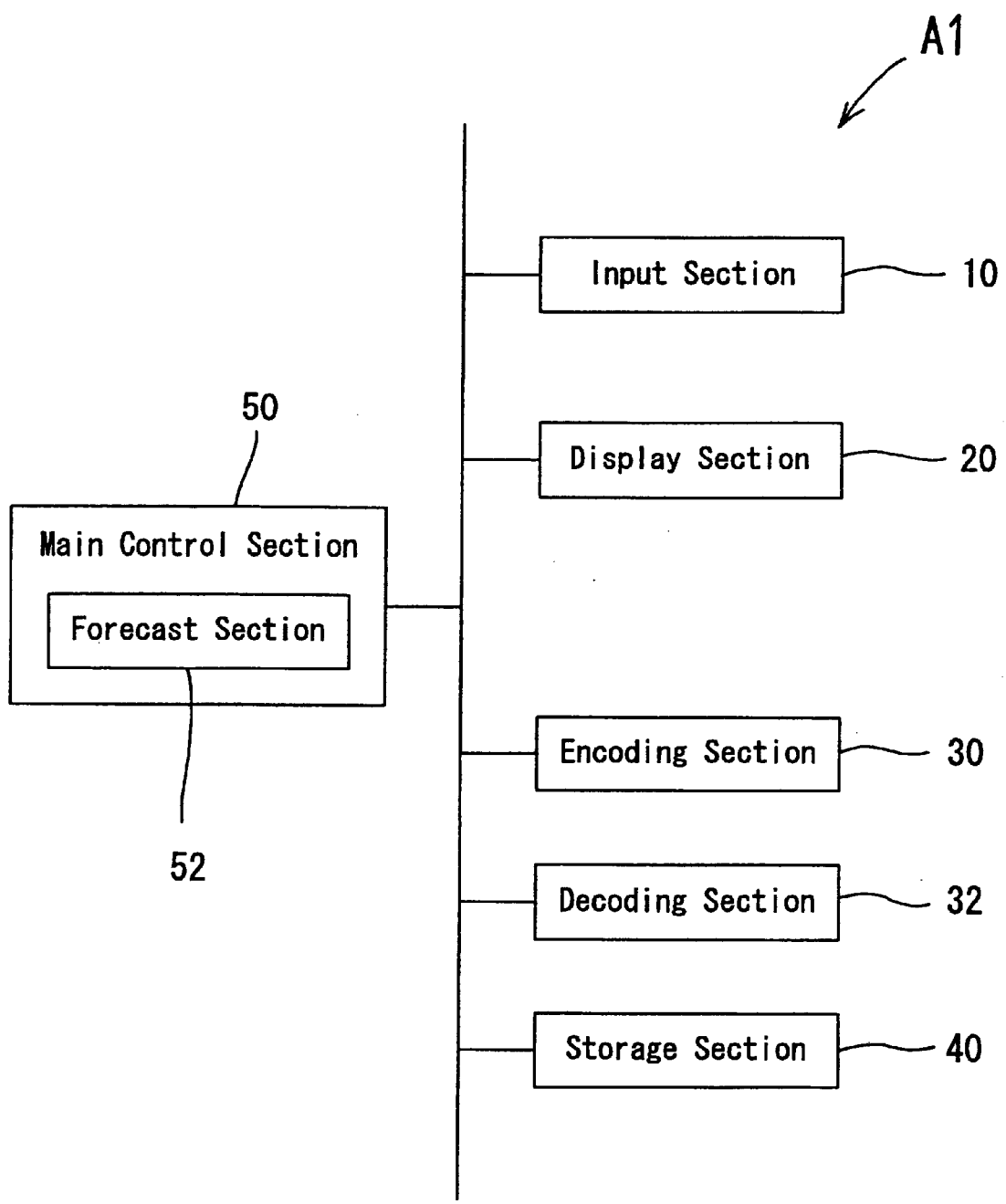
FIG. 4 is a block diagram illustrating the configuration of a handwriting input apparatus according to first through third embodiments of the present invention.

As illustrated in FIG. 4, a handwriting input apparatus A1 which is a handwriting stroke information encoding/decoding apparatus of the present invention, is comprised of an input section 10, a display section 20, an encoding section 30, a decoding section 32, a storage section 40, and a main control section 50.

The input section 10 is used for entering handwritten data and, more specifically, corresponds to a digitizer. The display section 20 displays handwritten data, entered from the input section 10, and messages received from the main control section 50, as well as a drawing display area and icons. The icons are used in designating attributes such as a line width (a pen width), colors, writing, and deletion information. More specifically, the display section 20 is provided with an LCD. The encoding section 30 encodes handwritten data, and the decoding section 32 decodes the encoded handwritten data. The storage section 40 is provided with RCM for storing information such as various programs used for activating the hand input apparatus A1, and RAM for storing input sampled coordinates or encoded information. The main control section 50 which serves as a processor, controls the operations of the above-described sections using programs. This main control section 50 is provided with a forecasting section 52. This forecasting section 52 calculates coordinates to be forecast when encoding sampled coordinates. handwriting stroke information encoding/decoding apparatus of each of first through third embodiments is provided with the forecasting section 52.

The operations of the handwriting input apparatus A1 having the previously-described configuration will be described. First, the outline of operating conditions of the overall handwriting input apparatus A1 will now be described.

In the encoding operations, if input operations are performed through the input section 10 using an attached pen, the input section 10 samples entered handwritten input data in constant cycles, whereby consecutive drawing data changes to discrete sampled coordinate information. The sampled coordinate information is sent to the main control section 50.

The main control section 50 determines whether the information entered from the input section 10 is an input to the drawing display area or an input to any of the icons displayed on the display section 20.

If the result of such determination is an input to the drawing display area, the sampled coordinate information is sent to the display section 20 and the encoding section 30.

If the result is an input to an icon, the main control section 50 converts the details of the input into attribute information. The main control section 50 sends the attribute information to the encoding section 30 and, then, reads information about display contents corresponding to an input with regard to the icon. The thus-read information is output to the display section 20 from the main control section 50.

If the result is an input to the drawing display area, the display section 20 interpolates data of sampled coordinates in order to convert the received discrete sampled coordinates into consecutive information. The display section 20 displays consecutive drawing data obtained as a result of interpolation. Specifically, the consecutive drawing data is displayed according to the attribute information. For example, if the attribute information is writing information, the drawing position will be colored. In contrast, if the attribute information is deletion information, the drawing position will be displayed without colors. When the pen is moved away from the input section 10 after the input of drawing data corresponding to one stroke has been completed, lift-of-pen information is sent to the display section 20 and the encoding section 30.

If an input is entered to the icon from the input section 10, and if information about the details of a display corresponding to the icon is sent to the display section 20, the display section 20 displays that information.

Upon receipt of the sampled coordinates and the attribute information, the encoding section 30 sequentially encodes them, so that encoded data is produced. If the encoded data is stored, the encoded data is sent to and stored in the storage section 40.

On the other hand, in decoding operations, the encoded data is sent to the decoding section 32. More specifically, if the encoded data is stored in the storage section 40, the encoded data is sent to the decoding section 32 from the storage section 40. In contrast, if the encoded data is sent to the decoding section 32, it is sent to the decoding section 32 through a transmission path (not shown). The decoding section 32 decodes the received encoded data into sampled coordinates or attribute information. The thus-decoded sampled coordinates or attribute information are sent to the display section 20. As in the case of the encoding operation, the display section 20 displays the sampled coordinates or attribute information.

The main control section 50 performs the previously-described series of processing control operations. Various control operations; for instance, bus control operations, instructions for commencing encoding/decoding operations, instructions for reading/writing stored information, and instructions for displaying various messages, are executed by the main control section 50. The forecasting section 52 calculates forecast coordinates of the sampled coordinates to be encoded.

Specific operations of the encoding section 30 and others will now be described.

Figure 6:
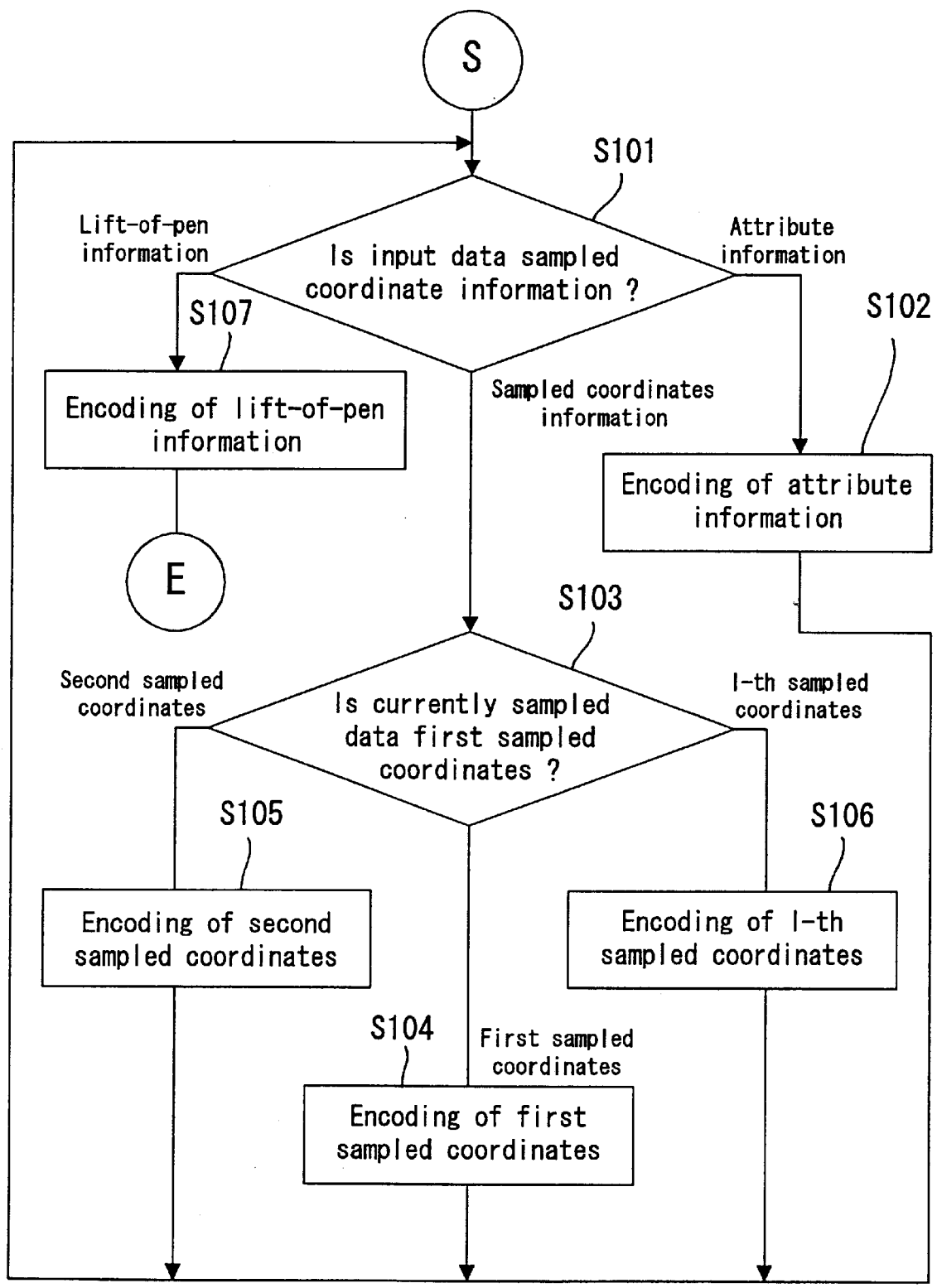
FIG. 6 is a flowchart for explaining encoding operations performed in the input handwriting apparatus of the first through third embodiments.

First, the encoding operations will be described with reference to a diagrammatic flowchart provided in FIG. 6.

Figure 5:
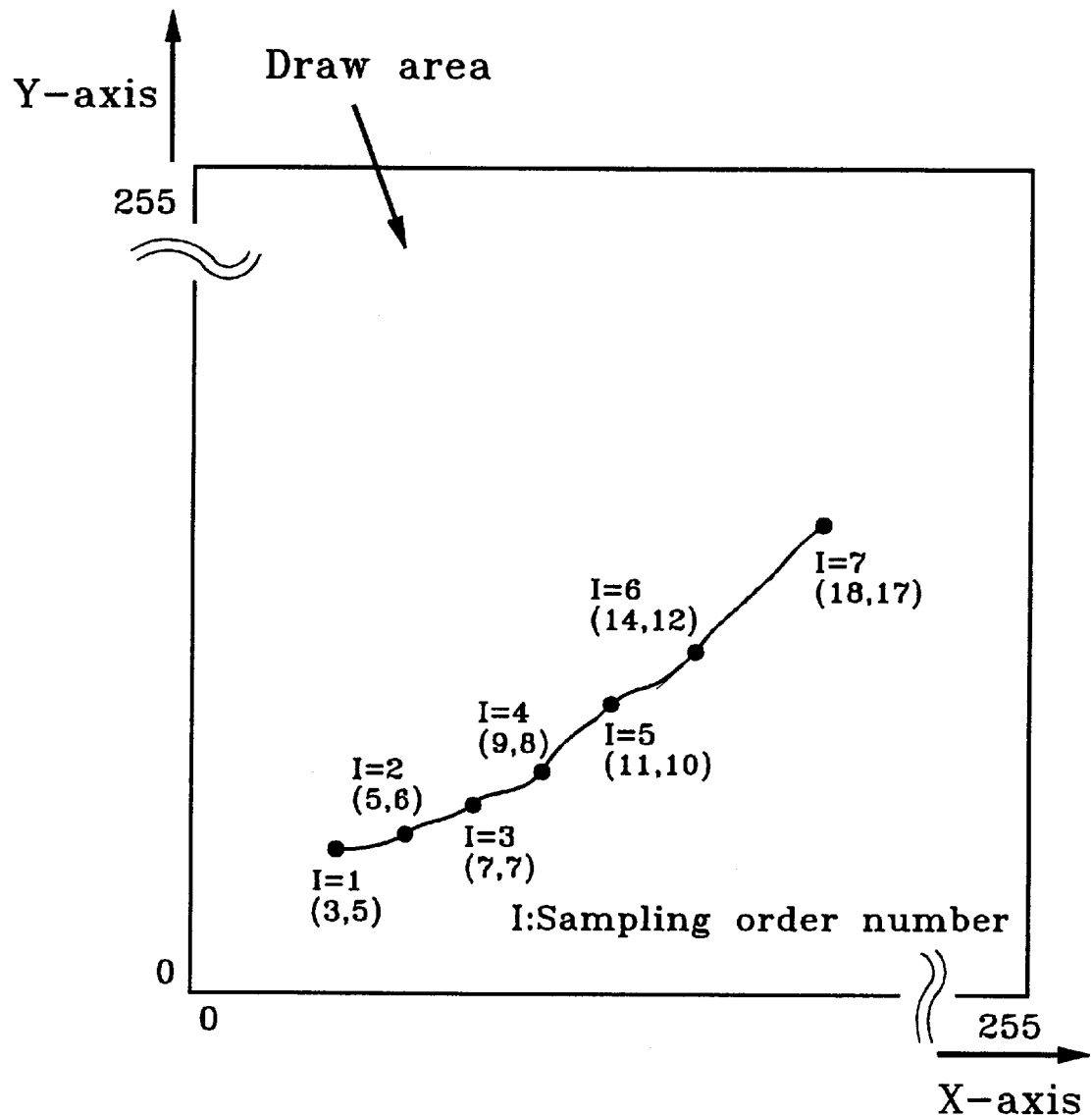
FIG. 5 is a plot illustrating an example of coordinates entered during encoding operations of the handwriting input apparatus of the first embodiment.

Encoding/decoding operations of a handwriting input apparatus according to a first embodiment of the present invention will be described. The following descriptions will be provided with reference to a case where a drawing provided in FIG. 5 is drawn.

Input data are analyzed as to whether they are sampled coordinates, attribute information, or lift-of-pen information in step 101 (the step will be hereinafter referred to as "S"). The main control section 50 carries out the analysis of the input data and is capable of determining which of them corresponds to the input data using the information received from the input section 10.

If the analyzed data is attribute data, the processing then proceeds to S102; if sampled coordinates, S103; and if lift-of-pen information, S107. The attribute information is arranged so as not to be input while being included in information about one stroke (i.e., I=1 to I=7 in the case provided in FIG. 2). In short, sampled coordinates of the starting point to the end point of the drawing data, and the lift-of-pen information are consecutively input. The following processing is executed by the encoding section 30.

Encoded data previously set for each attribute is allocated to the input attribute information in S102, whereby attribution code data is produced. Throughout the following descriptions, attribution code data has a 16-bit fixed length.

It is detected in S103 whether the sampled coordinates are the first sampled coordinates (i.e., the coordinates of the starting point), the second sampled coordinates, or other sampled coordinates, using a counter. If the sampled coordinates are the first coordinates, the processing then proceeds to S104; if the second sampled coordinates, S105; or if the other sampled coordinates, S106.

Figure 2:
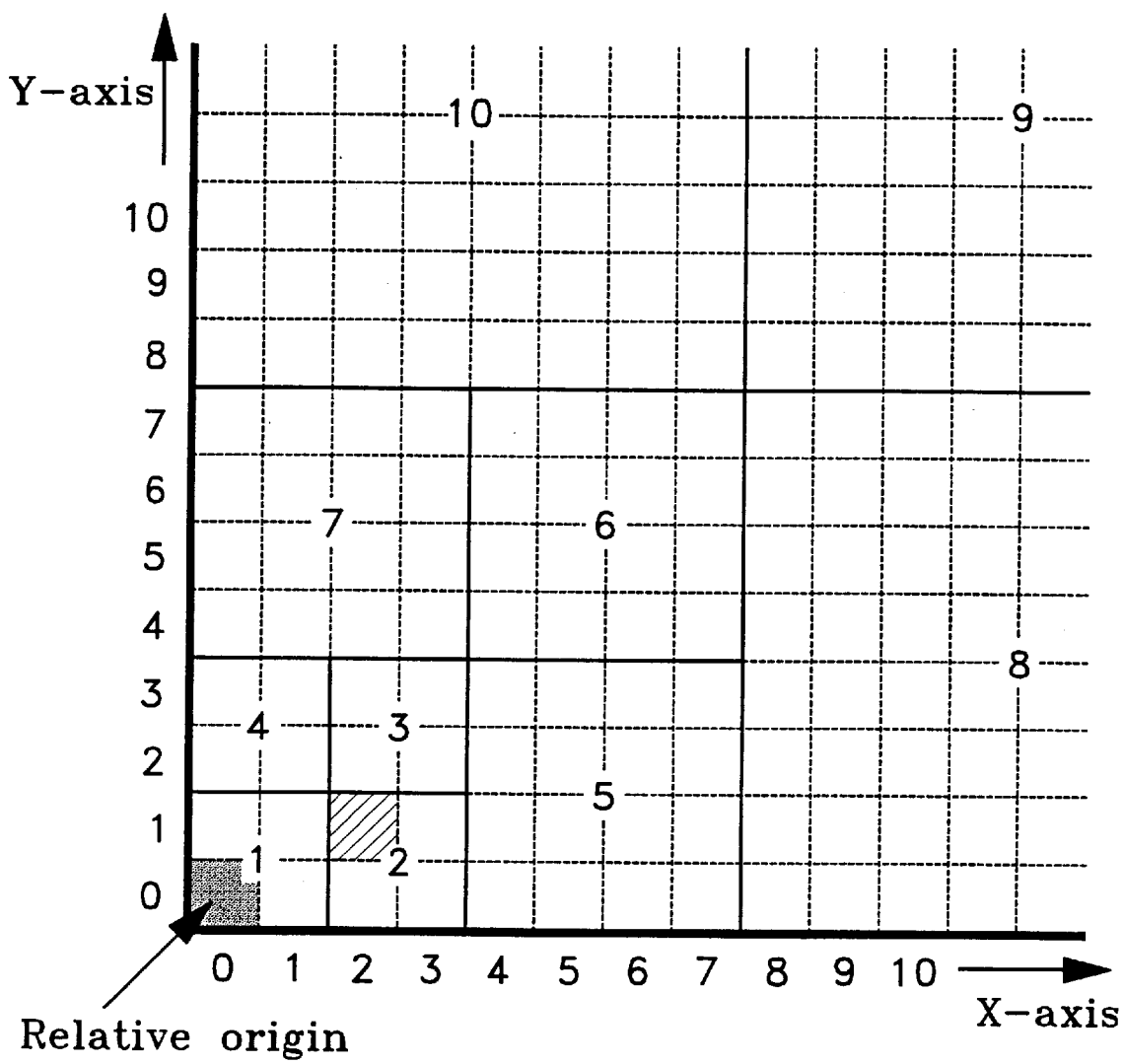
FIG. 2 is a schematic representation illustrating "a zone dividing method and a zone number designation method" used in the handwriting stroke information encoding scheme defined by JT-T150 recommendations and in the handwriting stroke information encoding method of the present invention.

The first sampled coordinates are not subjected to subtraction in S104, and hence the input coordinates (i.e., the absolute values of the input coordinates) are directly encoded. The bit length of the sampled coordinates at that time is determined by the resolution of the input section 10. For example, as illustrated in FIG. 5, if the input section 10 has 256- by 256-pixel resolution, the sampled coordinates have an 8-bit encoded bit length with regard to each of the X-axis and Y-axis. In short, if the first sampled coordinates provided in FIG. 2 are (3,5), a code for the first sampled coordinates is (0000001100000101).

Figure 1:
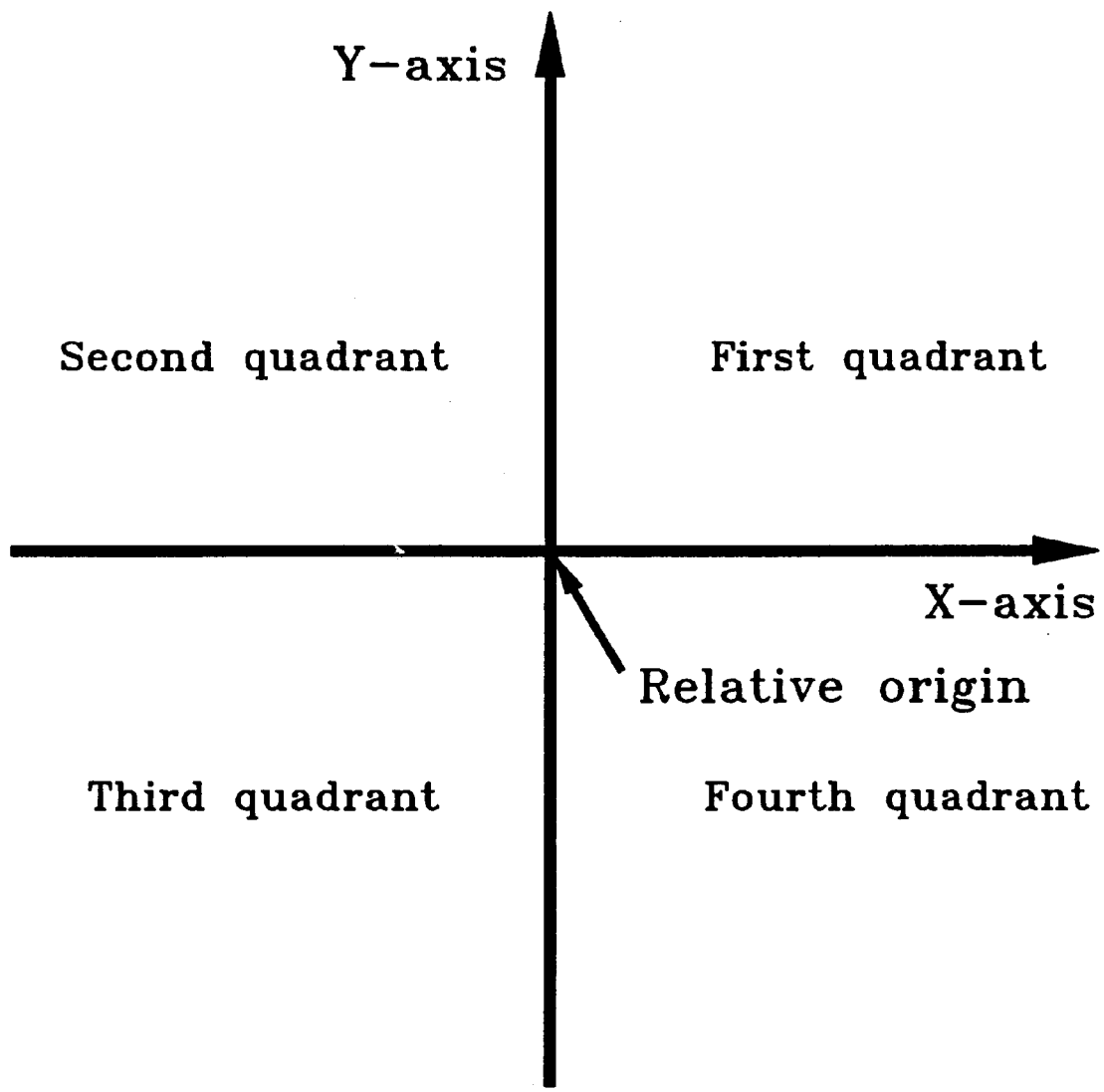
FIG. 1 is a schematic representation of partitioned quadrants used in the handwriting stroke information encoding scheme defined by JT-T150 recommendations and in a handwriting stroke information encoding method of the present invention.

The relationship between the first sampled coordinates and the second sampled coordinates is encoded by adding a zone code for producing a variable-length code to an inside-of-zone address. A zone code table provided in FIG. 9 is applied to the stroke information encoding method of the first embodiment. The previously-described zone code is obtained from the zone code table provided in FIG. 9 according to the zone number and the quadrant number obtained when the first sampled coordinates are used as the relative origin. As in the case of the conventional zone encoding scheme, the quadrant number is defined according to FIG. 1, and the zone number is also defined according to FIG. 2, as well. Further, as in the case of the conventional zone encoding scheme, the address in the zone area is displayed as positional information about a certain zone area.

For instance, given that the first sampled coordinates and second sampled coordinates provided in FIG. 5 are (3, 5) and (5, 6), respectively, the second sampled coordinates become (2, 1) if the first sampled coordinates are used as the relative origin. The second sampled coordinates are located in the direction of the first quadrant from the relative origin. Further, as provided in FIG. 2, the zone number of the second sampled coordinates is two. Therefore, as provided in FIG. 9, a zone code for the second sampled coordinates becomes (1110). In the zone code table provided in FIG. 9, a small number of bits are allocated to the zones that are closer to the relative origin.

The code length of an inside-of-zone address is the minimum bit number capable of representing the maximum address in that zone. The inside-of-zone address of zone number 2 can be represented by one bit with regard to each of the X-axis and Y-axis. In the case of zone number 5, the X and Y coordinates can be represented as two bits, respectively. In the previously-described case, since the inside-of-zone address of the diagonally shaded area in FIG. 2 is (0, 1), an inside-of-zone address code of that area is (01).

Therefore, the encoded data of the second sampled coordinates becomes equal to (111001) concatenating (01) onto (1110). If the zone number does not correspond to any one of the zone numbers provided in FIG. 9; namely, if the zone number does not correspond to any one of 1 through 7, escape-from-zone encoded data (having a 6-bit fixed length) representing that the sampled coordinates are outside of the zone area, is allocated to the second sampled coordinates. Subsequently, the absolute values of the sampled coordinates are allocated to the end of the escape-from-zone encoded data as is the case of the first sampled coordinates. In short, a code for the absolute values of the second sampled coordinates is added to the code which is designated by EFZ (000010) shown in FIG. 9.

The I-th sampled coordinates (I designates an integer from 3 to N) are encoded in S106. The following descriptions will be given of a case where the third sampled coordinates provided in FIG. 5 are encoded.

The previously-sampled coordinates (the second sampled coordinates) are not used as the relative origin at the time of execution of zone-encoding operations. Coordinates to be sampled subsequently (i.e., the third sampled coordinates), are forecast from the previously-sampled coordinates and the coordinates sampled prior to the previously-sampled coordinates (i.e., the first sampled coordinates). The thus-forecast coordinates are used as the relative origin. The coordinates to be forecast are calculated by the previously-described forecasting section 52.

Figure 7:
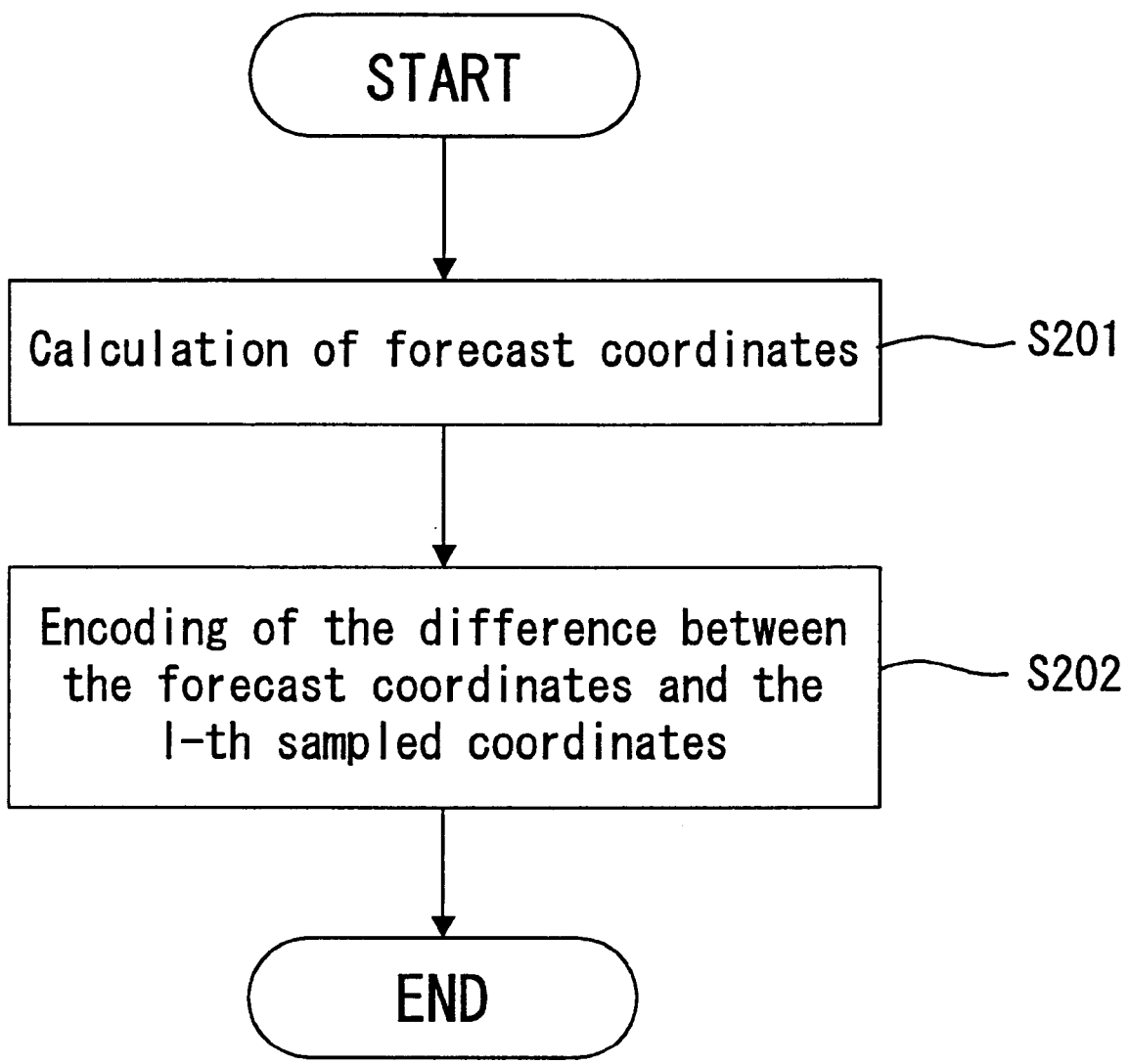
FIG. 7 is a flowchart illustrating a subroutine used in FIG. 6.
Figure 8:
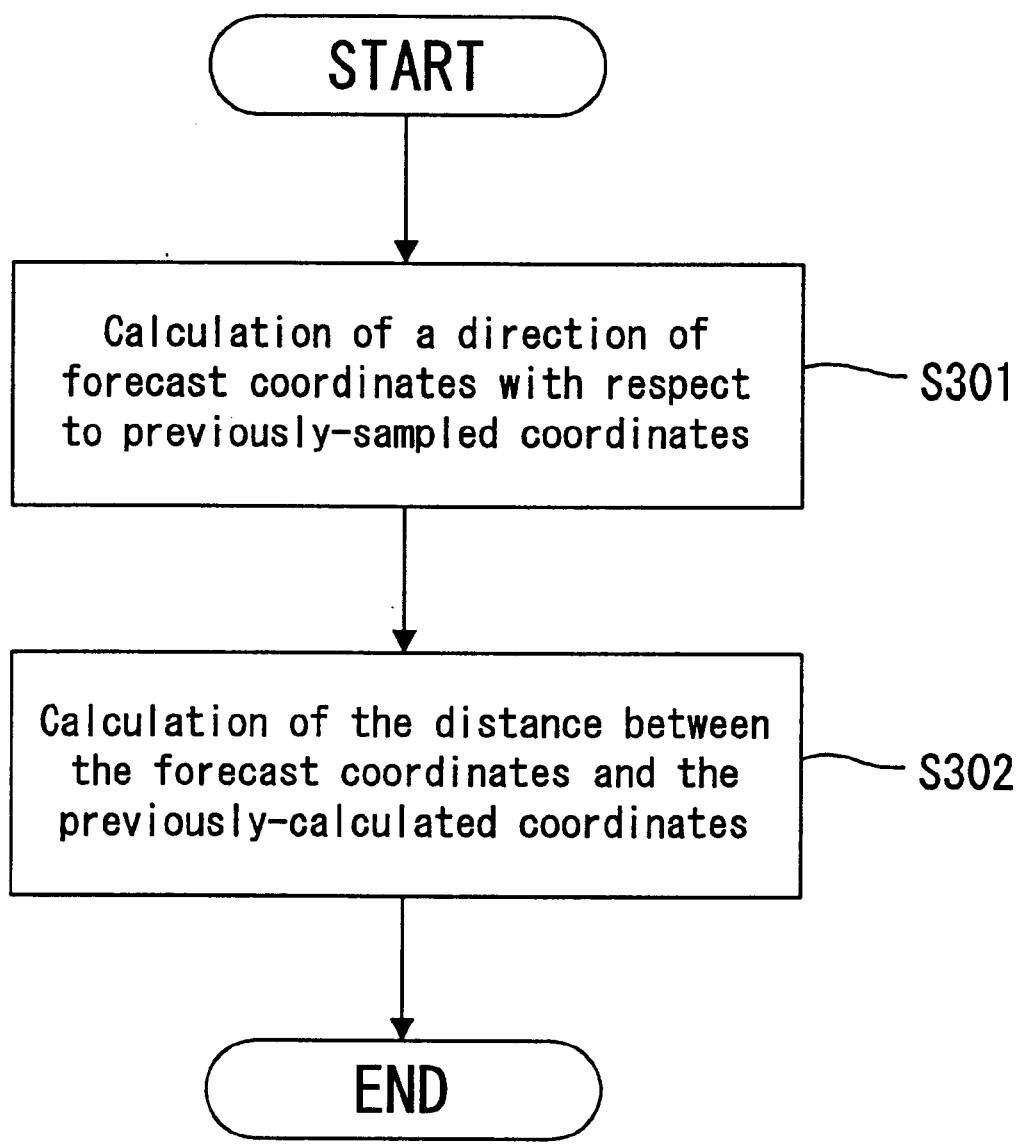
FIG. 8 is a flowchart illustrating a subroutine used in FIG. 7.

The details of step S106 will be described more specifically. As illustrated in FIG. 7, coordinates to be forecast are calculated first (S201). The differences between the thus-calculated forecast coordinates and the I-th sampled coordinates are encoded (S202), whereby the I-th sampled coordinates are encoded. A method of calculating coordinates to be forecast in step S201 will be described more specifically. As illustrated in FIG. 8, the direction of coordinates to be forecast is calculated with respect to the previously-sampled coordinates (S301), and the distance between the coordinates to be forecast and the previously-described sampled coordinates is calculated (S302), whereby the coordinates to be forecast are calculated.

Figure 10A:
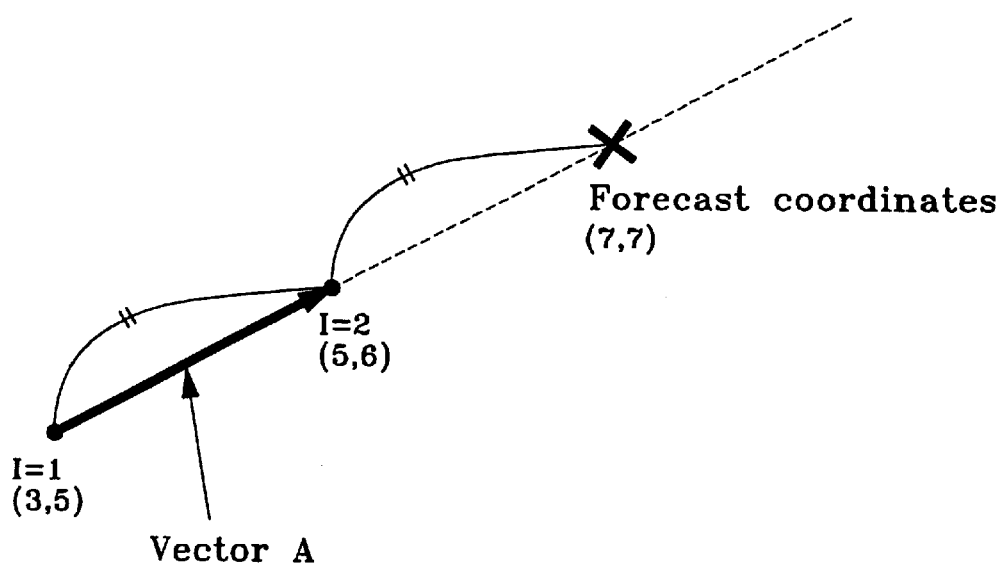
FIGS. 10a and 10b are schematic representations of the encoding operations performed by the handwriting input apparatus of the first embodiment.

More specifically, as illustrated in FIG. 10a, assume that the coordinates to be forecast with regard to the third sampled coordinates are in line with the extension of vector A which connects the coordinates sampled prior to the previously-sampled coordinates (i.e., the first sampled coordinates) to the previously-sampled coordinates (i.e., the second sampled coordinates). Further, assume that the coordinates to be forecast are spaced only the vector A apart from the second sampled coordinates. More specifically, the direction of the coordinates to be forecast that is calculated in step S301 is in line with the extension of vector A, and the distance between the coordinates to be forecast and the second sampled coordinates calculated in step S302 is equal to the length of the vector A; namely, the distance between the first sampled coordinates and the second sampled coordinates. More specifically, the coordinates to be forecast when the third sampled coordinates are encoded, become (7, 7) as provided in FIG. 5.

As illustrated in FIG. 5, if the third coordinates sampled during practical stroke operations are (7, 7), the differences between the forecast coordinates and the practically sampled third coordinates are (0, 0). Therefore, as designated by "ZERO" in the zone code table provided in FIG. 9, the zone code of the third coordinates becomes (01). In this case, the inside-of-zone address is unnecessary and hence remains unencoded. Consequently, in the above-described case, the code of the third sampled coordinates becomes (01).

Apart from the case provided in FIG. 5, if the practical third sampled coordinates become (8, 8), the differences between the forecast coordinates (7, 7) and the third sampled coordinates (8, 8) are (1, 1). The quadrant number of the third sampled coordinates is one, and the zone number of the same is also one. Therefore, the address of the third coordinates in the zone area becomes (1, 1). Consequently, the zone code becomes (0001) from FIG. 9, as a result of which the code of the third sampled coordinates becomes (000111).

Similarly, the fourth sampled coordinates or later are forecast from the previously-sampled coordinates and the coordinates sampled prior to the previously-sampled coordinates. The coordinates to be encoded are encoded by means of the differences between the thus-forecast coordinates and the practically sampled coordinates.

Lift-of-pen information which represents the end of input of one stroke drawing data, is encoded in S107. The thus-entered lift-of-pen information is encoded into (110) having a 3-bit fixed length as designated by PLI provided in the zone code table shown in FIG. 9.

The encoding of one-stroke drawing data is carried out by executing a series of operations described above. A plurality of items of stroke information can be encoded by repeating the operations from S101 to S107.

The encoded data has a code data sequence as provided in FIG. 11. The attribute code data is followed by an X-axis code (X1) of the first sampled coordinates, a Y-axis code (Y1) of the first sampled coordinates, a zone code (ZC2)) of the second sampled coordinates, and an inside-of-zone address code (A(2)) of the second sampled coordinates. The zone code of the second sampled coordinates is obtained by encoding the differences between the second sampled coordinates and the first sampled coordinates. In the above-described example, (1110) corresponds to the zone code of the second sampled coordinates. Further, (01) corresponds to the inside-of-zone address of the second sampled coordinates. The inside-of-zone address code of the second sampled coordinates is further followed by a code (EZC(3)) obtained as a result of encoding the differences between the third sampled coordinates and the forecast coordinates of the third sampled coordinates, and an inside-of-zone address (A(3)) of the third sampled coordinates. Data on the fourth and later sampled coordinates follows the data on the third sampled coordinates in the same way as the third sampled coordinates. The lift-of-pen information code (PLI) is positioned at the end of the code data sequence. The data from X1 to PLI corresponds to one stroke. In the case of a plurality of strokes, similar code data sequences are repeatedly produced.

It is not necessary for the attribute code data comprised of encoded attribute information to be positioned at the header of the one-stroke code data sequence.

Figure 12A:
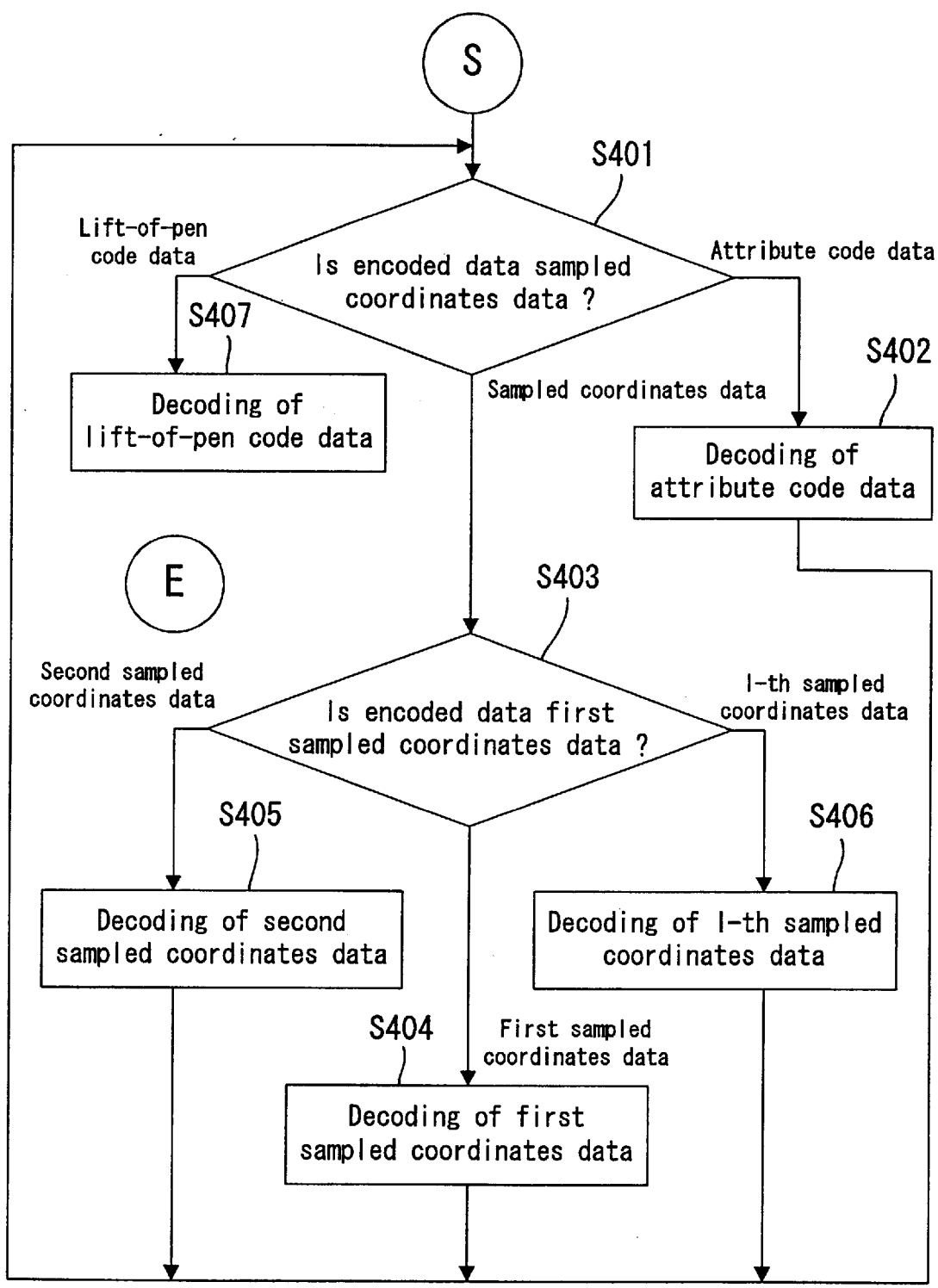
FIG. 12a is a flowchart for explaining decoding operations performed by the handwriting input apparatus of the first through third embodiments.
Figure 13:
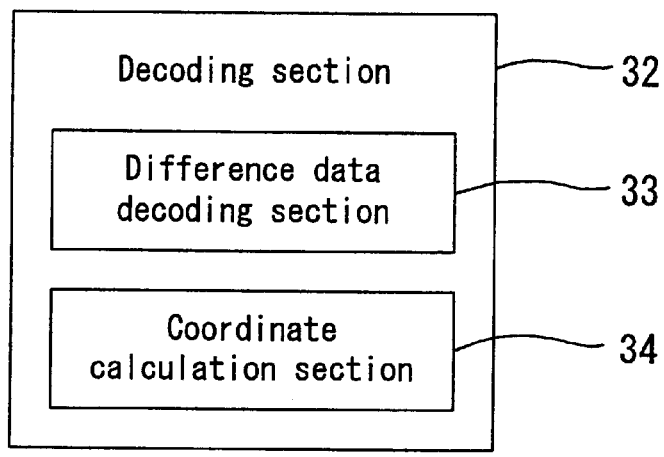
FIG. 13 is a block diagram illustrating the configuration of the encoding section.

With reference to a flowchart provided in FIG. 12a, a decoding operation (an expansion) operation will be described. As illustrated in FIG. 13, a decoding section 32 provided in FIG. 4 is provided with a difference data decoding section 33 and a coordinate calculation section 34.

The difference data decoding section 33 reads encoded data in S401 and analyzes whether or not the first 16 bits of unanalyzed encoded data match up to the attribute code data (having a 16-bit fixed length). If there is a match between the data, the processing then proceeds to S402. If there is no match between the data, it is further analyzed as to whether or not the first 3 bits of the unanalyzed encoded data match up to the encoded data (having a 3-bit fixed length) of the lift-of-pen information. If there is a match between the data, the processing proceeds to S407. If there is no match between the data, the unanalyzed encoded data is interpreted as encoded data of the sampled coordinates. Then, the processing proceeds to S403. The processing carried out in S401 is executed by the main control section 50. The decoding section 32 performs the following processing.

The attribute code data is decoded into attribute information in S402, whereby the first 16 bits of the encoded data becomes analyzed code data. As a result, the unanalyzed next code data comes to the header of the code data sequence.

Using a counter, it is detected in S403 whether the unanalyzed decoded data is related to the first sampled coordinates, the second sampled coordinates, or other sampled coordinates. If the decoded data is related to the first sampled coordinates, the processing will proceed to S404; if the second sampled coordinates, S405; and if other sampled coordinates, S406.

The first sampled coordinates are decoded in S404. In the above-described case, the resolution is 256- by 256-pixels, and therefore the first sampled coordinates have an 8-bit length with regard to each of the X-axis and the Y-axis. As a result, the first 16 bits of the unanalyzed decoded data are used as the absolute values of the first sampled coordinates. In short, it is seen that the first sampled coordinates are (3, 5) in the example provided in FIG. 5. As a result, the 16 bits of the data become analyzed code data, and the unanalyzed next code data comes to the header of the code data sequence.

The second sampled coordinates are decoded in S405. The unanalyzed code data is analyzed in order from its header as to which of the zone code data provided in FIG. 9 corresponds to the data now being analyzed. In the foregoing case, the unanalyzed code data (i.e., the code data of the second sampled coordinates) is analyzed in order from its header, and the following code data is also analyzed. The code data of the second sampled coordinates is (111001), and hence it can be understood that the first four bits match up with zone code number 5 in FIG. 9. Therefore, the first four bits of the second sampled coordinates are determined to be a zone code.

From zone code number 5, it is determined that the second coordinates are positioned in the first quadrant with respect to the first sampled coordinates and have zone number 2. An inside-of-zone address corresponding to zone number 2 is represented by one bit with regard to each of the X-axis and the Y-axis. Therefore, two bits following the zone code data are analyzed. As a result, it is determined that the inside-of-zone address of the second sampled coordinates is (0, 1). It is determined that the second coordinates are positioned in the first quadrant with respect to the first sampled coordinates and are positioned in the second zone. Consequently, it is determined that the second sampled coordinates are positioned at coordinates (0, 1) in the second zone area; namely, it is understood that the second sampled coordinates are (5, 6). Four bits of the zone code data and two bits of the inside-of-zone address data are now analyzed. The unanalyzed next code data comes to the header of the unanalyzed code data sequence.

Figure 12B:
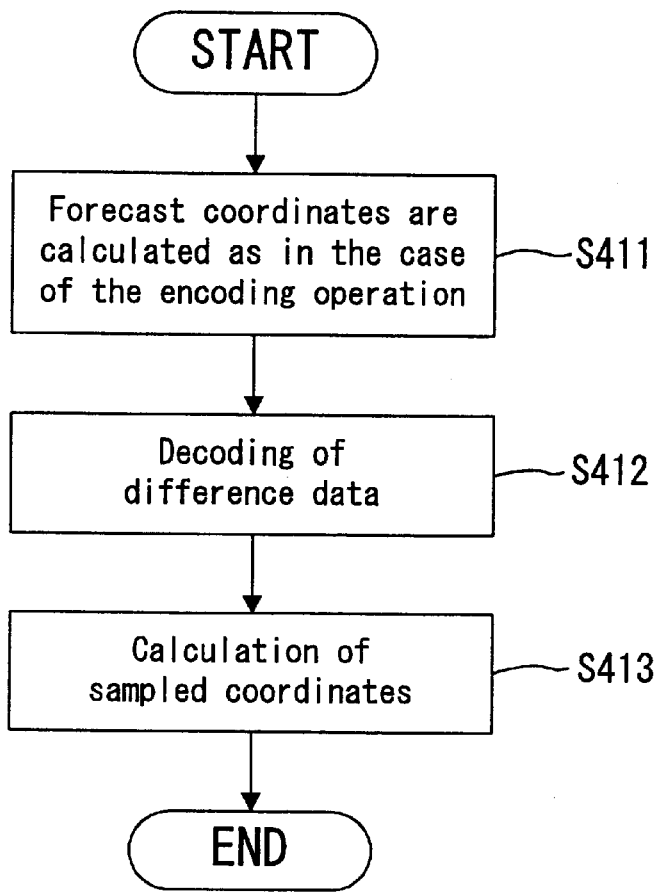
FIG. 12b is a flowchart for explaining the configuration of the encoding section.

The code data of the I-th sampled coordinates is decoded in S406 as illustrated in FIG. 12b. As represented by a subroutine for S406, coordinates which would serve as the relative origin are forecast from the previously-sampled coordinates and the coordinates sampled prior to the previously-sampled coordinates in the same way as they are forecast during the encoding operation (S411). The forecasting section 52 performs forecasting of the coordinates.

The I-th sampled coordinates are analyzed in the same way as in S405 with regard to a quadrant, a zone number, and an inside-of-zone address. In short, the encoded difference data is decoded (S412). The difference data decoding section 33 decodes the encoded difference data. As a result, the quadrant, the zone number, and the inside-of-zone address of the I-th sampled coordinates with respect to the previously-described forecast coordinates are obtained, whereby the values of the I-th sampled coordinates are calculated (S413). The calculation of the values of the I-th sampled coordinates is performed by the coordinate calculation section 34. Through the above-described processing, the I-th sampled coordinates are decoded.

For instance, in the case of the third sampled coordinates provided in FIG. 5, the coordinates forecast from the first sampled coordinates and the second sampled coordinates become (7, 7). Since the code data sequence comprises (01) which represents "ZERO", it is understood that the third sampled coordinates are the same as the forecast coordinates; namely, (7, 7).

Further, if the third sampled coordinates are (8, 8), the difference data becomes (000111). In this case, the forecasting section 52 forecasts coordinates (7, 7). As a result of the decoding section 32 decoding the difference data, zone number 1, quadrant number 1, and inside-of-zone address (1, 1) are derived from the zone code table provided in FIG. 9. Consequently, the coordinate calculation section 34 calculates (8, 8), as the third sampled coordinates, from the thus-derived data.

The lift-of-pen encoded data is decoded into lift-of-pen information in S407.

Through a series of aforementioned processing, the drawing data corresponding to one stroke is decoded. If a plurality of items of stroke information are decoded, they can be decoded by repetitive execution of the processing from S401 to S407.

As has been described above, in the first embodiment, coordinates which would be the relative origin are forecast on the assumption that they are in line with the extension of the vector A connecting between the previously-sampled coordinates and the coordinates sampled prior to the previously-sampled coordinates; and that the distance between the coordinates to be forecast and the coordinates sampled prior to the previously-sampled coordinates is twice the vector A. The differences between the thus-forecast coordinates and actually-sampled coordinates are obtained. Then, the differences can be reduced, and eventually the amount of encoded data can be reduced. Handwritten data is usually entered in the same direction at the same speed. Therefore, it is said that the forecasting of the coordinates carried out in the first embodiment is highly accurate. Further, even if the distance between sampled coordinates becomes longer because of a slow sampling rate, the differences between the sampled coordinates can be reduced, which in turn makes it possible to reduce the length of the encoded data.

Figure 10B:
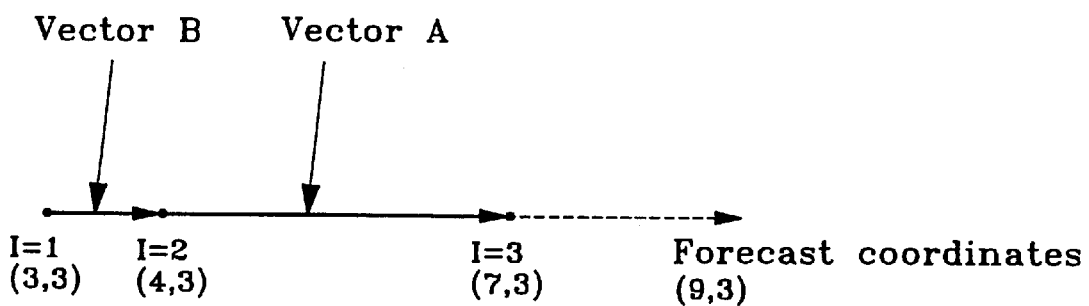

In the above example, the above descriptions are based on the assumption that coordinates are forecast using the previously-sampled coordinates and the coordinates sampled prior to the previously-sampled coordinates. However, coordinates may be forecast using three sampled coordinates or more. In this case, a vector is oriented so as to be in line with the extension of the line between the Previously-sampled coordinates and the coordinates prior to the previously-sampled coordinates. Further, the distance between the previously-sampled coordinates and coordinates to be forecast is set to the average of the lengths of the vectors. More specifically, if coordinates are forecast from previously-sampled coordinates, coordinates sampled prior to the previously-sampled coordinates, and coordinates before the coordinates sampled prior to previously-sampled coordinates (hereinafter simply referred to as coordinates sampled before two previously-sampled coordinates), it is assumed that the coordinates to be forecast are in line with the extension of vector A between the coordinates sampled prior to the previously-sampled coordinates (i.e., I=2) and the previously-sampled coordinates (i.e., I=3) as shown in FIG. 10b. There is calculated an average of the length of vector A and the length of vector B between the coordinates sampled before two previously-sampled coordinates and the coordinates sampled prior to the previously-sampled coordinates. The thus-calculated average is used as the distance between the previously-sampled coordinates and the coordinates to be forecast.

A second embodiment of the present invention will be described. As in the first embodiment, a forecast encoding operation is carried out in the second embodiment, whereby the differences between the forecast coordinates of the coordinates to be sampled and actually-sampled coordinates are encoded. A handwriting input apparatus of the second embodiment also has a configuration as illustrated in FIG. 4, and flowcharts provided in FIGS. 6 through 8 are applied to this handwriting input apparatus. The difference between the first embodiment and the second embodiment is in the changing of the coordinate forecasting method used in S106 of the first embodiment, from a method of forecasting coordinates using the previously-sampled coordinates and the coordinates sampled prior to the previously-sampled coordinates, to a method of forecasting coordinates using at least three or more sampled coordinates.

An explanation will now be given of a case where coordinates are forecast using three sampled coordinates.

Figure 15:
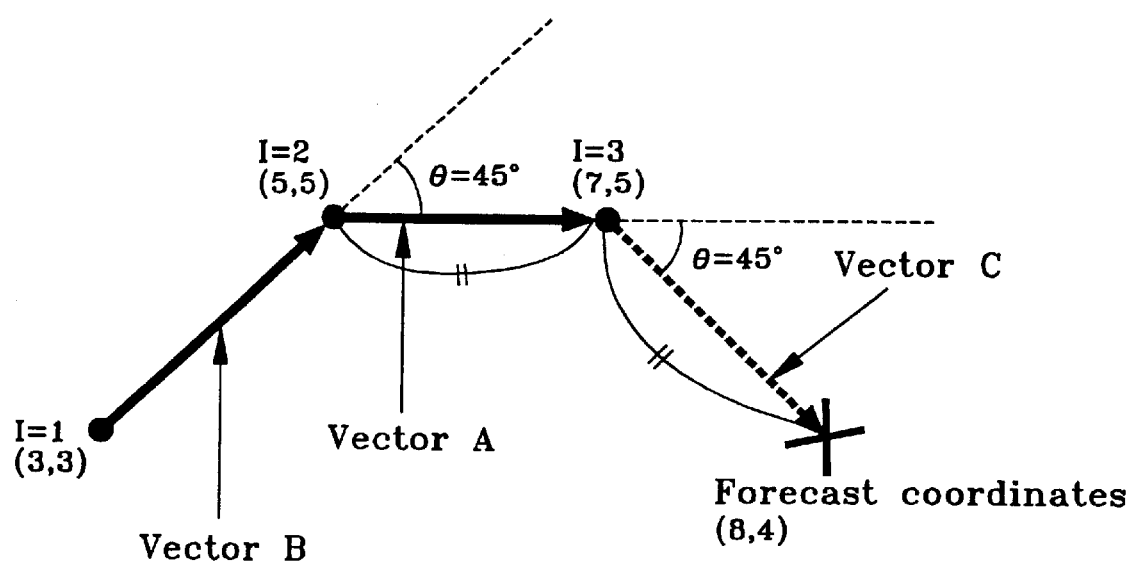
FIG. 15 is a schematic representation for explaining the encoding operations performed by the handwriting input apparatus of the second embodiment.

Coordinates are forecast using previously-sampled coordinates, coordinates sampled prior to the previously-sampled coordinates, and coordinates before the coordinates sampled prior to the previously-sampled coordinates (i.e., coordinates sampled before two previously-sampled coordinates). More specifically, as illustrated in FIG. 15, coordinates are forecast in the following manners: The angle between vector B (vector between the coordinates sampled before two previously-sampled coordinates and the coordinates sampled prior to the previously-sampled coordinates) and vector A (vector between the coordinates sampled prior to the previously-sampled coordinates and the previously-sampled coordinates) is defined as θ. Forecast coordinates are calculated on the assumption that the coordinates are positioned in line with the extension of vector C at an angle θ with respect to vector A in the same direction in which the previously-sampled coordinates are positioned in line with vector A at an angle θ with respect to vector B; and that the coordinates are spaced a distance equal to the magnitude of the vector A, away from the previously-sampled coordinates. The forecast coordinates are calculated by a forecasting section 52 of the main control section 50 provided in FIG. 4.

Figure 14:
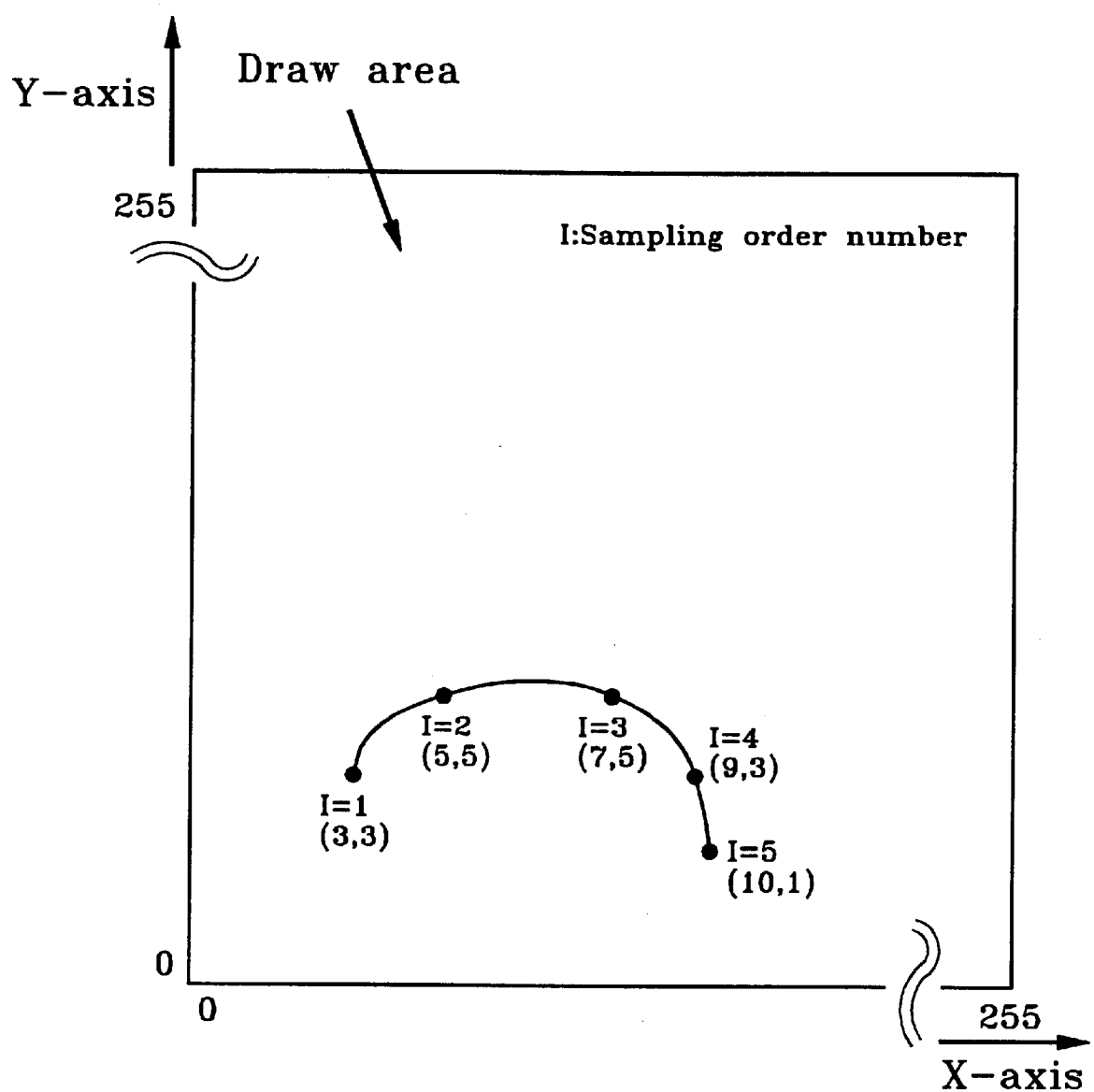
FIG. 14 is a plot illustrating an example of coordinate input for explaining encoding operations of the second embodiment.

In FIG. 14, for instance, provided that first sampled coordinates are (3, 3), second sampled coordinates (5, 5), and third sampled coordinates (7, 5), coordinates which will be forecast when fourth sampled coordinates are encoded are (8.41, 3.58). The forecast coordinates are rounded off to (8, 4).

Provided that the actual forth sampled coordinates provided in FIG. 15 are (9, 3), the differences between the forecast coordinates and the actually-sampled coordinates are (1, −1). In this case, a quadrant number of the fourth sampled coordinates is four, and a zone number of the same is one. From the table provided in FIG. 9, a zone code (1011) corresponding to zone number 4 is selected. Further, the address of the coordinates in the zone is (1, 1), and hence an inside-of-zone address code becomes (11). As a result, the code of the fourth sampled coordinates becomes (101111). If the zone number does not correspond to any one of a number from 1 to 7, the processing that is the same as the processing carried out in the first embodiment is performed. With regard to fifth sampled coordinates or later, coordinates are forecast using the previously-sampled coordinates, the coordinates sampled prior to the previously-sampled coordinates, and the coordinates sampled before two previously-sampled coordinates, in the same way as previously described. The differences between the thus-forecast coordinates and actually-sampled coordinates are encoded.

In the previous embodiment, since the vector A rotates rightward with respect to the vector B, and hence the vector C also rotates rightward with respect to the vector A. If the vector A rotates leftward with respect to the vector B, the vector C will also rotate leftward with respect to the vector B.

The third sampled coordinates of this embodiment may be encoded by encoding the differences between the coordinates that have been forecast using the first and second sampled coordinates and actually-sampled coordinates in the manner as previously described in the first embodiment. Alternatively, as in the case of the conventional zone encoding scheme, the third sampled coordinates may be encoded using the differences between the third sampled coordinates and the second sampled coordinates.

During the decoding operation, the absolute values of the first sampled coordinates are decoded as in the first embodiment. With regard to the second sampled coordinates, the differences between the first sampled coordinates and the second sampled coordinates are decoded. The decoding of the third sampled coordinates depends on the encoding method. More specifically, if the third sampled coordinates have been encoded using the differences between the coordinates forecast using the first and second coordinates and the actually-sampled third coordinates, the differences are decoded. In contrast, if the third sampled coordinates have been encoded using the differences between the third sampled coordinates and the second sampled coordinates, the differences will be decoded. Further, fourth sampled coordinates to I-th sampled coordinates can be decoded by forecasting coordinates using previously-sampled coordinates, coordinates sampled prior to the previously-sampled coordinates, and coordinates sampled before two previously-sampled coordinates, and by decoding the differences between the forecast coordinates and actually-sampled coordinates.

As has been described above, coordinates are forecast in the following manner in the present embodiment: Namely, the angle between vector B connecting the coordinates sampled before two previously-sampled coordinates and the coordinates sampled prior to the previously-sampled coordinates, and vector A connecting the coordinates sampled prior to the previously-sampled coordinates to the previously-sampled coordinates, is defined as θ. Forecast coordinates are calculated on the assumption that the coordinates are positioned in line with the extension of vector C at an angle θ with respect to vector A in the same direction in which the previously-sampled coordinates are positioned in line with vector A at an angle θ with respect to vector B; and that the coordinates are spaced a distance equal to the magnitude of the vector A, away from the previously-sampled coordinates. The differences between the thus-forecast coordinates and actually-sampled coordinates are obtained, whereby the differences can be reduced. This in turn contributes to a reduction in the length of encoded data. Even if a sampling rate becomes slow, and if the distances between the sampled coordinates become longer, the differences between the sampled coordinates can be reduced, which in turn makes it possible to reduce the amount of encoded resultant data. Particularly, similar curves often arise during the course of input of handwritten curves. Therefore, even in the case of stroke information about a curve, the quantity of differences between forecast coordinates and actually-sampled coordinates can be reduced by forecasting angles of the curve. Resultantly, the amount of encoded data can be reduced.

Figure 16:
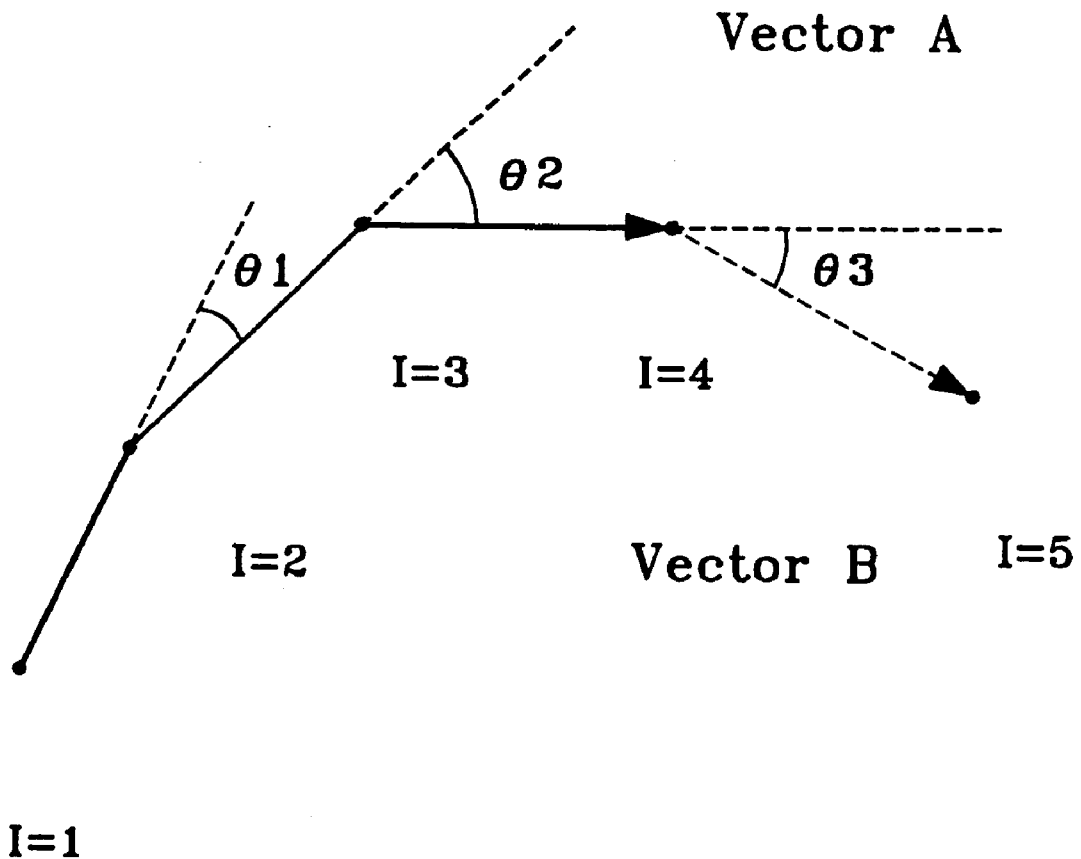
FIG. 16 is a schematic representation for explaining the encoding operations performed by the handwriting input apparatus of the second embodiment.

Although coordinates are forecast using three sampled coordinates in the second embodiment, the number of coordinates used in forecasting coordinates is not limited to three. Coordinates can be forecast even by the use of four or more sampled coordinates. As provided in FIG. 16, where fifth sampled coordinates (I=5) are forecast using four sampled coordinates; namely, first sampled coordinates (I=1) to fourth sampled coordinates (I=4), vector B is assumed to be displaced from the extension of vector A at an angle of θ3. θ3 is obtained by averaging θ1 and θ2. If θ1 and θ2 are opposite to each other with respect to the direction of the vector, coordinates to be forecast are assumed to be on the same side as a larger one of the two angles with respect to the direction of the vector. In that case, θ3 may be set to the difference between θ1 and θ2 or the mean value of the thus-obtained difference.

In the example provided in FIG. 15, the length of vector which designates forecast coordinates may be set to the average of the lengths of vectors between the sampled coordinates. More specifically, the length of vector C may be set to the mean value of the lengths of vector A and vector B.

Alternatively, there may be used another method by which the processor calculates the forecast coordinates from vectors connecting together adjacent sampled coordinates of a plurality of sampled coordinates provided in front of the sampled coordinates to be encoded, according to the angles formed between the vectors.

As described above, forecast coordinates which become the relative origin are designated by vector which extends from the previously-sampled coordinates, and the length and orientation of that vector are determined using three or more coordinates sampled immediately before the coordinates to be encoded. As a result, forecasting operations with higher accuracy become feasible, and the encoded data can be reduced. Particularly, even in the case of stroke information about a curve, the amount of encoded data can be reduced by forecasting angles of the curve.

A third embodiment of the present invention will be described. As in the first embodiment, a forecast encoding operation is carried out in the third embodiment, whereby the differences between the forecast coordinates of the coordinates to be sampled and actually-sampled coordinates are encoded. A handwriting input apparatus of the third embodiment also has a configuration as illustrated in the block diagram in FIG. 4, and the flowcharts provided in FIGS. 6 through 8 are applied to this handwriting input apparatus. As in the second embodiment, even in the third embodiment, the coordinate forecasting method used in S106 of the first embodiment, is changed to a method of forecasting coordinates using a plurality of sampled coordinates.

Coordinates are forecast from previously-sampled coordinates, coordinates sampled prior to the previously-sampled coordinates, and coordinates before the coordinates sampled prior to the previously-sampled coordinates (i.e., coordinates sampled before two previously-sampled coordinates), using acceleration.

Figure 17:
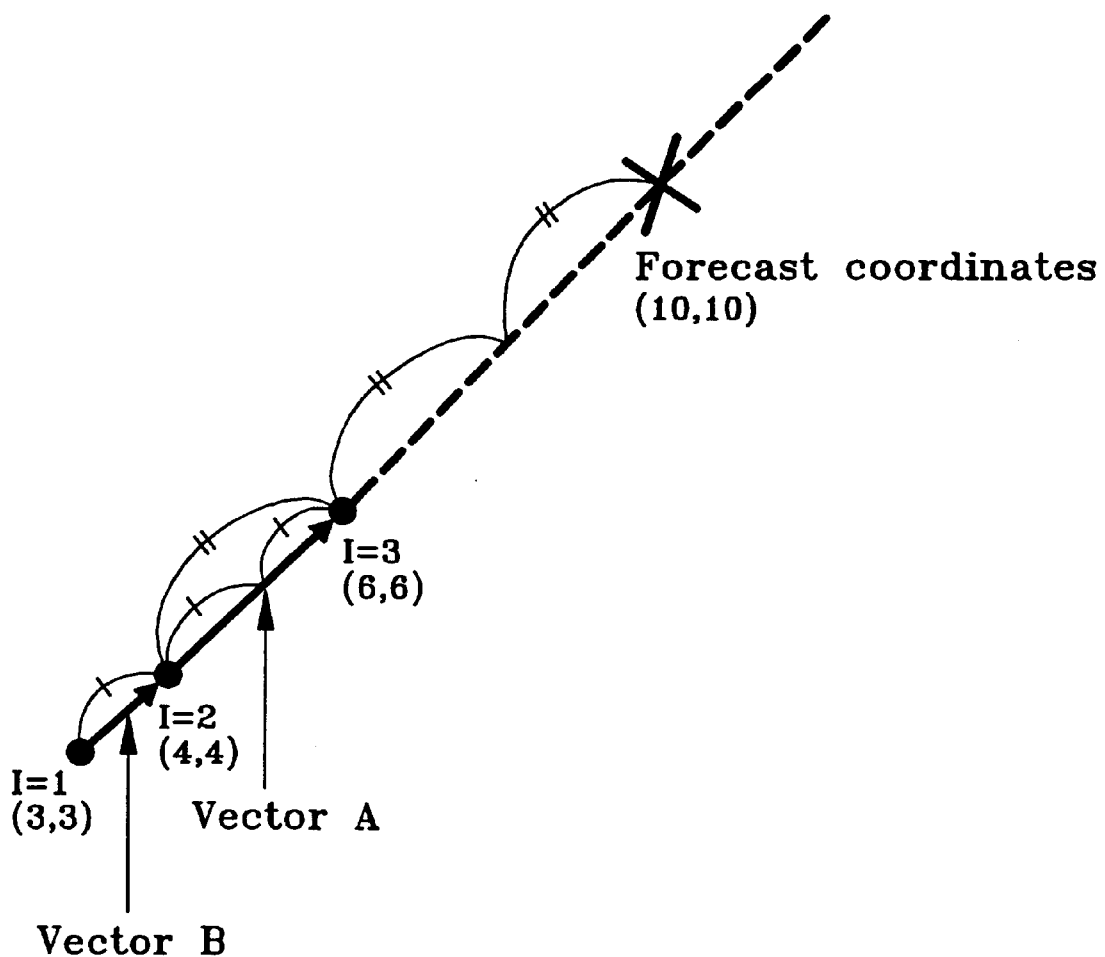
FIG. 17 is a schematic representation for explaining the encoding operations performed by the handwriting input apparatus of the third embodiment.

More specifically, as illustrated in FIG. 17, acceleration α (vector A=acceleration α×vector B) is calculated from vector A between the previously-sampled coordinates and the coordinates sampled prior to the previously-sampled coordinates, and vector B between the coordinates sampled prior to the previously-sampled coordinates and the coordinates sampled before two previously-sampled coordinates. Coordinates are expected to be in line with the extension of vector A and are spaced a distance, which is obtained by multiplying the magnitude of vector A by the acceleration α, away from the previously-sampled coordinates. The calculation of coordinates to be forecast is performed by the forecasting section 52 of the main control section 50 provided in FIG. 4.

In FIG. 17, for instance, provided that first sampled coordinates are (3, 3), second sampled coordinates are (4, 4), and third sampled coordinates are (6, 6), acceleration α is 2. Accordingly, coordinates to be forecast at the time of encoding of fourth sampled coordinates will be (10, 10), as provided in FIG. 17.

In short, the distance between the third sampled coordinates and the fourth sampled coordinates is obtained by multiplying the magnitude of vector A by a ratio of vector A to vector B.

Preparation of encoded data which is carried out during encoding operations after forecasting of the coordinates, as well as decoding of the encoded data, are the same as those of the second embodiment, and hence their explanations will be omitted here. Specifically, with regard to the fourth sampled coordinates, the differences between the forecast coordinates and actually-sampled coordinates are encoded in the encoding operations. Further, the fourth sampled coordinates will be forecast using previously-sampled coordinates, coordinates sampled prior to the previously-sampled coordinates, and coordinates sampled before two previously-sampled coordinates, during decoding operations. The differences between the thus-forecast coordinates and actually-sampled coordinates are decoded.

In the third embodiment, as described above, coordinates to become the relative origin are forecast from previously-sampled coordinates, coordinates sampled prior to the previously-sampled coordinates, and coordinates sampled before two previously-sampled coordinates. Acceleration α (vector A=acceleration α×vector B) is calculated from vector A and vector B. Coordinates are expected to be in line with the extension of vector A and are spaced a distance, which is obtained by multiplying the magnitude of vector A by the acceleration α, away from the previously-sampled coordinates. The differences between the thus-forecast coordinates and actually-sampled coordinates are obtained, whereby the quantity of differences can be reduced. As a result, the amount of encoded data can be reduced. Further, even if a sampling rate becomes slower, and if the distances between sampled coordinates eventually become longer, the quantity of differences can be reduced. Particularly, in the case of information which is input in an accelerated manner, coordinates are forecast on the assumption that the acceleration will be maintained. Therefore, even in the case of stroke information which is input in an accelerated manner, the differences between the previously-sampled coordinates and the coordinates sampled as the relative origin can be reduced. Eventually, the amount of encoded data can be reduced.

Figure 18:
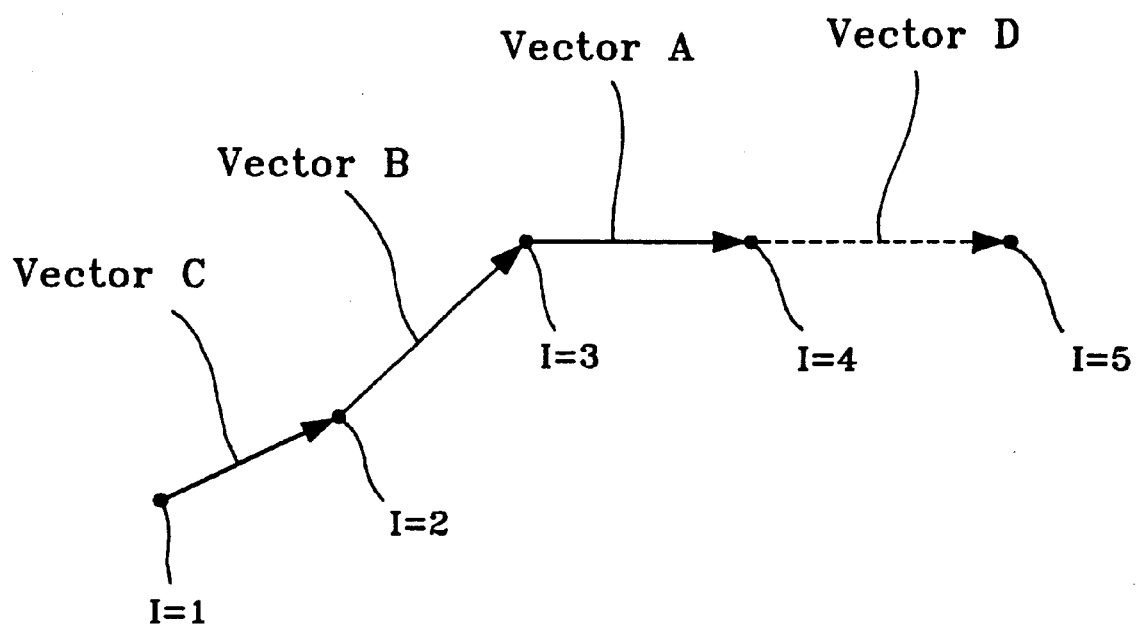
FIG. 18 is a schematic representation for explaining other encoding operations performed by the handwriting input apparatus of the third embodiment

Although coordinates are forecast using three sampled coordinates in the third embodiment, the number of coordinates used in forecasting coordinates is not limited to three. Coordinates can be forecast even by use of a plurality of sampled coordinates. As provided in FIG. 18, where fifth sampled coordinates (I=5) are forecast using four sampled coordinates; namely, first sampled coordinates (I=1) to fourth sampled coordinates (I=4), vector D designating the fifth sampled coordinates is assumed to be in line with the extension of vector A along that direction. The acceleration of the input is set to the mean value of the acceleration from vector C to vector A. More specifically, provided that the magnitude of vector C is "c," the magnitude of vector B is "b," and the magnitude of vector A is "a," the acceleration from vector B to vector A is b/c, and the acceleration from vector B to vector A is a/b. The acceleration of the input is obtained by averaging two acceleration rates.

With regard to the acceleration rate, the upper limit of the vector is previously determined according to a person's writing speed. It is also possible to arrange the handwriting input apparatus so as to change the magnitude of vector to the upper limit if a calculated acceleration rate may exceed the upper limit.

Further, there may be used another method by which coordinates to be forecast are calculated using the magnitude of a plurality of vectors between adjacent sampled-coordinates of a plurality of sampled coordinates positioned in front of the coordinates to be encoded.

As described above, according to the third embodiment, forecast coordinates which become the relative origin are denoted by a vector from the previously-sampled coordinates. The coordinates to be sampled are forecast using the acceleration between the sampled coordinates positioned in front of the coordinates to be forecast. Therefore, the coordinates can be forecast more accurately, and the quantity of differences can be reduced. This in turn makes it possible to reduce the amount of encoded data. Particularly, even if a sampling rate becomes slower, and if the distances between sampled coordinates eventually becomes longer, the quantity of differences can be reduced.

The encoding methods used in the previous embodiments may be used on their own. However, the present invention is not limited to these methods, and coordinate data can be encoded using the previous embodiments in combination.

For example, it is possible to forecast coordinates which are to become the relative origin, as coordinates spaced from the starting point of vector C of the second embodiment by only acceleration α, by combination of the second and third embodiments. The thus-forecast coordinates can be encoded and decoded. In short, as shown in FIG. 15, the acceleration α is calculated from vector A and vector B, and the magnitude of vector C is obtained by multiplying the magnitude of vector A by the thus-calculated acceleration α.

A plurality of items of stroke information can be encoded using a method which is selected, as being capable of minimizing the amount of data, from many forecasting methods, instead of using one forecasting method. In this case, it is preferable to write the forecasting method used in encoding data, into the header of information about one stroke or the header of all encoded data items.

As described above, the forecast coordinates which are to become the relative origin, are forecast by use of various forecasting methods, and the thus-forecast coordinates and actually-sampled coordinates are obtained. Therefore, the quantity of differences can be reduced, which in turn makes it possible to reduce the amount of encoded data. Even if a sampling rate becomes slower, and if the distances between sampled coordinates eventually become longer, the amounts of differences and encoded data can be reduced. Even in the case of information about curved strokes or accelerated strokes, the quantity of differences can be reduced by forecasting the acceleration and angles of the strokes, whereby the amount of encoded data can be reduced.

Encoding and decoding operations of a fourth embodiment will now be described.

Figure 19A:
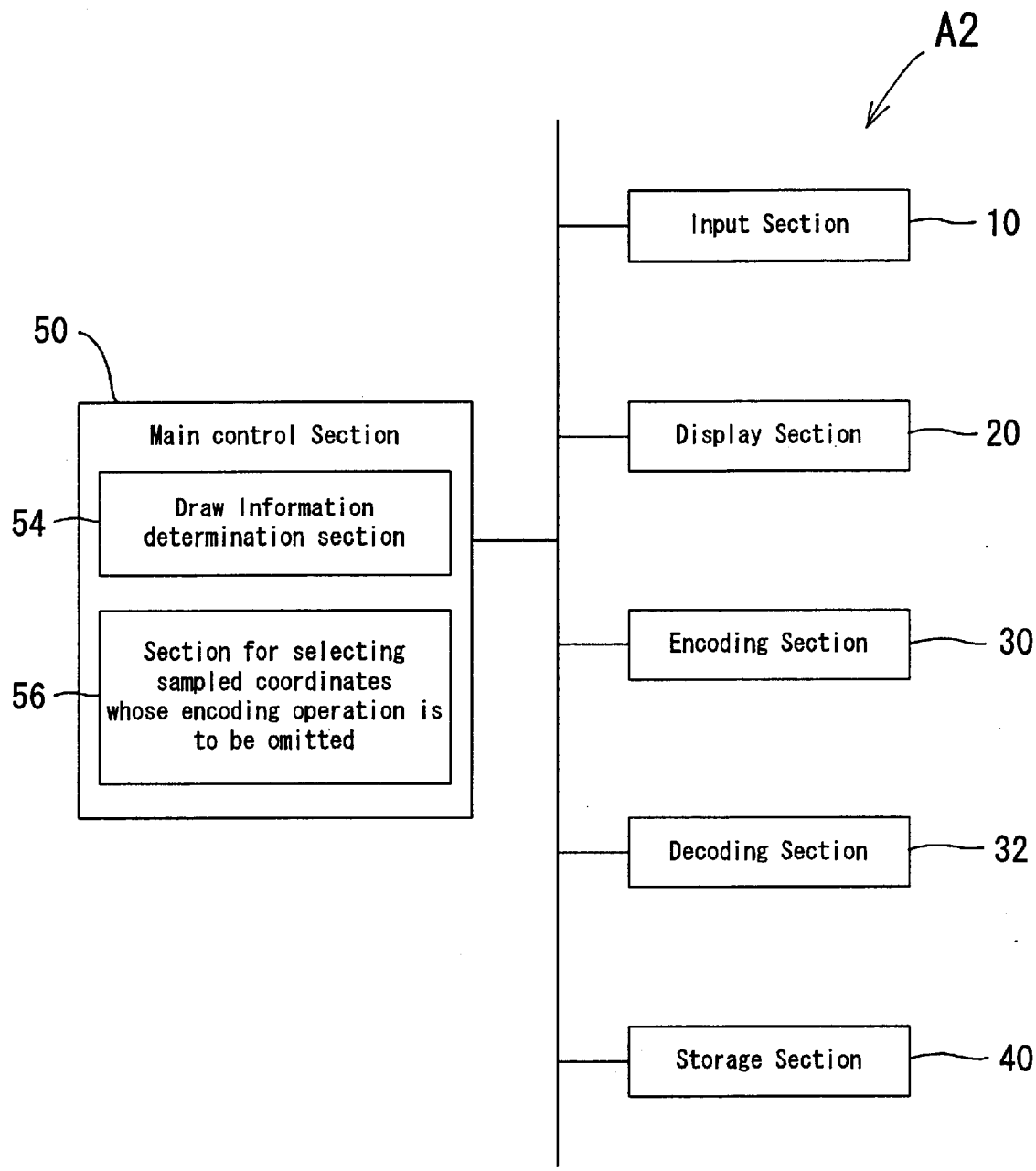
FIG. 19a is a block diagram illustrating a configuration of a handwriting input apparatus of a fourth embodiment.

A handwriting input apparatus A2 of the fourth embodiment provided in FIG. 19a is substantially the same as the handwriting input apparatus A1 provided in FIG. 4. A main control section 50 is provided with a drawing data determination section 54 and a coordinates-to-be-omitted determination section 56. The drawing data determination section 54 determines whether or not there is an overlap between the draw areas of the sampled coordinates and the distance between the sampled coordinates. The coordinates-to-be-omitted determination section 56 determines whether or not encoding of the sampled coordinates is omitted and selects the sampled coordinates whose encoding operations are to be omitted. The other constituent elements provided in FIG. 19a are the same as those of the handwriting input apparatus A1 in FIG. 4, and hence their explanations will be omitted here.

Figure 20:
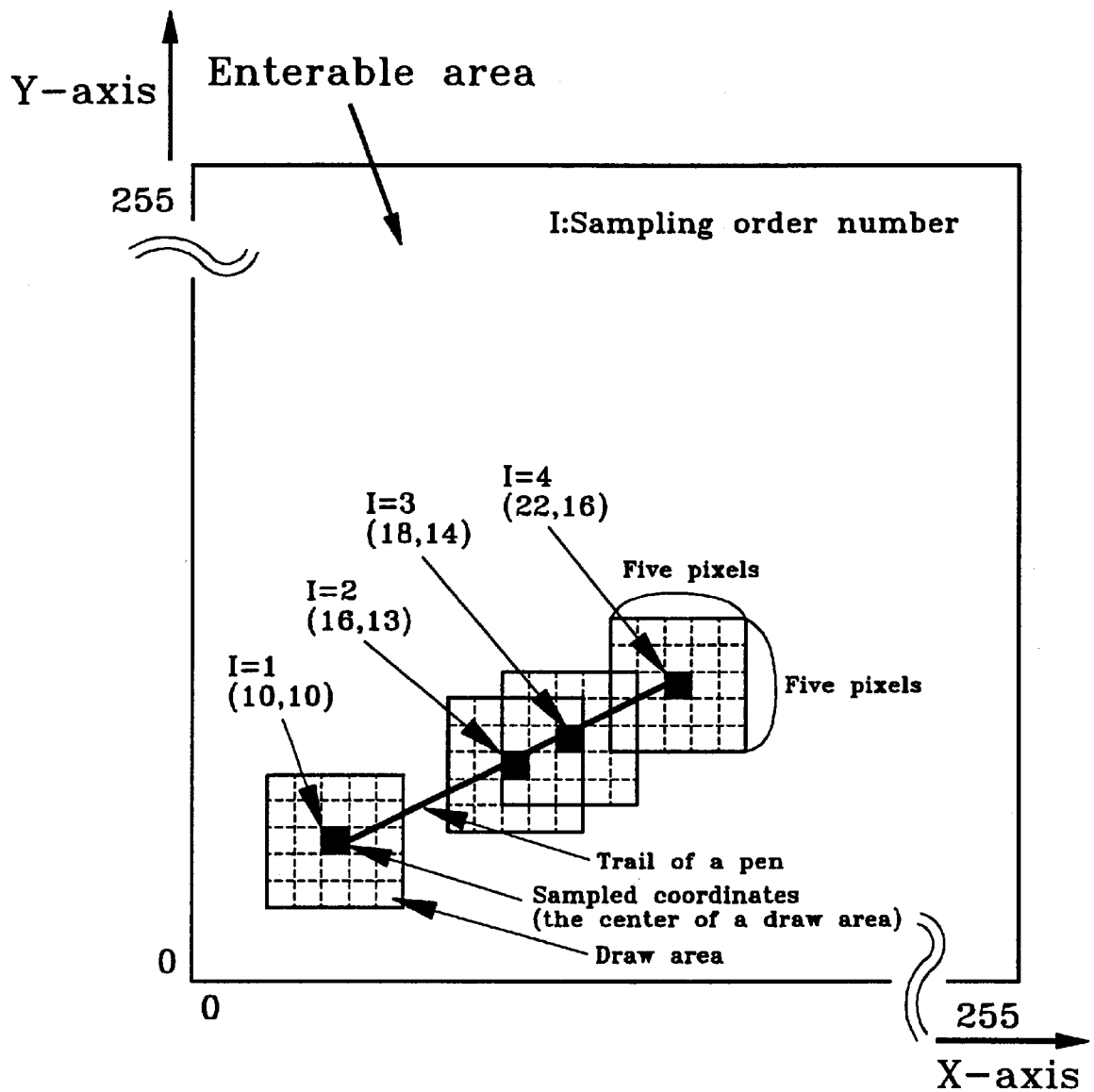
FIG. 20 is a plot for explaining the encoding operations performed by the handwriting input apparatus of the fourth embodiment.

First, the encoding operations of the handwriting input apparatus A2 will be described with reference to a diagrammatic flowchart in FIG. 21. More specifically, the encoding operations will be described with reference to a case where drawing operations as provided in FIG. 20 are carried out. In FIG. 20, the width of a handwritten line is 5×5 pixels.

Input data are analyzed as to whether or not they are sampled coordinates, attribute information, or lift-of-pen information in step 501 (the step will be hereinafter referred to as "S"). The main control section 50 carries out the analysis of the input data and is capable of determining which of them corresponds to the input data using the information received from the input section 10.

If the analyzed data is attribute data, the processing then proceeds to S502; if sampled coordinates, S503; and if lift-of-pen information, S507. The attribute information is arranged so as not to be input while being included in information about one stroke (i.e., I=1 to I=4 in the case provided in FIG. 20). In short, sampled coordinates of the starting points to the end points of the drawing data, and the lift-of-pen information are consecutively input. The following processing is executed by the encoding section 30.

Encoded data previously set for each attribute is allocated to the input attribute information in S502, whereby attribute code data is produced. Throughout the following descriptions, attribution coded data has a 16-bit fixed length.

It is detected in S503 whether the sampled coordinates are the first sampled coordinates (i.e., the coordinates of the starting point) or other sampled coordinates, using a counter. If the sampled coordinates are the first coordinates, the processing then proceeds to S504; or if the other sampled coordinates, S506.

The first sampled coordinates are not subjected to subtraction in S504, and hence the input coordinates (i.e., the absolute values of the input coordinates) are directly encoded. The bit length of the sampled coordinates at that time is determined by the resolution of the input section 10. For example, as illustrated in FIG. 20, if the input section 10 has 256- by 256-pixel resolution, the sampled coordinates have an 8-bit encoded bit length with regard to each of the X-axis and Y-axis. In short, if the first sampled coordinates provided in FIG. 20 are (10, 10), a code for the first sampled coordinates is (0000101000001010).

In S505, it is checked whether or not there is an overlap between a draw area of the first sampled coordinates (I is an integer from 2 to N) for which a determination is made as to whether or not they will be encoded or not and a draw area of the sampled coordinates which have been encoded immediately before the first sampled coordinates. The drawing data determination section 54 performs this check. For instance, if the sampled coordinates before the coordinates for which a determination is made as whether or not they will be encoded (hereinafter referred to as previously-sampled coordinates) have been encoded, it is checked whether or not there is an overlap between the draw area of the previously-sampled coordinates and the draw area of the sampled coordinates for which a determination is made as to whether or not they will be encoded. The overlap between the draw areas is checked by detecting a difference between the sampled coordinates for which a determination is made as to whether or not they will be encoded and the sampled coordinates encoded immediately before the sampled coordinates, and the width of a line. If there is a partial overlap between the draw areas, the coordinates of those draw areas are not encoded but are sent to S501. If there is no overlap between the draw areas, the processing proceeds to S506.

For example, with regard to the second sampled coordinates shown in FIG. 20, the first and second sampled coordinates are (10, 10) and (16, 13). Since there is no overlap between the draw areas of these coordinates, the processing proceeds to step S506, and the second coordinates are encoded. In short, the coordinates-to-be-omitted selection section 56 instructs the encoding section 30 to encode the second sampled coordinates.

In contrast, with regard to the third sampled coordinates (18, 14), there is an overlap between the draw areas of the second and third sampled coordinates, the third sampled coordinates are not encoded but sent to S501. In short, the coordinates-to-be-omitted selection section 56 does not issue an instruction of encoding the third sampled coordinates. The processing returns to S501, and the coordinates-to-be-omitted selection section 56 issues an instruction of processing the coordinates to be sampled subsequently. With regard to the fourth sampled coordinates, there is no overlap between the draw areas of the fourth sampled coordinates and the second sampled coordinates encoded immediately before the fourth sampled coordinates. Therefore, the processing then proceeds to S506.

In S506, the I-th sampled coordinates for which a determination is made as to whether or not they will be encoded (I is an integer from 2 to N) are encoded by the encoding section 30. The differences between the I-th sampled coordinates and the sampled coordinates encoded immediately before the I-th sampled coordinates are encoded.

The encoding operations will be described more detail. The encoding operations can be realized by adding zone code data which is obtained as a result of variable-length encoding of the relationship between the I-th sampled coordinates for which a determination is made as to whether or not they will be encoded and the sampled coordinates encoded immediately before the I-th sampled coordinates, to inside-of-zone address code data.

For instance, encoding of the second sampled coordinates in FIG. 20 will be described. The first sampled coordinates become the relative origin, and the second sampled coordinates are placed at (6, 3) with respect to the first sampled coordinates which act as the relative origin. In short, it is understood that the second coordinates are placed in the first quadrant in FIG. 1 with respect to the relative origin, and therefore the quadrant number of the second coordinates is one. Further, it is seen that the zone number of the second coordinates is five. The first sampled coordinates have quadrant number 1 and zone number 1, and hence the difference between the quadrant numbers is zero, and the differences between the zone numbers is four. Consequently, as seen from FIG. 3, the zone code of the second sampled coordinates is (100010). The code length of the inside-of-zone address is the minimum bit number capable of representing the maximum inside-of-zone address. Therefore, the inside-of-zone address code of the second sampled coordinates having zone number five and the inside-of-zone address (2, 3), is (1011). The code data of the second sampled coordinates is obtained as a result of concatenation of the zone code to the inside-of-zone address; namely, (1000101011).

The coordinates encoded immediately before the fourth sampled coordinates are the second sampled coordinates, and hence the second sampled coordinates serve as the relative origin. The second sampled coordinates are placed at (6, 3) with respect to the fourth sampled coordinates. In short, it is seen that fourth sampled coordinates are placed in the first quadrant in FIG. 1 with respect to the relative origin. Therefore, the quadrant number of the fourth sampled coordinates is one. Further, it is understood from FIG. 2 that the zone number of the fourth sampled coordinates is five. Since the second sampled coordinates have quadrant number 1 and zone number 5, the differences between the quadrant numbers becomes zero, and the differences between the zone numbers becomes zero. Accordingly, as seen from FIG. 3, the zone code of the fourth sampled coordinates is (01). Further, the fourth sampled coordinates has zone number 5 and inside-of-zone address (2, 3), and hence the inside-of-zone address of the fourth sampled coordinates is (1011). The code data of the fourth sampled coordinates is obtained as a result of concatenation of the zone code to the inside-of-zone address; namely, (011011).

The encoding operations are carried out in the way as previously described. In contrast to the previously-described example, if there is an overlap between the draw areas of the fourth and second sampled coordinates, the fourth sampled coordinates will not be encoded. Further, if the zone number does not correspond to any one of the zone numbers provided in FIG. 3, escape-from-zone encoded data (having a 6-bit fixed length) representing that the sampled coordinates are outside of the zone area, is allocated to the fourth sampled coordinates. Subsequently, the absolute values of the sampled coordinates are allocated to the end of the escape-from-zone encoded data as is the case of the first sampled coordinates. Further, if the differences between the I-th sampled coordinates for which a decision is made as to whether or not they are to be encoded and the I-1th sampled coordinates are less than 1 with regard to each of the X and Y components, the I-th sampled coordinates will not be encoded.

Lift-of-pen information which represents the end of input of one-stroke drawing data, is encoded in S507. The thus-entered lift-of-pen information is encoded into (110) having a 3-bit fixed length as designated by PLI provided in the zone code table shown in FIG. 3.

The one-stroke drawing data is encoded by executing a series of operations described above. A plurality of items of stroke information can be encoded by repeating the operations from S501 to S507.

The I-th sampled coordinates are encoded after it has been determined whether or not there is an overlap between the draw areas of the I-th sampled coordinates and the sampled coordinates that are closest to the I-th sampled coordinates and have already been encoded. However, the present invention is not limited to such an encoding operation. For example, it is also possible to encode sampled coordinates even if there is an overlap between the sampled coordinates and the previously-sampled coordinates which have not been encoded yet. In short, if the I-1th sampled coordinates have not been encoded yet, the following I-th sampled coordinates will inevitably be encoded. As described above, the determination as to whether or not coordinates are encoded may be made in several ways.

The sampled coordinates at a later point in chronological order are handled as sampled coordinates which are not encoded if there is an overlap between the draw areas of the sampled coordinates. For instance, in the case of a drawing operation provided in FIG. 20, if there is an overlap between the second and third sampled coordinates, the third sampled coordinates are handled as coordinates which are not subjected to an encoding operation. However, the present invention is not limited to this example. For instance, the sampled coordinates which are not encoded, are selected according to the positional relationship between the sampled coordinates before and after the sampled coordinates. In short, if there is an overlap between the draw areas, encoding of any one of the sampled coordinates may be omitted.

Figure 23:
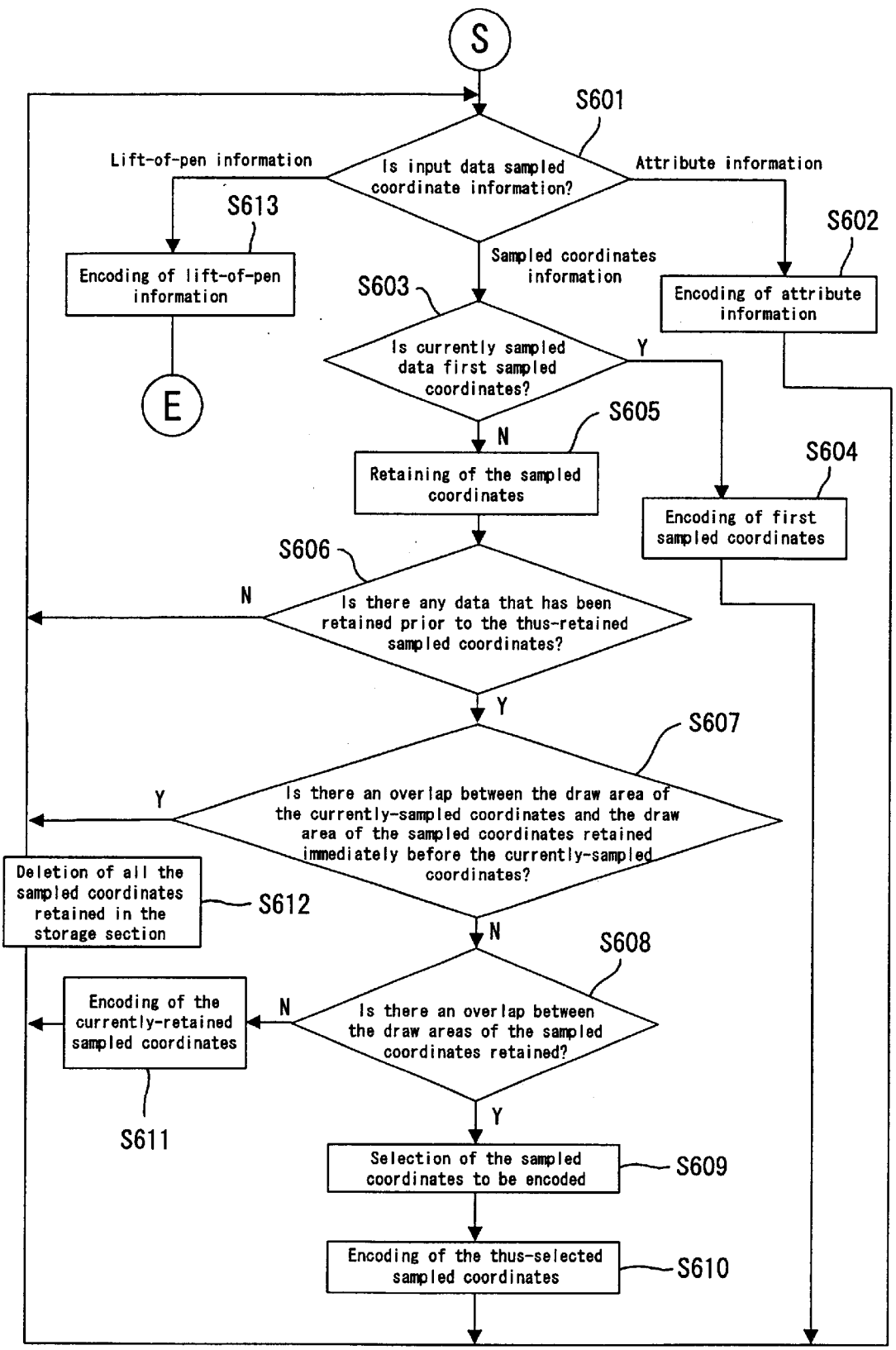
FIG. 23 is a flowchart for illustrating another example of encoding operations performed by the handwriting input apparatus of the fourth embodiment.

A flowchart provided in FIG. 23 illustrates encoding operations carried out in the above-described case. If the input data is not the first sampled coordinates but sampled coordinates, data on the sampled coordinates will be retained first in a storage section (S605). It is then checked whether or not there is other data retained before the thus-retained sampled coordinates (S606). If no sampled coordinates have been retained, the processing returns to the original step. In contrast, if the sampled coordinates have been retained, it is checked whether or not there is an overlap between the draw area of the sampled coordinates and the draw area of the oldest sampled coordinates of all the sampled coordinates retained in the storage section. If there is not any overlap, the processing proceeds to S608, and it is further checked whether or not there is an overlap between the draw areas of the sampled coordinates retained in the storage section. In this case, the sampled coordinates of interest are not taken into account. If there is an overlap between the draw areas, the sampled coordinates to be encoded are selected (S609). The thus-selected sampled coordinates are encoded. In contrast, if it has been determined in S608 that there is not any overlap between the draw areas, all of the sampled coordinates are encoded in S611.

Figure 22A:
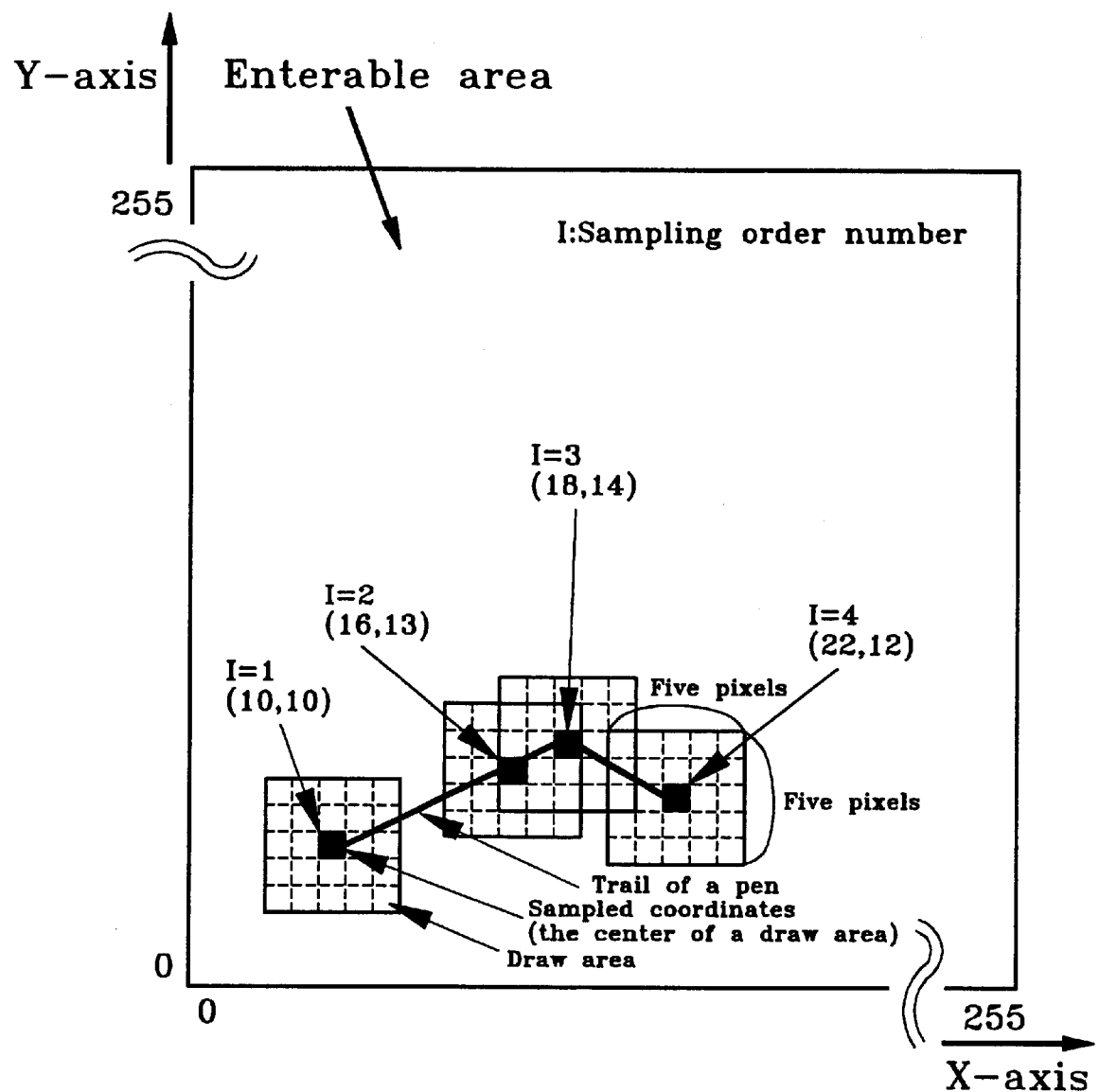
FIG. 22a is a plot for explaining the encoding operations performed by the handwriting input apparatus of the fourth embodiment.

For instance, as illustrated in FIG. 22a, provided that the fourth sampled coordinates are (22, 12), and a curve is drawn between the third and fourth sampled coordinates, the encoding operation will be described with reference to the flowchart provided in FIG. 23. First, data on the second and third sampled coordinates is stored in a storage section 40 in S606. The processing then returns to S601 via S607. If there is not any overlap between the draw areas of the second and fourth sampled coordinates, the processing proceeds from S607 to S608. In contrast, if there is an overlap between the draw areas of the sampled coordinates retained in the storage section 40; namely, the draw areas of the second and third sampled coordinates, the processing then proceeds to S609, and sampled coordinates to be encoded are selected. Then, the thus-selected sampled coordinates are encoded (S610).

Figure 19B:
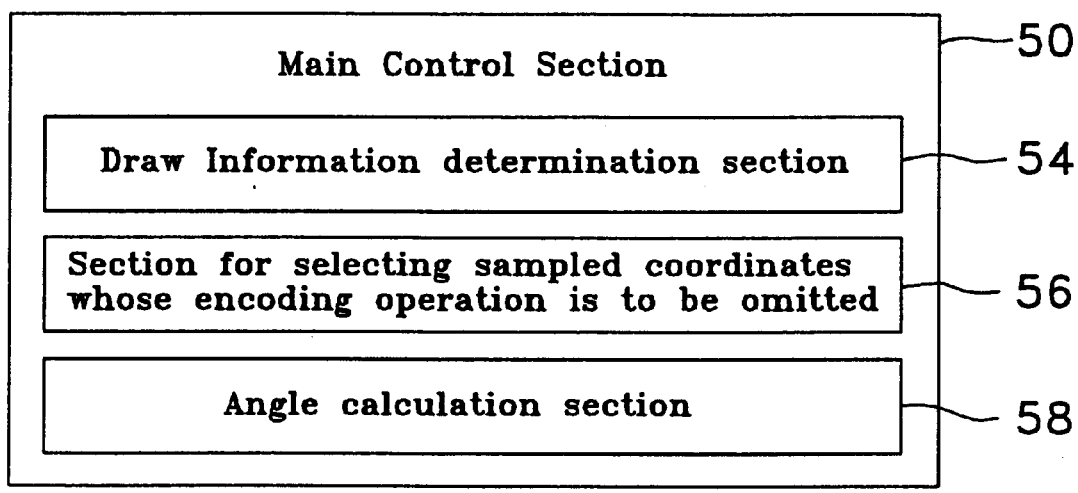
FIG. 19b is a block diagram illustrating another configuration of the main control section.
Figure 22B:
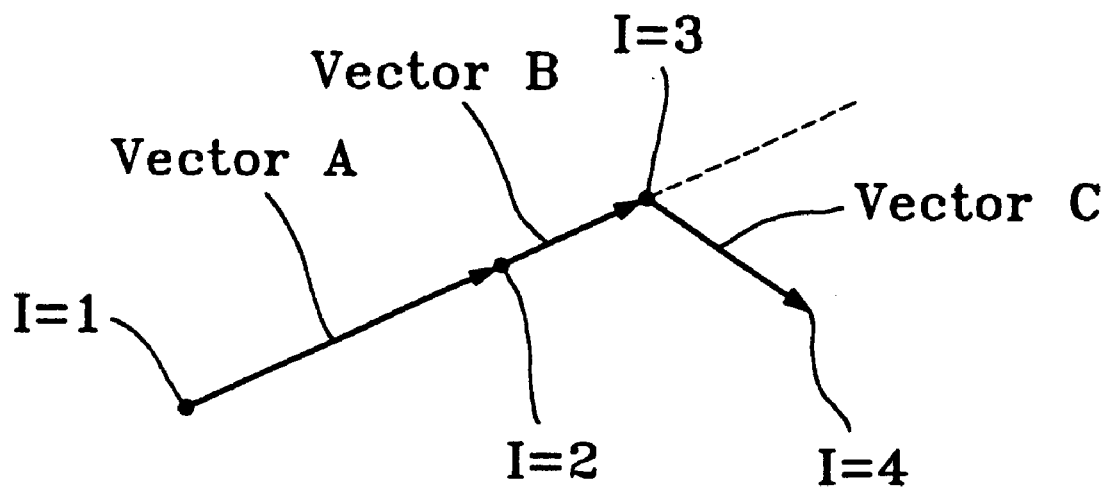

One example of the method of selecting the coordinates to be encoded will be described. As illustrated in FIG. 22b, angle "a" formed between vector A (which connects the first sampled coordinates to the second sampled coordinates) and vector B (which connects the second sampled coordinates to the third sampled coordinates) is calculated. Then, angle "b" formed between vector B and vector C (which connects the third sampled coordinates to the fourth sampled coordinates) is calculated. Since angle "b" is greater than angle "a," encoding of the second sampled coordinates is omitted. In this case, the main control section 50 has a configuration as provided in FIG. 19b. Angles "a" and "b" are calculated by an angle calculation section 58 shown in FIG. 19b. In this way, the characteristics of the drawing can be ensured.

More specifically, with regard to respective sampled coordinates of the plurality of sampled coordinates whose draw areas overlap, an angle formed between a vector (which connects the sampled coordinates to the coordinates sampled immediately before the sampled coordinates) and a vector (which connects the sampled coordinates and the coordinates sampled after the sampled coordinates) is calculated. Then, encoding of the sampled coordinates which have the small angle is omitted. In view of the previously-described operations, the Positional relationship between the second and fourth sampled coordinates located before and after the third sampled coordinates has changed more than the positional relationship between the first and third sampled coordinates located before and after the second sampled coordinates. Hence, it is possible to reduce deficiency errors of the sampled coordinates arising during the course of encoding of the sampled coordinates, by omitting encoding of the second sampled coordinates. More specifically, input information about a handwritten drawing is encoded so that the characteristics of the drawing can be represented when the encoded information is decoded.

Alternatively, if there is an overlap between the draw areas of sampled coordinates, encoding of either of the sampled coordinates may be omitted. In short, encoding of arbitrarily selected sampled coordinates may be omitted. After the encoding operations have been completed, the retaining of the sampled coordinates is canceled (S612).

Further, even if there is an overlap between draw areas of the N-th sampled coordinates (i.e., the finally sampled coordinates) and the coordinates sampled immediately before the N-th sampled coordinates, the N-th sampled coordinates can be encoded. Specifically, to prevent a handwritten character from being imperfectly displayed due to a deficiency of the finally sampled coordinates, it can be made mandatory for the finally sampled coordinates to be encoded.

In the above descriptions, the determination as to whether or not the sampled coordinates are encoded, is based on the determination as to whether or not there is an overlap between the draw area of the sampled coordinates for which a determination is made as to whether or not they will be encoded and the draw area of the coordinates sampled immediately before these sampled coordinates. However, the present invention is not limited to such a determination. The determination as to whether to encode the sampled coordinates may be made on the distance between the sampled coordinates for which a determination is made as to whether or not they will be encoded and the previously-sampled coordinates. For example, a certain threshold value is previously determined. If the distance is below the threshold value, the sampled coordinates will not be encoded. In contrast, if the distance is above the threshold value, the sampled coordinates will be encoded. The threshold value may be set according to the line width of the stroke. For example, it is considered that the threshold value be set to half the line width.

Further, the determination as to whether to encode the sampled coordinates may be made not on the basis of the distance between the sampled coordinates but on the basis of the distance between the draw areas of the sampled coordinates. More specifically, if the distance between the draw area of certain sampled coordinates and the draw area of the sampled coordinates which are to be come the relative origin and have been encoded immediately before the former sampled coordinates, is within a certain range of distance, encoding of the former sampled coordinates is omitted.

Figure 24:
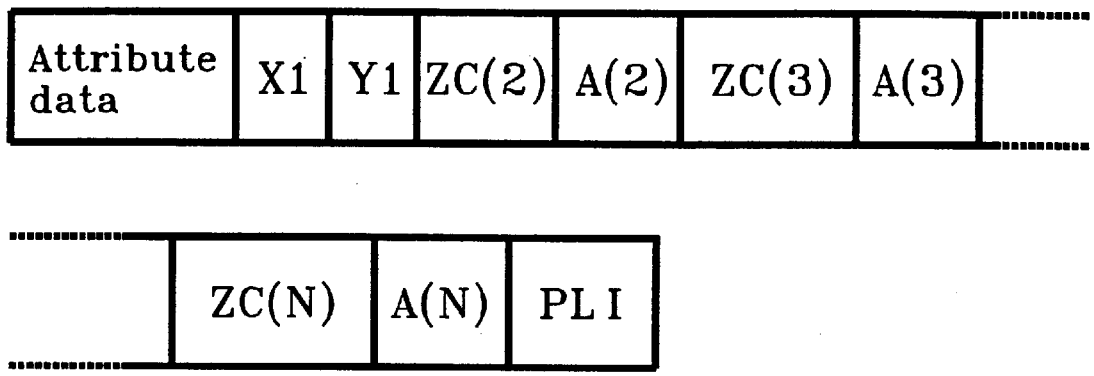
FIG. 24 is a diagrammatic representation illustrating the configuration of a code data sequence of the drawing information.

The encoded data has a code data sequence as provided in FIG. 24. The attribute code data is followed by an X-axis code (X1) of the first sampled coordinates, a Y-axis code (Y1) of the first sampled coordinates, a zone code (ZC(2)) of the second sampled coordinates, and an inside-of-zone address code (A(2)) of the second sampled coordinates. The zone code of the second sampled coordinates is obtained by encoding the differences between the second sampled coordinates and the first sampled coordinates. In the above-described example, (100010) corresponds to the zone code of the second sampled coordinates. Further, (1011) corresponds to the inside-of-zone address of the second sampled coordinates. The inside-of-zone address code of the second sampled coordinates is further followed by a code (EZC(3)) obtained as a result of encoding the differences between the second sampled coordinates and the third sampled coordinates, and an inside-of-zone address (A(3)) of the third sampled coordinates. In the case provided in FIG. 20, data on the third sampled coordinates is omitted. Data on the fourth and later sampled coordinates follows the data on the third sampled coordinates in the same way as do the third sampled coordinates. The lift-of-pen information code (PLI) is positioned at the end of the code data sequence. The data from X1 to PLI corresponds to one stroke. In the case of a plurality of strokes, similar code data sequences are repeatedly produced.

It is not necessary for the attribute code data comprised of encoded attribute information to be positioned at the header of the one-stroke code data sequence.

Figure 25:
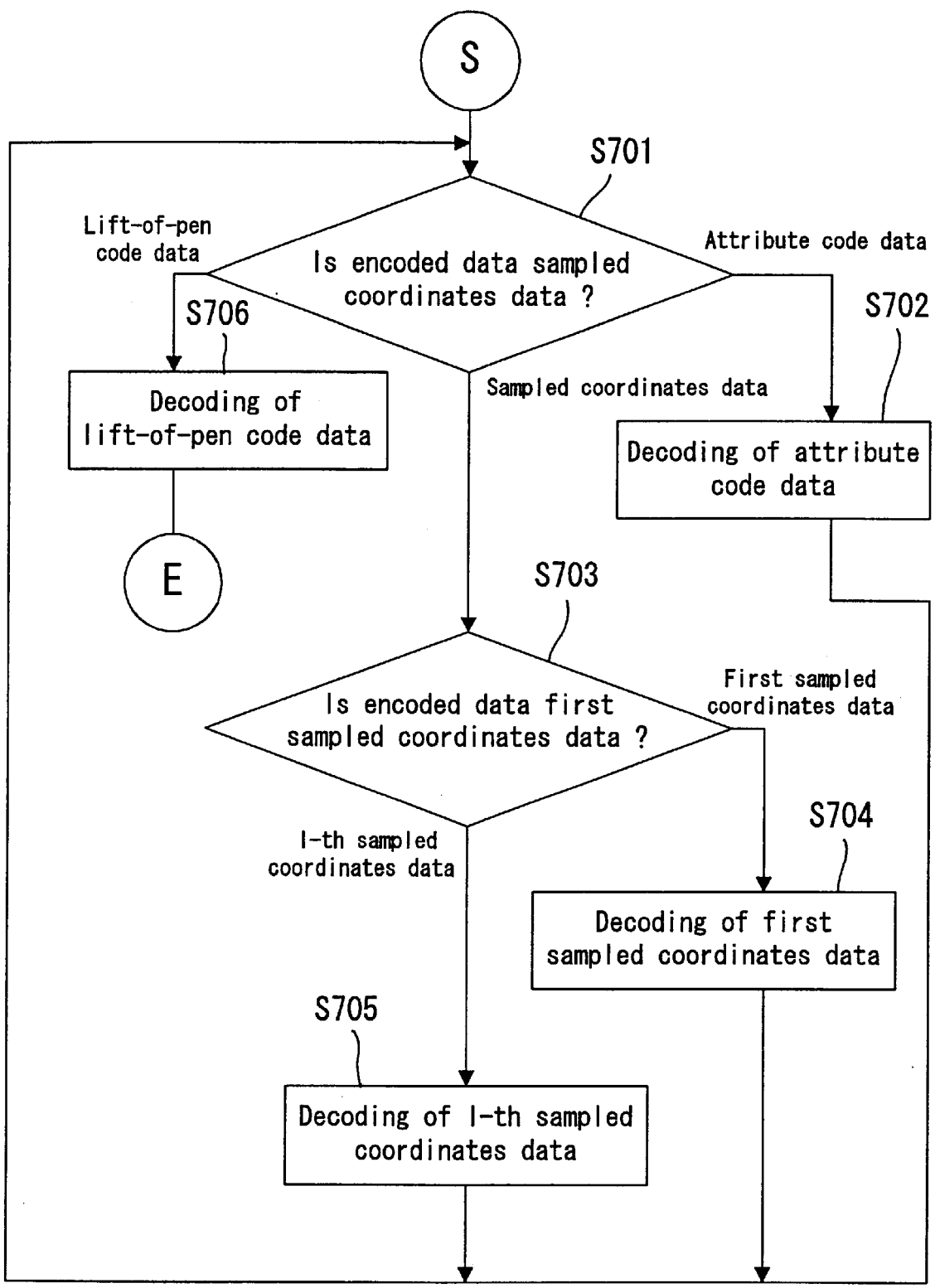
FIG. 25 is a flowchart for illustrating decoding operations performed by the handwriting input apparatus of the fourth embodiment.

With reference to a flowchart provided in FIG. 25, a decoding operation (an expansion) operation will be described. Encoded data is read in S701 and is analyzed as to whether or not the first 16 bits of unanalyzed encoded data match up to the attribute code data (having a 16-bit fixed length). If there is a match between the data, the processing then proceeds to S702. If there is no match between the data, it is further analyzed as to whether or not the first 3 bits of the unanalyzed encoded data match up to the encoded data (having a 3-bit fixed length) of the lift-of-pen information. If there is a match between the data, the processing proceeds to S706. If there is no match between the data, the unanalyzed encoded data is interpreted as encoded data of the sampled coordinates. Then, the processing proceeds to S703. The processing carried out in S701 is executed by the main control section 50. The decoding section 32 performs the following processing.

The attribute code data is decoded into attribute information in S702, whereby the first 16 bits of the encoded data becomes analyzed code data. As a result, the unanalyzed next code data comes to the header of the code data sequence.

Using a counter, it is detected in S703 whether the unanalyzed decoded data is related to the first sampled coordinates or the I-th sampled coordinates. If the decoded data is related to the first sampled coordinates, the processing will proceed to S704; or if it is related to the I-th sampled coordinates, S705.

The first sampled coordinates are decoded in S704. In the above-described case, the resolution is 256- by 256-pixels, and therefore the first sampled coordinates have an 8-bit length with regard to each of the X-axis and the Y-axis. As a result, the first 16 bits of the unanalyzed decoded data are used as the absolute values of the first sampled coordinates, and the unanalyzed next code data comes to the header of the code data sequence.

The I-th sampled coordinates are decoded in S705. The unanalyzed code data is analyzed in order from its header as to which of the zone code data provided in FIG. 3 corresponds to the data now being analyzed. In the case of the second sampled coordinates provided in FIG. 20, the unanalyzed code data (i.e., the code data of the second sampled coordinates) is analyzed in order from its header, and the following code data is also analyzed. The code data of the second sampled coordinates is (1000101011), and hence it can be understood that the first six bits match up with zone code number 15 in FIG. 3. Therefore, the first six bits of the second sampled coordinates are determined to be a zone code. From zone code number 15, it is determined that the second coordinates are positioned in the first quadrant with respect to the first sampled coordinates and have zone number 5. The zone number 5 is represented by two bits with regard to each of the X-axis and the Y-axis. Therefore, four bits following the zone code data are analyzed. As a result, it is determined that the inside-of-zone address is (2, 3). It is determined that the second coordinates are positioned in the first quadrant with respect to the first sampled coordinates and is positioned in the fifth zone number. Consequently, it is determined that the second sampled coordinates are positioned at coordinates (2, 3) in the fifth zone area; namely, (16, 13). Eventually, six bits of the zone code data and four bits of the inside-of-zone address data are analyzed. The unanalyzed next code data comes to the header of the unanalyzed code data sequence.

In the case of the fourth sampled coordinates provided in FIG. 20, the code data is (011011), and hence it is understood that the first two bits of the code data match up to zone code number 1 provided in FIG. 3. For this reason, it is determined that the first two bits of the code data are a zone code. From code number 1, it is determined that the fourth sampled coordinates are positioned in the first quadrant with respect to the second sampled coordinates and have zone number five. The zone number five can be represented by two bits in each of the X-axis and Y-axis, and hence four bits following the zone code data are analyzed. As a result of such analysis, it is seen that the inside-of-zone address of the fourth sampled coordinates is (2, 3). Therefore, the fourth sampled coordinates are positioned in the first quadrant and the fifth zone with respect to the second sampled coordinates. The fourth sampled coordinates are located at (2, 3) in the fifth zone; namely, (22, 16).

During the foregoing decoding operations, the third sampled coordinates are not encoded and therefore they are not later decoded. As a result, the second and fourth sampled coordinates are displayed while they are connected together. Compared to actually input information, the resultantly decoded information is deficient in the third sampled coordinates. However, the line width of the stroke is large, and there is an overlap between the draw areas of the second and fourth sampled coordinates. Therefore, even if decoded information is deficient in the data, no problems arise in a final display.

The lift-of-pen code data is decoded into lift-of-pen information in S706.

The drawing data corresponding to one stroke has been decoded through a series of the foregoing processing operations. If data on a plurality of strokes can be decoded, the processing from S701 to S706 is repeated.

As has been described above, according to the stroke information encoding method of the fourth embodiment, if there is only a partial overlap between draw areas of sampled coordinates A (for which a determination is made as to whether or not they will be encoded) and sampled coordinates B (which have been encoded immediately before the sampled coordinates A), the sampled coordinates A will not be encoded. Consequently, encoded data of the sampled coordinates to be overwritten are prevented from being produced, and hence the amount of encoded data can be reduced.

It is also possible to prevent sampled coordinates from being encoded if an overlapping draw area of the sampled coordinates is in excess of a certain reference value (e.g., an overlapping area of more than 50%).

Encoding and decoding operations of a fifth embodiment will be described hereinbelow.

Figure 26:
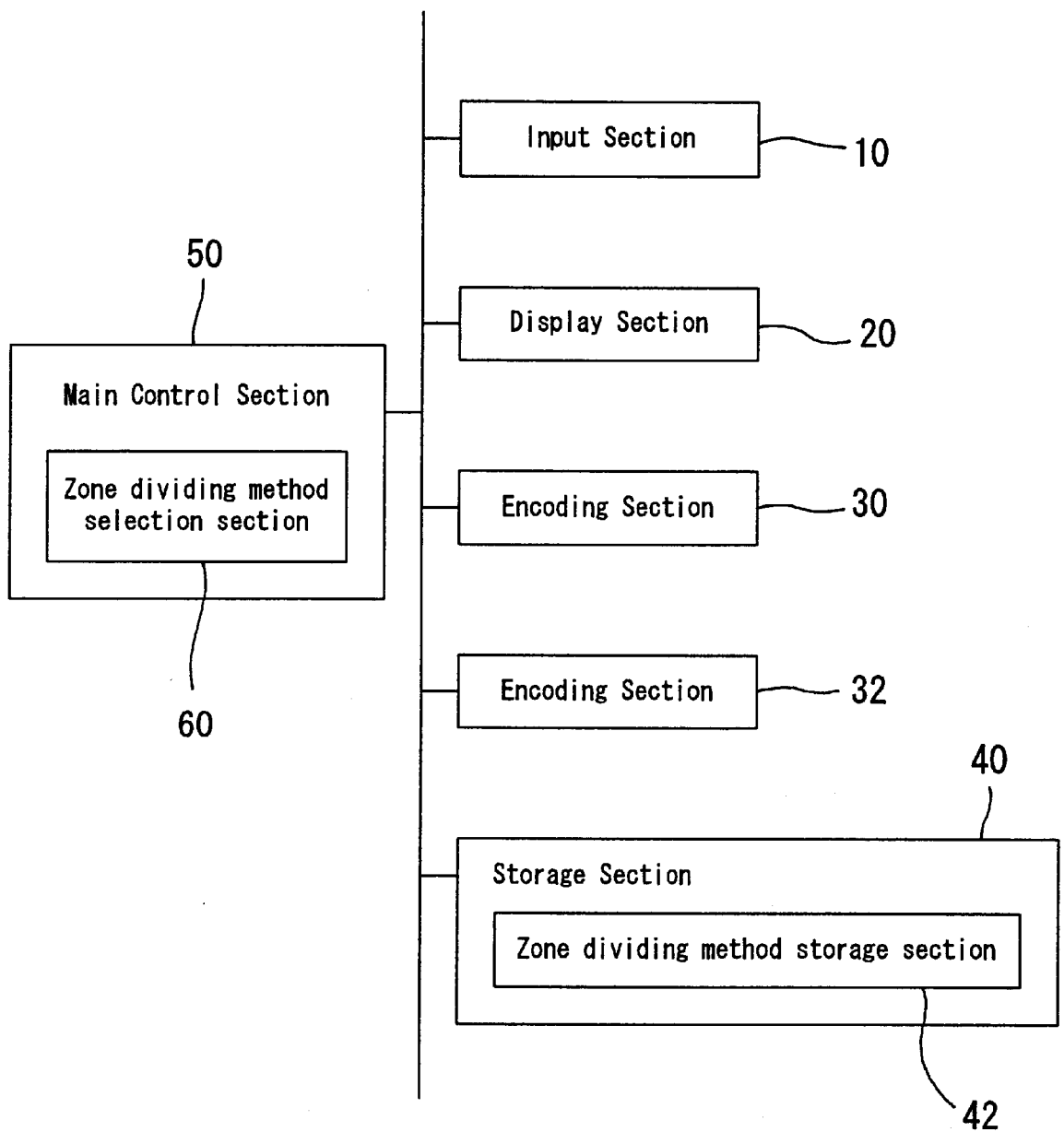
FIG. 26 is a block diagram illustrating the configuration of the handwriting input apparatus of the fifth and sixth embodiments.

A handwriting input apparatus A3 of the fifth embodiment as illustrated in FIG. 26 is substantially the same as the handwriting input apparatus A1 with regard to configuration. A storage section 40 is provided with a zone dividing method storage section 42. Methods of dividing a zone and of designating a zone number (hereinafter referred to as a "zone dividing method") designated by FIG. 27 and so forth, are stored in the zone dividing method storage section 42. The main control section 50 is provided with a zone dividing method selection section 60. This zone dividing method selection section 60 selects the zone dividing method. In other respects, the handwriting input apparatus provided in FIG. 25 is the same as the handwriting input apparatus A1 provided in FIG. 4, and hence its explanation will be omitted here.

Figure 27:
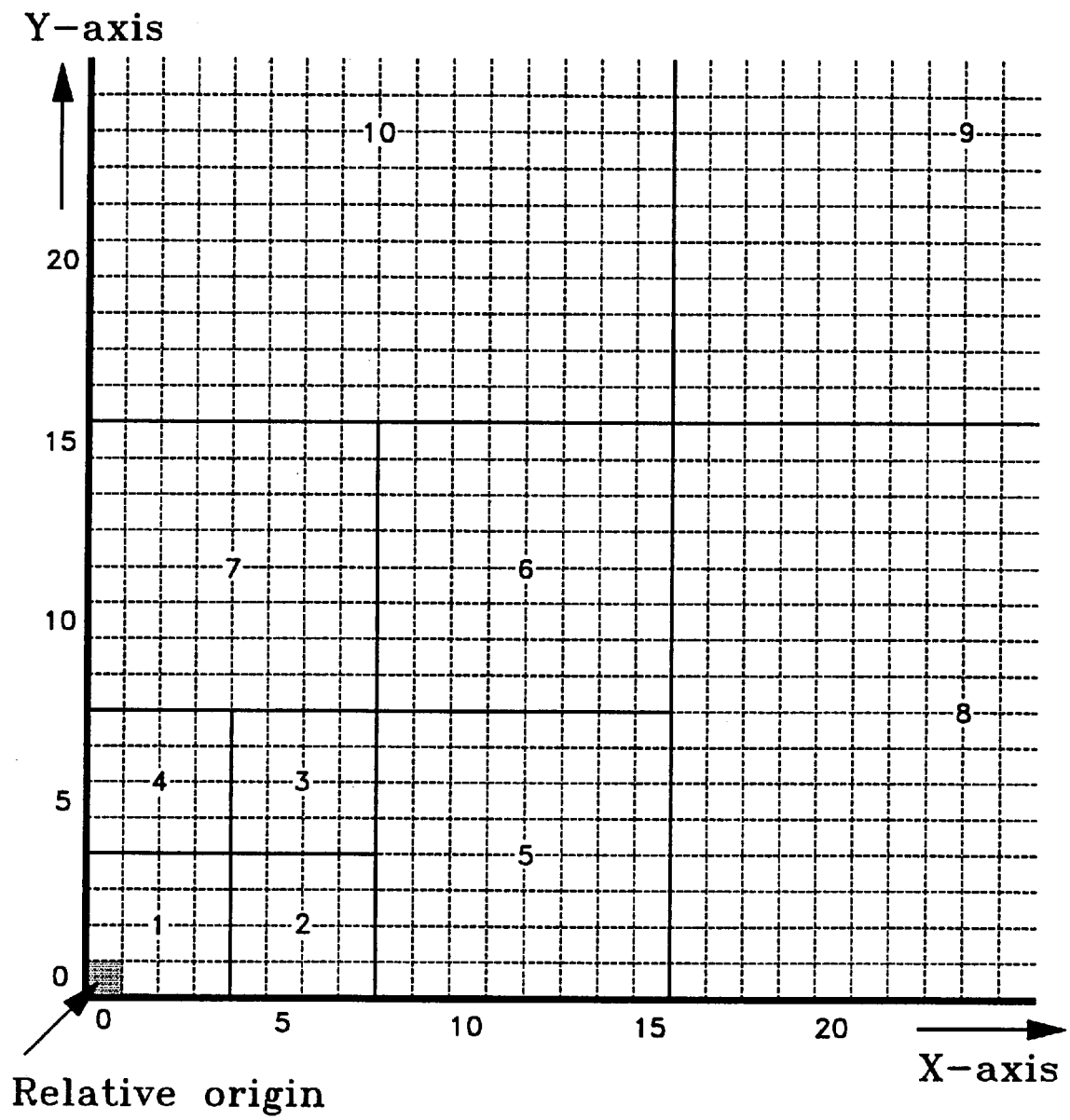
FIG. 27 is a plot illustrating a zone dividing method and a zone number designation method" of the fifth embodiment.

First, encoding operations will be described. The processing that is substantially the same as that of the fourth embodiment represented by the flowchart in FIG. 21, is carried out in the fifth embodiment. In contrast to the fourth embodiment, no determination is carried out as to whether or not there is an overlap between draw areas of the sampled coordinates carried out in S505. The encoding of the inside-of-zone address carried out in S506 is changed, and there is used the zone dividing method which is different from the method used in the fourth embodiment. In short, the zone dividing method provided in FIG. 2 is applied to the fourth embodiment, whereas a zone dividing method provided in FIG. 27 is applied to the fifth embodiment. As can be seen from the subroutine for S506 illustrated in FIG. 28, the I-th sampled coordinates are encoded using the zone dividing method illustrated in FIG. 27 (S801). According to the zone dividing method illustrated in FIG. 27, the compartment of each zone number is twice as large as that illustrated in FIG. 2. Further, the number of pixels in the X and Y directions of each zone compartment is twice the number of pixels provided in FIG. 2. The zone dividing method is stored in the zone dividing method storage section 42.

Figure 29:
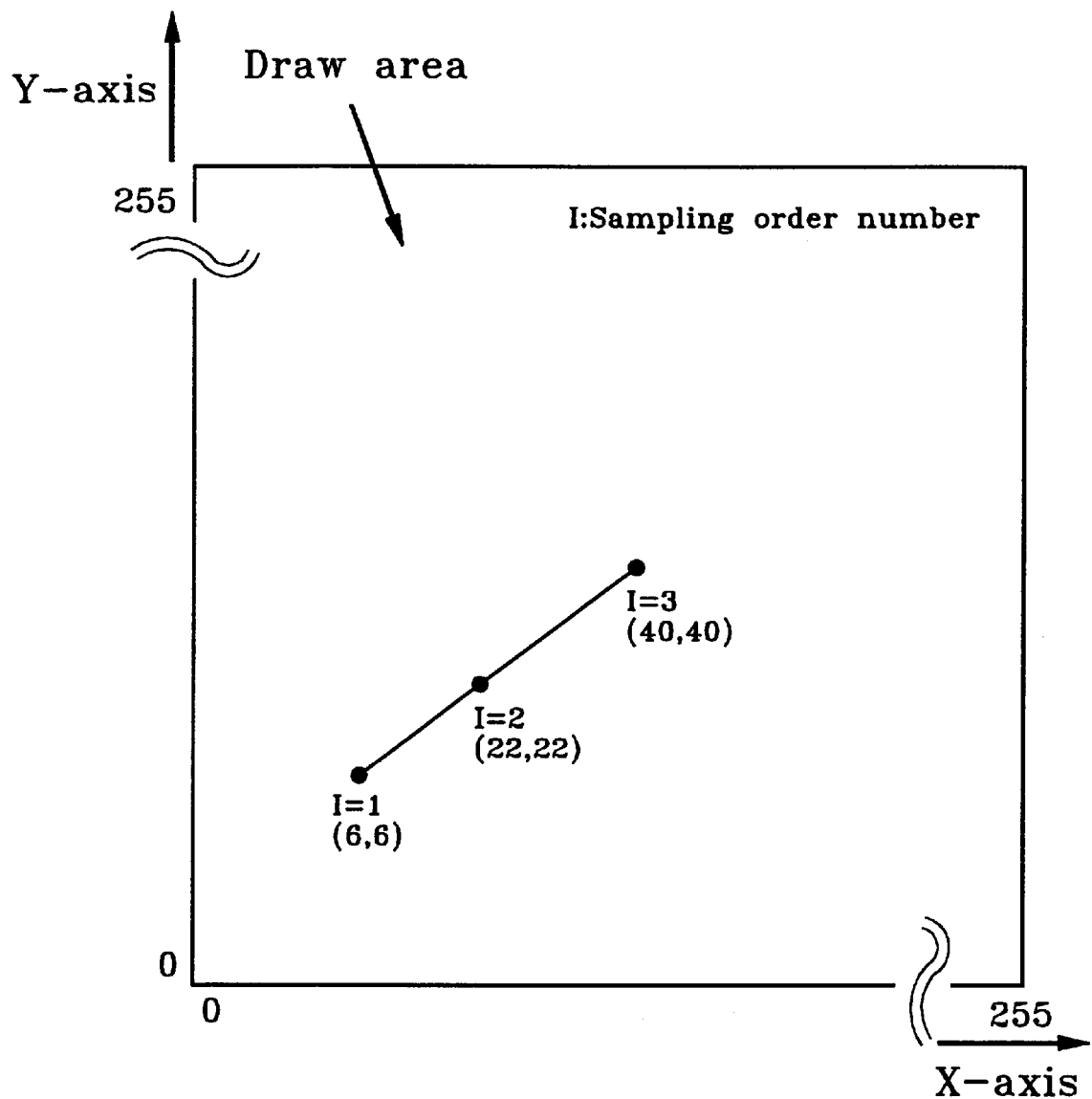
FIG. 29 is a plot for explaining encoding operations performed by the handwriting input apparatus of the fifth embodiment.

A specific encoding method will be described using stroke drawing data characterized by large intervals between sampled coordinates as illustrated in FIG. 29.

For instance, as illustrated in FIG. 29, the following results will be obtained if the zone dividing method provided in FIG. 2 is applied to a drawing operation on the assumption that the first sampled coordinates are (6, 6), the second sampled coordinates are (22, 22), and the third sampled coordinates are (40, 40).

The third sampled coordinates are located on (18, 18) with respect to the second sampled coordinates and in the first quadrant. According to the zone dividing method provided in FIG. 2, the third sampled coordinates will be outside of the zone area. Therefore, the zone code of the third sampled coordinates becomes (00001000101000000101000) resulting from concatenation of the escape-of-zone code data (000010) to the absolute values of the third sampled coordinates.

However, if the zone dividing method provided in FIG. 27 is applied to this case as is in the fifth embodiment, the third sampled coordinates are positioned in the first quadrant and zone number nine with respect to the second sampled coordinates by virtue of the zone dividing method that uses the zone compartment twice as large as that of the method provided in FIG. 2. Therefore, the difference between the quadrant number of the second sampled coordinates and the quadrant number of the third embodiment becomes zero. Provided that the first sampled coordinates are the relative origin, the zone number of the second coordinates is nine. The difference between zone number 9 of the second sampled coordinates and zone number 9 of the third sampled coordinates becomes zero. Consequently, the zone code of the third sampled coordinates provided in FIGS. 10a and 10b is (01). Further, the inside-of-zone address of the third sampled coordinates is (2, 2). Zone number 9 can be represented as four bits, and therefore the inside-of-zone address of the third sampled coordinates is (00100010). Therefore, the third sampled coordinates result in (0100100010) by concatenation of the zone code to the inside-of-zone address.

As described above, the number of pixels of each zone compartment is increased in the fifth embodiment, thereby increasing the area of the zone compartment. In consequence, the risk of escape of the sampled coordinates from the zone area is reduced, which in turn makes it possible to reduce the amount of encoded data.

Next, the decoding operations of the handwriting input apparatus A3 of the fifth embodiment will be described. In the fifth embodiment, decoding operations are carried out in substantially the same way as in the first embodiment according to the flowchart provided in FIG. 25. More specifically, if the encoded data is sampled coordinates, it is checked whether the encoded data is the first sampled coordinates or the second or later sampled coordinates. If the encoded data is the first sampled coordinates, the absolute values of the sampled coordinates are decoded. In contrast, if the encoded data is the second or later sampled coordinates, the zone code and the inside-of-zone address of the encoded data are analyzed, and the sampled coordinates are decoded.

If the sampled coordinates are encoded using the zone dividing method provided in FIG. 27, the decoding section 32 decodes the encoded data according to that zone dividing method.

In the fifth embodiment, the number of pixels of each zone compartment in its X and Y directions is increased to twice the number of pixels of the zone compartment in the first embodiment. However, the present invention is not limited to this case. The number of pixels of each compartment in its X and Y directions can be increased n-fold ("n" is an integer of more than three).

Figure 30:
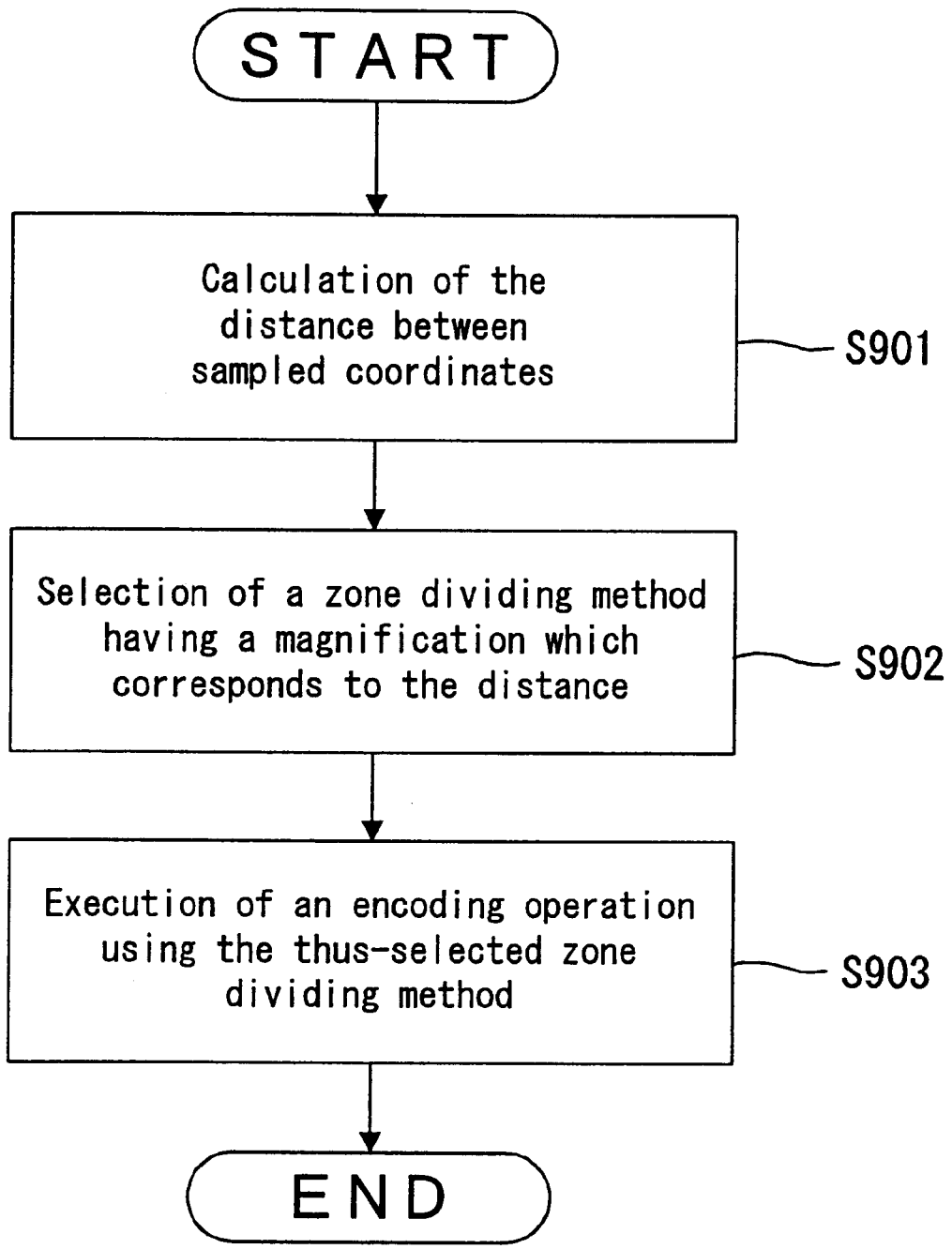
FIG. 30 is a flowchart illustrating a subroutine provided in FIG. 21.

It is also possible to provide a plurality of zone dividing methods, each of which has a different magnification. A zone dividing method may be selected from the plurality of zone dividing methods according to the distance between the sampled coordinates to be encoded and the sampled coordinates which become the relative origin of the sampled coordinates to be encoded. In this case, the zone dividing method selection section 60 selects the zone dividing method. The selection of a zone dividing method will be described. As illustrated in FIG. 30 which provides the subroutine for S506 in FIG. 21, the distance between sampled coordinates is calculated (S901), and a zone dividing method corresponding to the distance is selected (S902). The sampled coordinates are encoded using the thus-selected zone dividing method (S903). In this case, as the distance between the sampled coordinates to be encoded and the sampled coordinates which become the relative origin of the sampled coordinates to be encoded, increases, the zone dividing method having a larger magnification is applied to the encoding of the sampled coordinates. For example, in the case of a certain handwritten input, a period of a certain stroke from its starting point to the end point is encoded using a zone dividing method having a certain magnification, whereas a period of another certain stroke from its starting point to the end point is encoded using a zone dividing method having another magnification. In this case, the zone dividing methods used in encoding the sampled coordinates should be written into the header of a data sequence.

As described above, according to the stroke information encoding method of the fifth embodiment, sampled coordinates which would be outside of the zone area according to the ordinary zone dividing method, can be encoded. As a result, the amount of data can be reduced. If the sampling rate is slow, or if the stroke speed is fast, the number of sampled coordinates of input drawing data will increase. As a result, sampled coordinates are frequently determined to be outside of the zone area according to the zone dividing method provided in FIG. 2. Even in such a case, according to the fifth embodiment, the sampled coordinates are encoded using a zone area having a larger number of pixels in each of the X and Y directions. Therefore, the amount of encoded data can be easily reduced. Further, if several zone dividing methods, each of which has a different magnification and is differently sized, are previously determined, a zone dividing method is selected from these zone dividing methods according to the distance between the sampled coordinates to be encoded and the sampled coordinates which become the relative origin of the sampled coordinates to be encoded. As a result, the sampled coordinates can be encoded according to the distance. More specifically, as the distance increases, a zone dividing method having a larger magnification is applied to the encoding of the sampled coordinates.

Although the fifth embodiment has been described with reference to the case where sampled coordinates of the input drawing data characterized by large intervals between sampled coordinates, are encoded using the large-sized zone area, the present invention can be applied to information representing a drawing having a large line width.

If the line width of the stroke becomes large, the difference between the sampled coordinates becomes apt to increase. However, according to the zone dividing method as provided in FIG. 27, the sampled coordinates are prevented from escaping from the zone area, and hence the amount of encoded data can be reduced.

Figure 31:
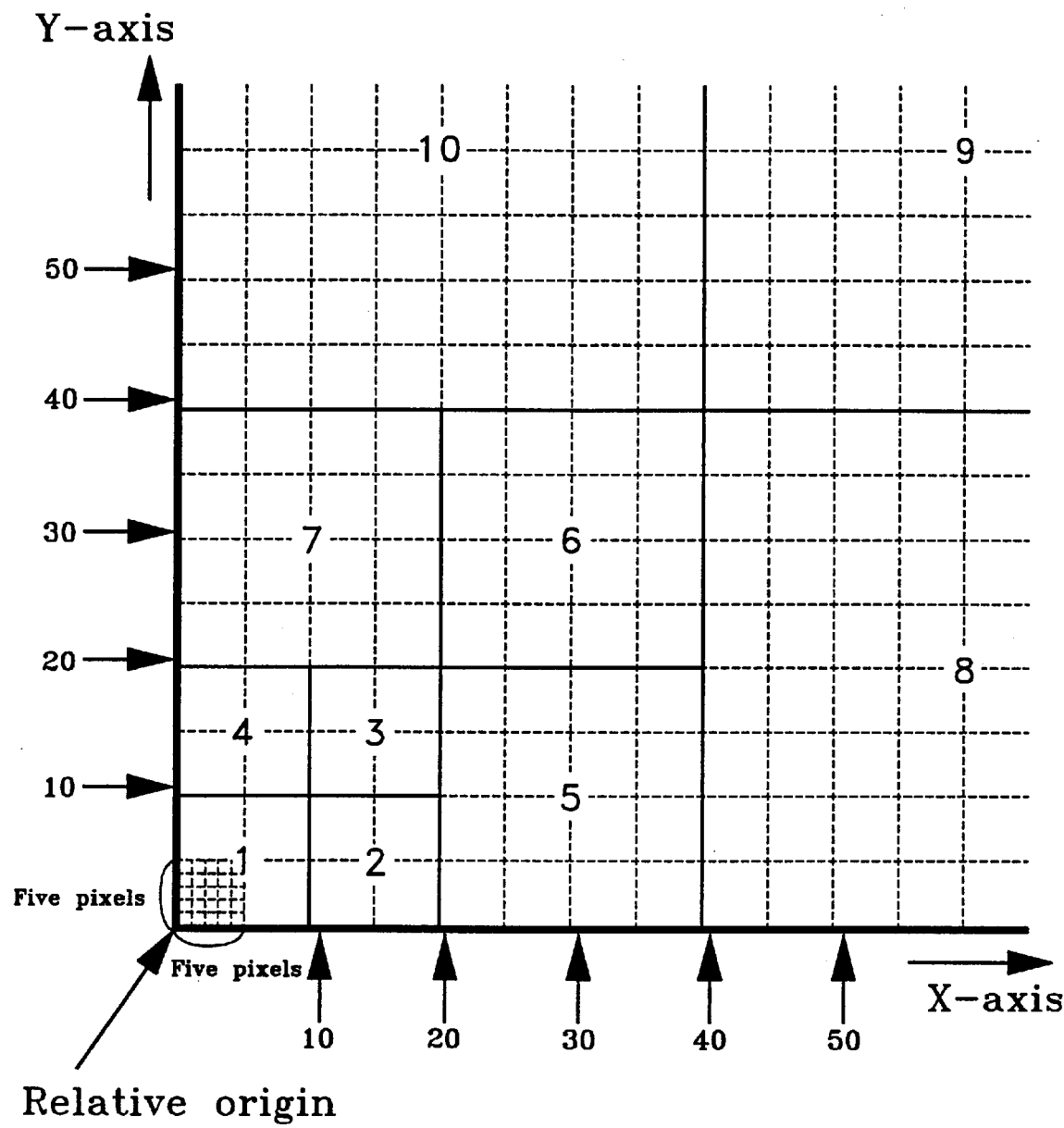
FIG. 31 is a plot illustrating another zone dividing method and another zone designation method of the fifth embodiment.

The scale of zone compartment; namely, the scale of pixels of each zone compartment in the X and Y directions, is determined according to the line width. For instance, the zone dividing method provided in FIG. 27 is applied to a stroke having a line width of 2×2 pixels. In contrast, where information about a stroke having a line width of 5×5 pixels is encoded, there is used a zone compartment as provided in FIG. 31 which is five times as large as that of the zone compartment provided in FIG. 2. In short, as the line width increases, the magnification is increased.

As described above, sampled coordinates are encoded using a zone dividing method which has a zone area corresponding to a line width. Therefore, the sampled coordinates are prevented from escaping from the zone area, which in turn makes it possible to reduce the amount of encoded data.

Although the magnification which is the same as the line width is used in the fifth embodiment, the present invention is not limited to this.

If information about strokes having various thicknesses is encoded, zone dividing methods having zone areas corresponding to the thicknesses may be selected, and sampled coordinates may be encoded using the thus-selected zone areas. For instance, in the case of certain handwritten input, a certain stroke from its starting to end points is encoded using a zone dividing method having a certain magnification, and another stroke from its starting to end points is encoded using a zone dividing method having another magnification. In this case, the zone dividing methods used in encoding the sampled coordinates should be written into the header of a data sequence. The zone dividing method is selected by the zone dividing method selection section 60. The zone dividing method may be selected by the zone dividing method selection section 60 by means of designation of the line width from the input section 10 or of automatic detection of the line width of stroke information.

When the encoded data is decoded, the zone dividing method selection section 60 selects the zone dividing method used in the encoding operations, and the decoding section 32 decodes the data using the thus-selected zone dividing method. More specifically, data on the zone dividing method used in encoding hand writing input information is stored in the code data, and the encoded data is decoded according to this data.

Although the fifth embodiment has been described with reference to the case where the zone area has the same number of pixels in the X and Y directions, a zone dividing method, as provided in FIG. 32 and characterized by a laterally-elongated zone area, may be used in the case of stroke information characterized by the laterally-increased distance between sampled coordinates. As a result, sampled coordinates become less likely to escape from the zone area. Therefore, the amount of encoded data can be efficiently reduced. Further, in the case of stroke information characterized by the longitudinally-increased distance between sampled coordinates, a zone dividing method, as provided in FIG. 33 and characterized by a longitudinally-elongated zone area, may be used in encoding sampled coordinates. As a result, the amount of encoded data can be reduced more efficiently.

Consequently, given that there are provided a plurality of zone dividing methods, each of which has a different number of pixels in the X direction and a zone area which is differently sized in the X direction, a zone dividing method to be applied is selected from these zone dividing methods, according to the distance between the sampled coordinates to be encoded and the sampled coordinates which become the relative origin of the sampled coordinates to be encoded. As a result, the sampled coordinates can be suitably encoded according to the distance.

Moreover, given that there are provided a plurality of zone dividing methods, each of which has a different number of pixels in the Y direction and a zone area which is differently sized in the Y direction, a suitable zone dividing method will be applied.

Figure 32:
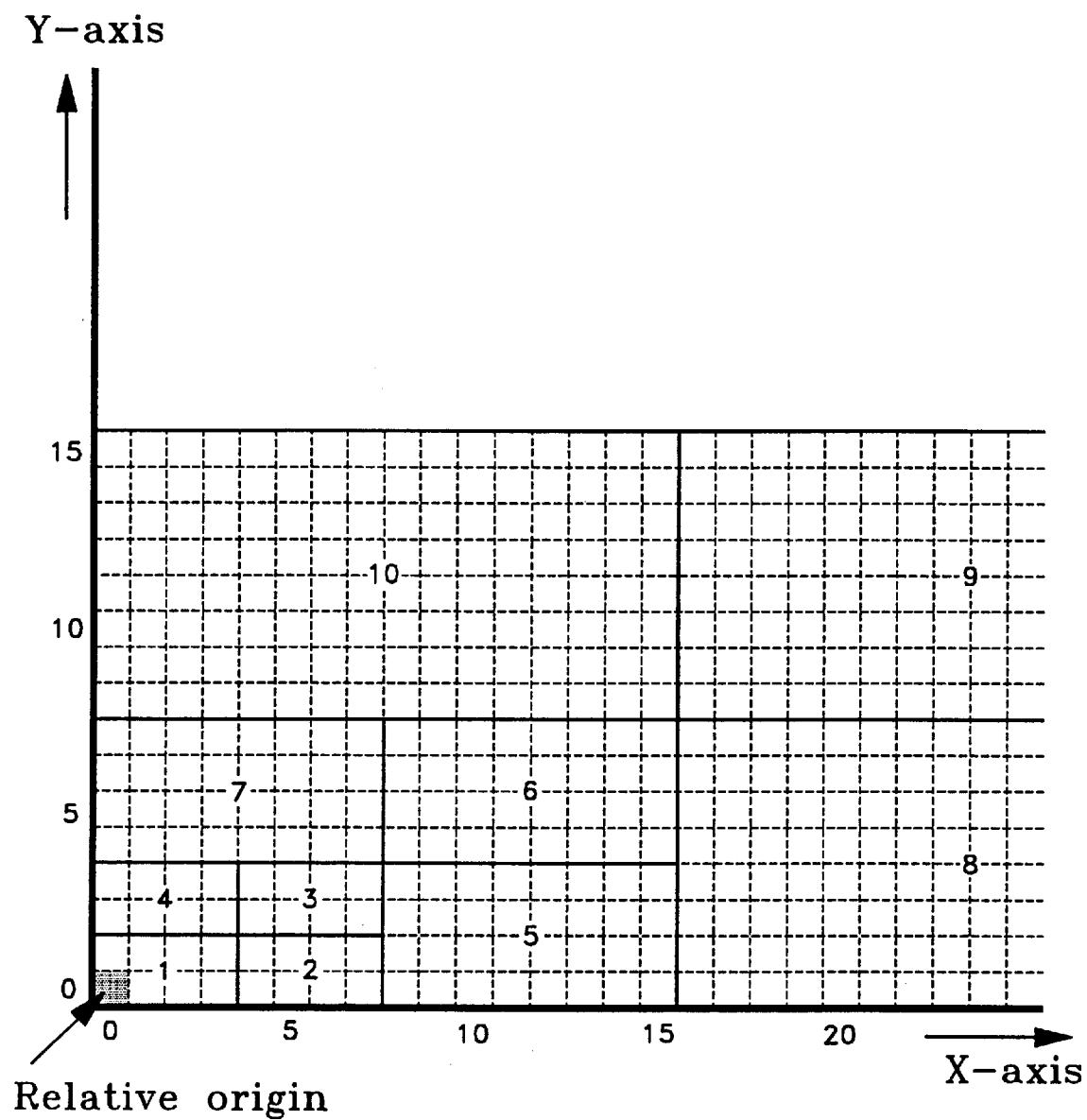
FIG. 32 is a plot illustrating another zone dividing method and another zone designation method of the fifth embodiment.
Figure 33:
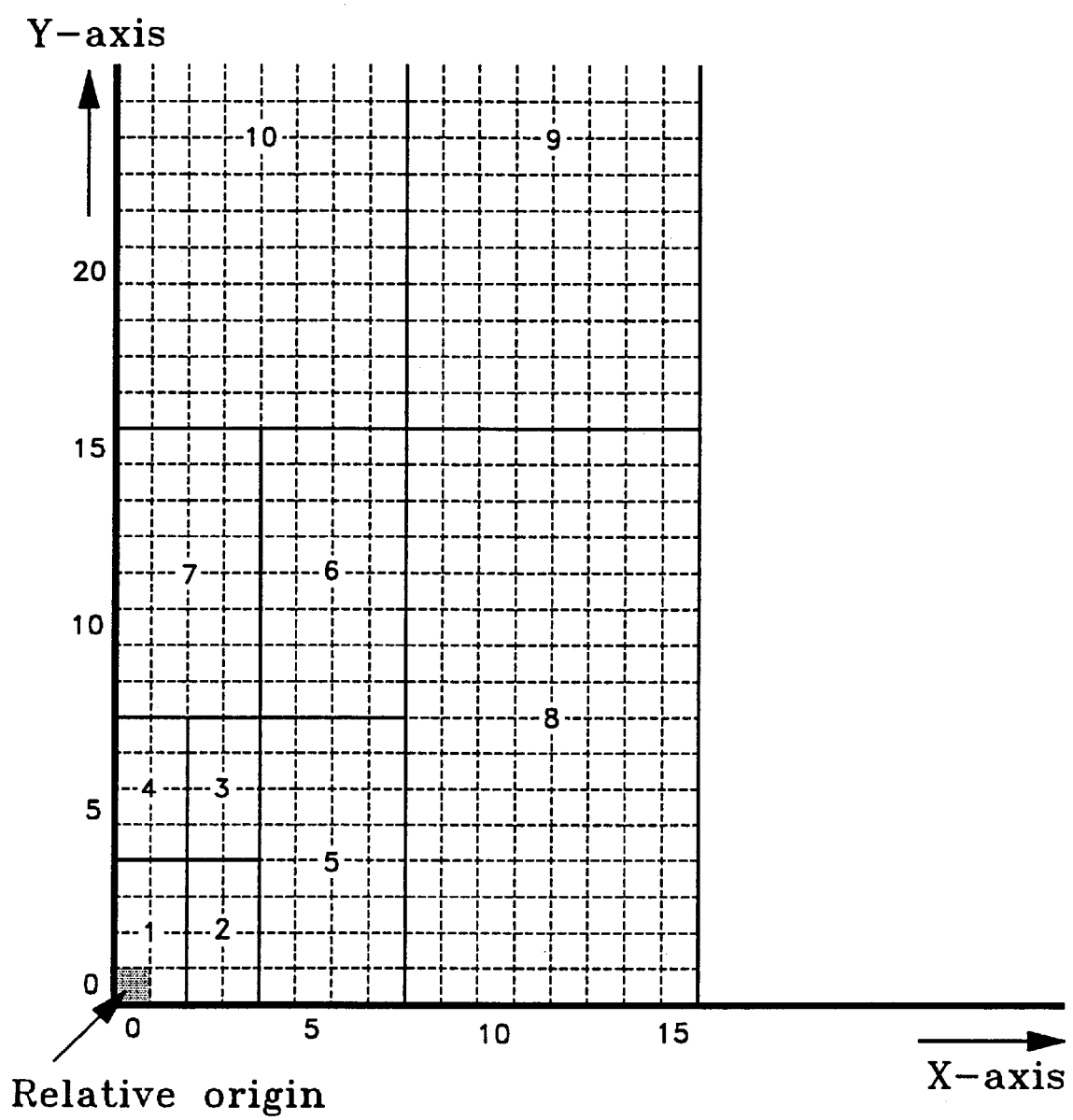
FIG. 33 is a plot illustrating another zone dividing method and another zone designation method of the fifth embodiment.

Neither the size of partition of the zone area or the size of the zone area defined for each of the zone dividing methods provided in FIGS. 32 and 33 is limited to the previous embodiment. A zone dividing method of any type may be usable so long as it is characterized by a zone area correspond to the feature of stroke information.

Encoding and decoding operations of a handwriting input apparatus of a sixth embodiment will be described.

First, encoding operations will be described. In the sixth embodiment, decoding operations are carried out in substantially the same way as in the fourth embodiment according to the flowchart provided in FIG. 21. In contrast to the fourth embodiment, the determination as to whether or not there is an overlap between draw areas of the sampled coordinates is not carried out in S505. The encoding of the inside-of-zone address carried out in S506 is changed, and a zone dividing method which is different from the methods used in the fourth and fifth embodiments is applied to the sixth embodiment. In short, the zone dividing method provided in FIG. 2 is applied to the fourth embodiment, whereas zone dividing methods provided in FIGS. 27, 31, 32, and 33 are applied to the fifth embodiment. In contrast, a zone dividing method 34 is used in the sixth embodiment.

Figure 34:
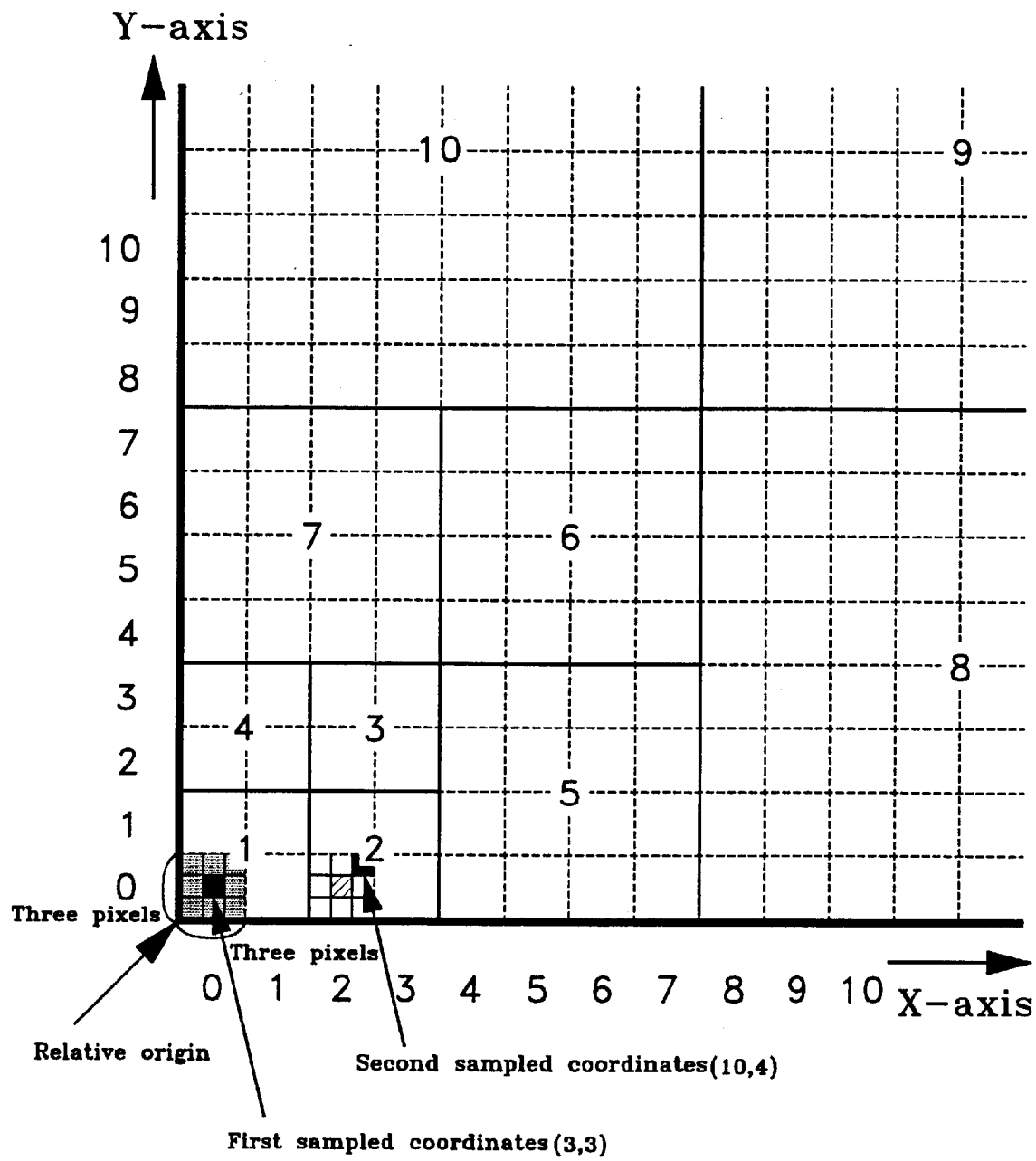
FIG. 34 is a plot illustrating another zone dividing method and another zone designation method of a sixth embodiment.

In the zone dividing method provided in FIG. 34, a plurality of pixels are used as a unit of one inside-of-zone address. As illustrated in FIG. 34, the pixels are 3×3 pixels. Mre specifically, one inside-of-zone address is assigned to a 3- by 3-pixel block. This zone dividing method is applied to information about a stroke having a 3- by 3-pixel line width.

Figure 28:
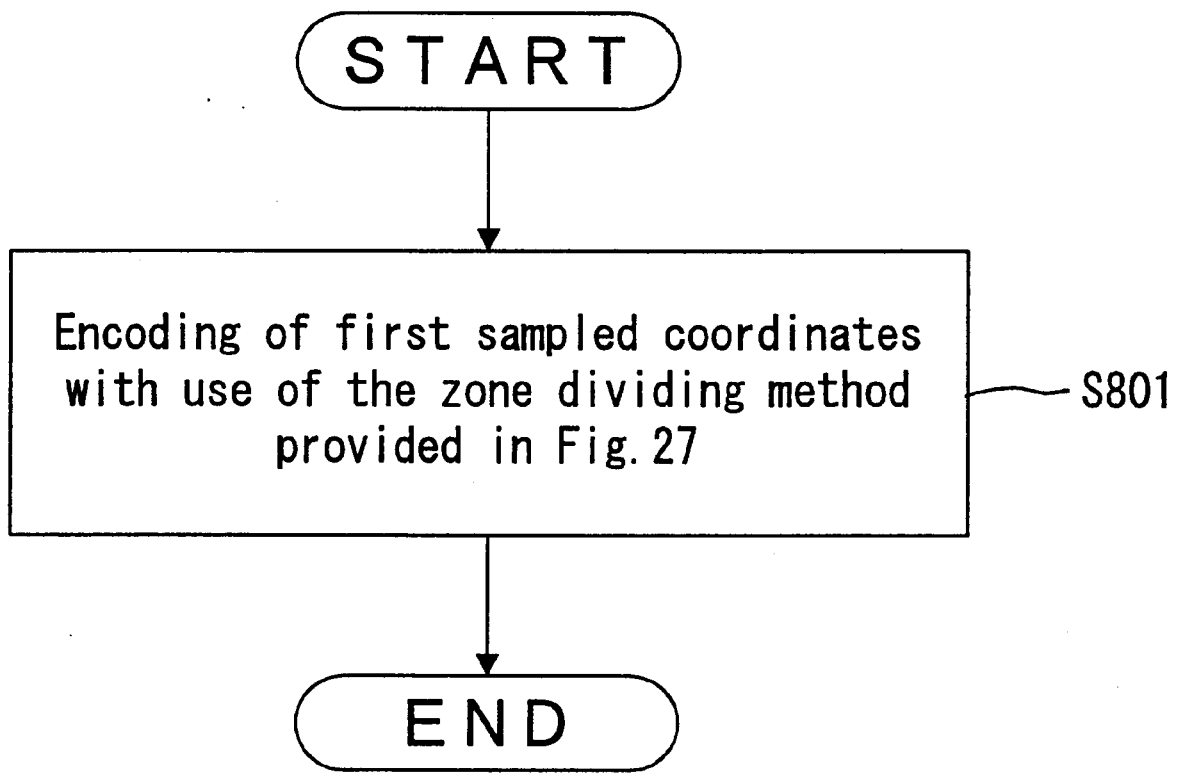
FIG. 28 is a flowchart illustrating a subroutine provided in FIG. 21.

The handwriting input apparatus of the sixth embodiment has the configuration as provided in FIG. 26. The zone dividing methods as provided in FIG. 34 are stored in the zone dividing method storage section 42. As in the fifth embodiment, the flowchart as provided in FIG. 28 is applied to the sixth embodiment, whereas the zone dividing method as provided in FIG. 34 is applied to the handwriting input apparatus of the present embodiment.

A specific encoding method will be described.

Figure 35:
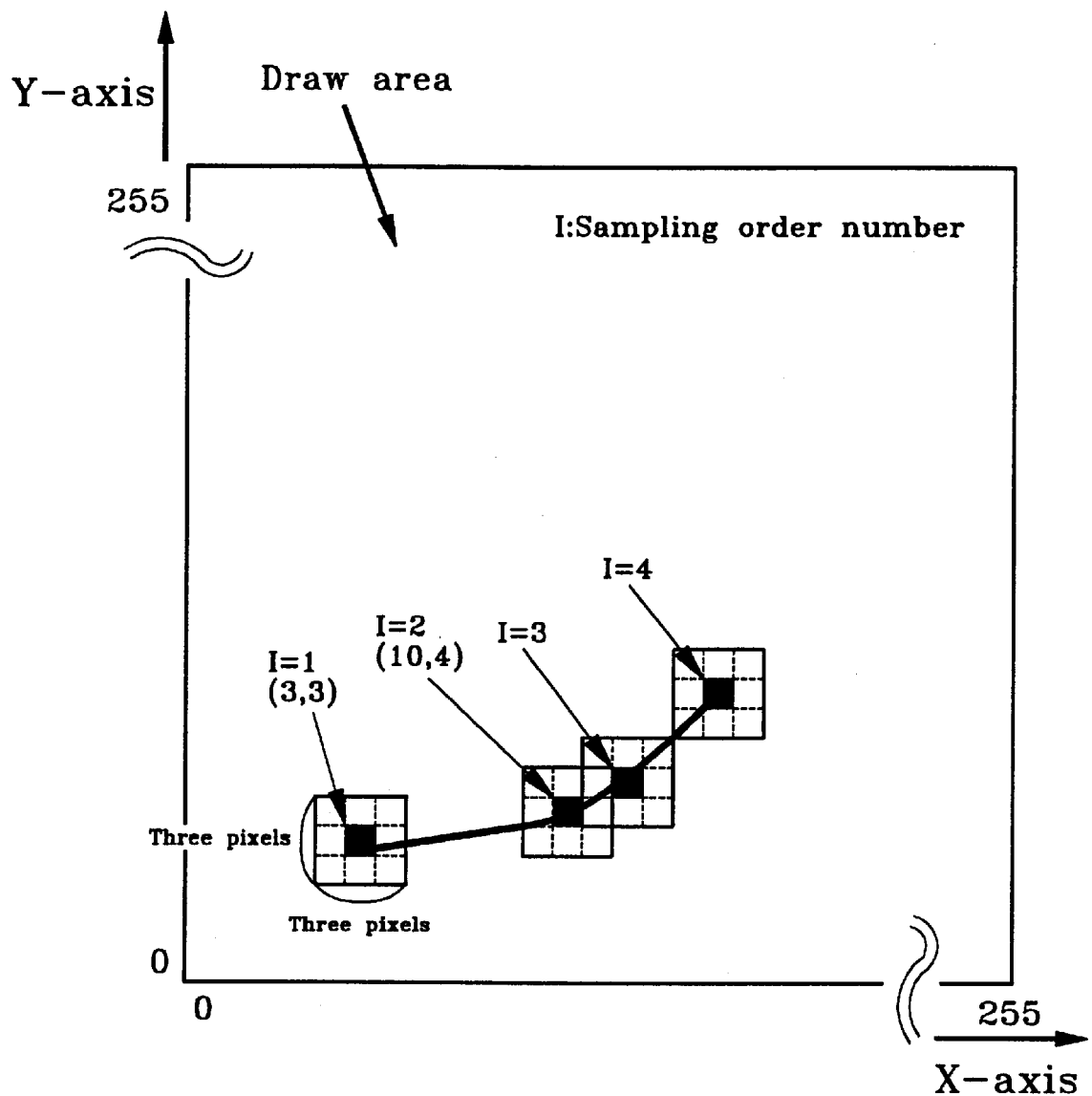
FIG. 35 is a plot for explaining encoding operations performed by a handwriting input apparatus of the sixth embodiment.

For instance, as illustrated in FIG. 35, provided that the first sampled coordinates are (3, 3) and the second sampled coordinates are (10, 4), the second sampled coordinates are (7, 1) with respect to the first sampled coordinates which act as the relative origin, according to the zone dividing method as provided in FIG. 2. The second sampled coordinates are positioned in the first quadrant with respect to the relative origin, and the zone number of the second sampled coordinates becomes five. Therefore, the difference between the quadrant number of the first sampled coordinates and the quadrant number of the second sampled coordinates is zero, and the difference between the zone number of the first sampled coordinates and the zone number of the second sampled coordinates is four. Therefore, according to the table provided in FIG. 3, the zone code of the second sampled coordinates is (100010). The inside-of-zone address of the second coordinates is (3, 1), and hence the inside-of-zone address code of the second coordinates is (1101). The code data of the second sampled coordinates is (1000101101).

According to the zone dividing method of the sixth embodiment, the relative origin is placed at the center of the address of the zone (1, 1) with zone number 1. In other words, the relative origin is placed at the center pixel of the 3- by 3-pixel block in zone number 1 provided in FIG. 34. In FIG. 34, a black-painted square corresponds to the relative origin. Coordinates (7, 1) are calculated with respect to the relative origin, whereby the coordinates are positioned in (2, 2) of the 3- by 3-pixel block at an address of (0, 0) in zone number 2.

As a result, the second sampled coordinates are positioned in the first quadrant with respect to the first sampled coordinates, and the zone number of the second sampled coordinates is two. The difference between the quadrant number of the first sampled coordinates and the quadrant number of the second sampled coordinates is zero, and the difference between the zone number of the first sampled coordinates and the zone number of the second sampled coordinates is one. Consequently, the encoded data of the second sampled coordinates is (1011), and the inside-of-zone address of the same becomes (0, 0). Therefore, the encoded data of the second sampled coordinates becomes (101100) in the sixth embodiment.

Next, decoding operations of the handwriting input apparatus of the sixth embodiment will be described. In the sixth embodiment, decoding operations are carried out in substantially the same way as in the fourth embodiment according to the flowchart provided in FIG. 25. In short, if the encoded data is sampled coordinates, it is checked whether the encoded data is the first sampled coordinates or the second or later sampled coordinates. If the encoded data has been determined to be the first sampled coordinates, the absolute values of the first sampled coordinates will be decoded. In contrast, if the encoded data has been determined to be the second or later sampled coordinates, the zone code and inside-of-zone address of the second or later sampled coordinates are analyzed and decoded.

When the second sampled coordinates are decoded, it is seen that the second coordinates are positioned in zone number 2 within the first quadrant with respect to the first sampled coordinates and have an inside-of-zone address (0, 0), as a result of analysis of the zone code and inside-of-zone address of the second sampled coordinates. More detailed sampled coordinates are not decoded, and hence the data on the coordinates of the center of the 3- by 3-pixel block corresponding to the inside-of-zone address, is sent to a display section 20. More specifically, with regard to the second sampled coordinates, the hatched coordinates which have zone number 2 and are positioned in an inside-of-zone address of (0, 0), are sent to the display section 20. The black square coordinates with zone number 1 are the relative origin with respect to the hatched coordinates, and hence coordinates (9, 3) are sent to the display section 20. The display section 20 displays unit coordinates centered at the received coordinates. In short, with reference to FIG. 34, nine pixels corresponding to the coordinates at an address of (0, 0) with zone 2 are displayed in black.

According to the stroke information encoding method of the sixth embodiment, sampled coordinates are encoded using a zone area whose unit of inside-of-zone address corresponds to the line width of a stroke as provided in FIG.

34. Hence, the amount of encoded data can be reduced. In short, one inside-of-zone address is assigned to 3- by 3-pixel block, and hence sampled coordinates are prevented from escaping from the zone area.

In the foregoing example, one inside-of-zone address is assigned to a 3- by 3-pixel block, and the unit of the inside-of-zone address is equivalent to the line width of the stroke. In short, where information about a stroke having a 5- by 5-pixel stroke is encoded, the unit of inside-of-zone address is set to 5×5 pixels. One inside-of-zone address is assigned to a 5- by 5-pixel block. In contrast, it is not necessary to set the unit of inside-of-zone address so as to equal the line width of the stroke.

Sampled coordinates are processed so as to be placed at the center of the inside-of-zone address when sampled coordinates are encoded or when encoded data is decoded in the sixth embodiment. However, the present invention is not limited to this example. For instance, if the relative origin may be placed at lower left coordinates at an address of (0, 0) in zone 1, or if the coordinates to be sent to the display section 20 are used as lower left coordinates in the 3×3 pixels at the corresponding address, the display section 20 may display 3×3 pixels, in black, with respect to which the coordinates are located lower left.

Figure 36:
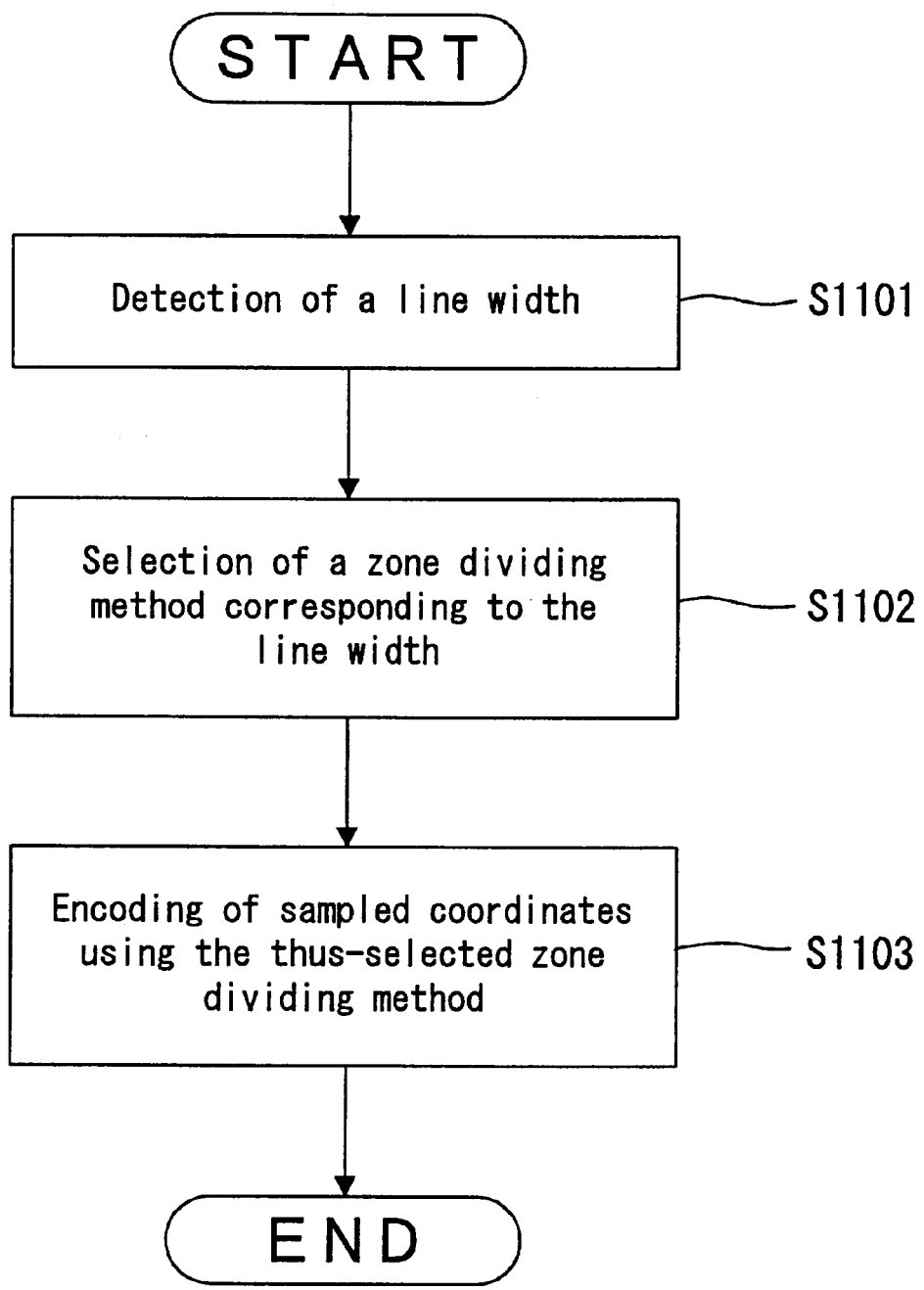
FIG. 36 is a flowchart illustrating the subroutine provided in FIG. 21.

In a case where information about a stroke including various line widths is encoded, it is possible to encode sampled coordinates using a zone dividing method which corresponds to the unit of inside-of-zone address selected according to the line width. The zone dividing method selection section 60 (see FIG. 26) selects the zone dividing method. As illustrated in FIG. 36, the zone dividing method selection section 60 operates in the way as designated by the subroutine of S506 provided in FIG. 21. A line width is detected (S1101), and a zone dividing method corresponding to the thus-selected line width (S1102). Sampled coordinates are encoded using the thus-selected zone dividing method (S1103). For example, as the line width increases, a zone dividing method having a larger number of pixels corresponding to one inside-of-zone address is employed. In this case, the zone dividing method used in encoding the sampled coordinates is written into the header of the data sequence.

Although the sixth embodiment has been described with reference to the case where the number of pixels corresponding to one inside-of-zone address is selected according to the line width, the method of the sixth embodiment may also be applied to a case where the distance between the sampled coordinates to be encoded and the sampled coordinates that become the relative origin of the sampled coordinates to be encoded, is long. More specifically, even if the line width of the stroke is 1×1 pixels, the method of the sixth embodiment will be employed in a case where the distance is long. In short, a zone dividing method corresponding to the distance is selected, and sampled coordinates are encoded using the thus-selected zone dividing method. As the distance increases, a zone dividing method having a larger number of pixels corresponding to one inside-of-address is used.

In this case, if data on certain coordinates is sent to the display section 20 during the decoding operations, the display section 20 displays only those coordinates. There is a risk of slight differences between actually-sampled coordinates and coordinates displayed on the display section. As a result, even if the line width of a stroke drawing is not thick, the amount of encoded data can be reduced by application of the method of the sixth embodiment to such a stroke drawing.

Although the present invention has been described with reference to the fourth to sixth embodiments, the present invention is not limited to these embodiments. Stroke information can be encoded using the previous embodiments in combination. For example, in the case of combination of the fourth and fifth embodiments, the number of pixels included in a zone area and the size of partition of the zone area are increased. Further, with regard to certain sampled coordinates, if there is an overlap between the draw area of the certain sampled coordinates and the draw area of the coordinates immediately before the certain sampled coordinates, the certain sampled coordinates will not be encoded. In the case of combination of the fourth and sixth embodiments, the unit of inside-of-zone address corresponding to the line width of a stroke is used. If there is an overlap between certain sampled coordinates and the coordinates immediately before the certain sampled coordinates, the certain coordinates will not be encoded.

Although sampled coordinates are represented by the absolute coordinates in the previous embodiments, the sampled coordinates may be relative coordinates with respect to certain coordinates. Further, zones provided in the zone code table provided in FIG. 9 are numbered only from one to seven. However, the number of zones is not limited to seven. Further, the zone code table provided in FIG. 9 is used in encoding stroke information in the first through third embodiments. However, another zone code table may be used instead of it. Similarly, the zone code table provided in FIG. 3 is used in encoding stroke information in the fourth through sixth embodiment. As a matter of course, another zone code table may be used instead of it.

A plurality of items of attribute code data may be provided in the header of one-stroke drawing code data. More specifically, as illustrated in FIG. 11, code data sequences of a plurality of strokes are sequentially arranged, and data from X1 to PL1 follows PL1 data of the previous stroke. In such a case, the attribute code data of the strokes are collectively stored as the attribute code data of the header. Parameters common to the one-stroke drawing code data may be stored in a header provided at the leading end of the code data sequence. More specifically, data on forecasting methods used in forecasting coordinates is stored in the header provided at the front end of the code data sequence.

The I-th sampled coordinates are encoded using the difference between the coordinates sampled immediately before the I-th sampled coordinates or the I-1th sampled coordinates and the I-th sampled coordinates, in the fourth through sixth embodiments. However, as in the first through third embodiments, the difference between actually-sampled coordinates and the forecast coordinates of the I-th sampled coordinates may be encoded.

Figure 21:
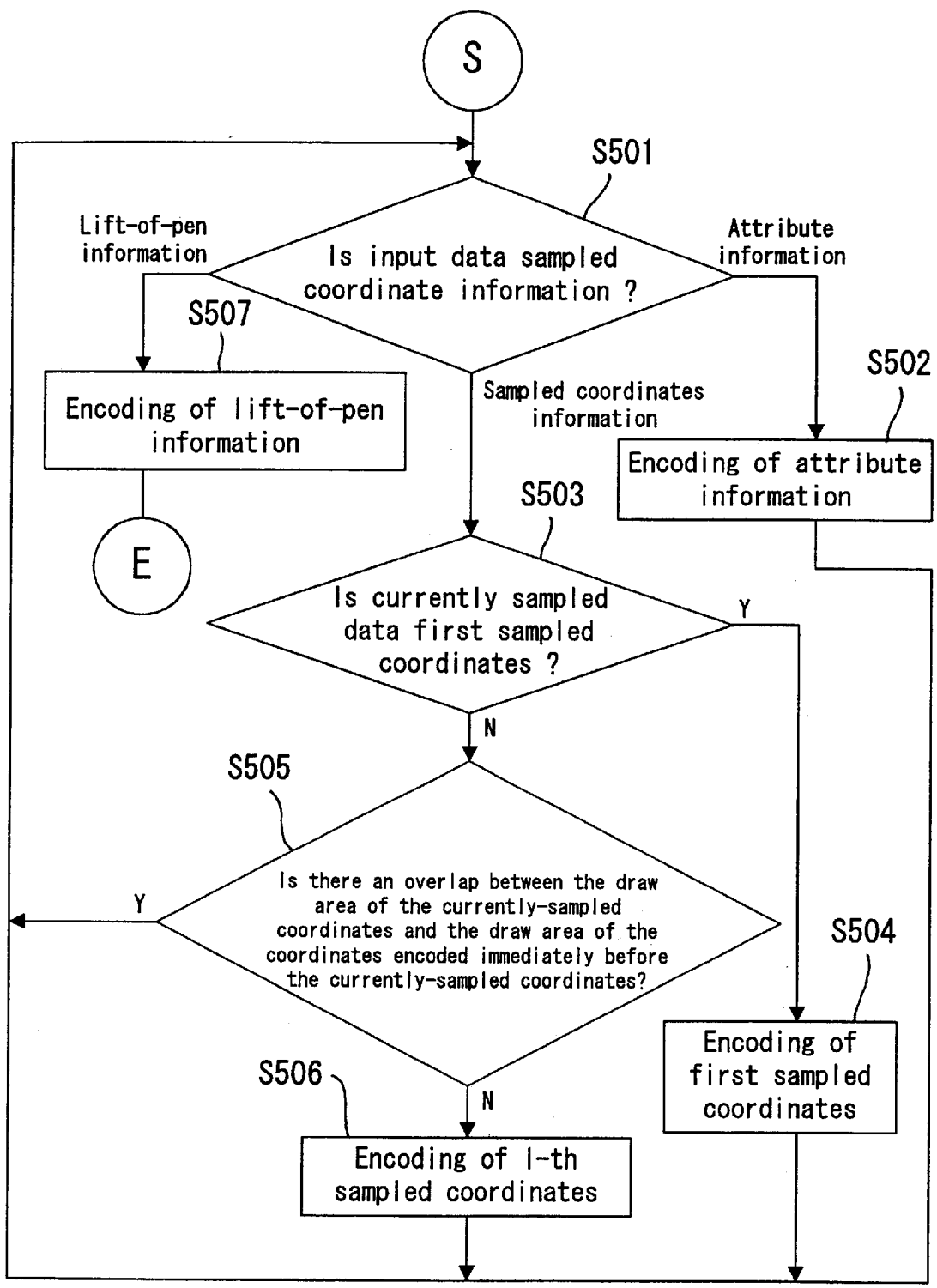
FIG. 21 is a flowchart for explaining the encoding operations performed by the handwriting input apparatus of the fourth embodiment.

For example, in the case of combination of the first through third embodiments and the fourth embodiments, the I-th sampled coordinates are forecast as illustrated in FIG. 7 during the encoding of the I-sampled coordinates in S506 provided in FIG. 21. Then, the differences between the forecast coordinates and actually-sampled coordinates is encoded. Further, in the case of the combination of the first through third embodiments and the fifth and sixth embodiments, as shown in FIG. 7, the I-th sampled coordinates are forecast during the course of encoding of the I-th sampled coordinates according to the flowchart provided in FIG. 28 which designates the subroutine of S506 in FIG. 21. The difference between the forecast coordinates and actually-sampled coordinates is encoded.

The sampled coordinates are positioned at the center of their draw area. However, the sample coordinates may be positioned upper right or lower left in their draw area. The processing performed by the main control section 50 may be implemented via software or hardware.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to the persons skilled in the art.

What is claimed is:

1. A handwriting stroke information encoder for encoding handwriting stroke information by sampling it, the encoder comprising:

a processor which forecasts sampled coordinates to be encoded using one or a plurality of previously-sampled coordinates; and an encoder which encodes the differences between the forecast coordinates and sampled coordinates of an actual input point, wherein the processor calculates the forecast coordinates from a plurality of sampled coordinates in front of sampled coordinates to be encoded, wherein the processor calculates the forecast coordinates from coordinates sampled before sampled coordinates to be encoded, coordinates sampled prior to the previously-sampled coordinates, and coordinates sampled before two previously-sampled coordinates, wherein the processor calculates the forecast coordinates from vectors connecting together adjacent sampled coordinates of a plurality of sampled coordinates provided in front of sampled coordinates to be encoded, according to the angles formed between the vectors, and wherein the processor calculates an angle formed between vector A connecting previously-sampled coordinates and coordinates sampled before the previously-sampled coordinates and vector B connecting the coordinates sampled before the previously-sampled coordinates and coordinates sampled before the two previously-sampled coordinates; and calculates the forecast coordinates on the assumption that they are positioned in line with the extension of vector at an angle φ with respect to vector A in the same direction in which the previously-sampled coordinates are positioned in line with vector A at the thus-calculated angle with respect to vector B.

2. The stroke information encoder as defined in claim 1, wherein the processor calculates, as the forecast coordinates, coordinates which are spaced away from the previously-sampled coordinates by the distance of the magnitude of the vector A.

3. The stroke information encoder as defined in claim 1, wherein the processor calculates, as the forecast coordinates, coordinates which are spaced away from the previously-sampled coordinates by the distance of a mean value between the magnitude of the vector A and the magnitude of the vector B.

4. A handwriting stroke information encoder handwriting stroke information by sampling it, the encoder comprising:

a processor which forecasts sampled coordinates to be encoded using one or a plurality of previously-sampled coordinates; and an encoder which encodes the differences between the forecast coordinates and sampled coordinates of an actual input point, wherein the processor calculates the forecast coordinates from a plurality of sampled coordinates in front of sampled coordinates to be encoded, wherein the processor calculates the forecast coordinates from coordinates sampled before sampled coordinates to be encoded, coordinates sampled prior to the previously-sampled coordinates, and coordinates sampled before two previously-sampled coordinates, wherein the processor calculates the forecast coordinates according to the magnitudes of vectors connecting together adjacent sampled coordinates of a plurality of sampled coordinates provided in front of sampled coordinates to be encoded, and wherein the processor calculates the distance between previously-sampled coordinates and the forecast coordinates from the magnitude of vector A connecting previously-sampled coordinates and coordinates sampled before the previously-sampled coordinates and the magnitude of vector B connecting the coordinates sampled before the previously-sample coordinates and coordinates sampled before the two previously-sampled coordinates, and calculates, as the forecast coordinates, coordinates which are positioned in line with the extension of vector A and are spaced the thus-calculated distance away from the previously-sampled coordinates.

5. The stroke information encoder as defined in claim 4, wherein the processor calculates a distance by multiplying the magnitude of vector A by a ratio of vector A to vector B.

6. A handwriting stroke information encoder for encoding handwriting stroke information by sampling it, the encoder comprising:

a processor which selects one or a plurality of sampled coordinates, whose encoding operations are omitted, from a plurality of sampled coordinates; and an encoder which encodes predetermined sampled coordinates according to the results of selection made by the processor, wherein the processor omits the encoding of the sampled coordinates even in a case there is a partial overlap between the draw area of sampled coordinates of interest and the draw area of coordinates most recently sampled before the coordinates.

7. A handwriting stroke information encoder for encoding handwriting stroke information by sampling it, the encoder comprising:

a processor which selects one or a plurality of sampled coordinates, whose encoding operations are omitted, from a plurality of sampled coordinates; and an encoder which encodes predetermined sampled coordinates according to the results of selection made by the processor, wherein the processor selects at least one sampled coordinate whose encoded operations are omitted, from a plurality of sampled coordinates whose draw areas overlap at least partially, and wherein the processor calculates an angle formed between vector connecting sampled coordinates to coordinates sampled immediately before the sampling of the coordinates, and vector connecting the sampled coordinates and the following sampled coordinates, and selects sampled coordinates, whose encoding operations are omitted, from the thus-calculated angle.

8. A handwriting stroke information encoder which encodes handwriting stroke information by sampling it, the encoder comprising:

memory for storing a plurality of different types of zone dividing methods and zone number designation methods;

a processor for selecting a zone dividing method and a zone designation method used in encoding sampled coordinates, from the plurality of types of zone dividing methods and zone number designation methods stored in the memory; and an encoder for encoding input sampled coordinates according to the zone dividing method and the zone number designation method selected by the processor, wherein the memory stores a plurality of zone dividing methods and zone number designation methods whose draw areas are different from each other in size in the X-axis direction, and the processor selects the zone dividing method and the zone number designation method according to the distance in the X-axis direction between sampled coordinates of input drawing data which are to be encoded and the sampled coordinates which become the relative origin.

9. A handwriting information encoder which encodes handwriting stroke information by sampling it, the encoder comprising:

memory for storing a plurality of different types of zone dividing methods and zone number designation methods;

a processor for selecting a zone dividing method and a zone designation method used in encoding sampled coordinates, from the plurality of types of zone dividing methods and zone number designation methods stored in the memory; and an encoder for encoding input sampled coordinates according to the zone dividing method and the zone number designation method selected by the processor, wherein the memory stores a plurality of zone dividing methods and zone number designation methods whose draw areas are different from each other in size in the Y-axis direction, and the processor selects the zone dividing method and the zone number designation method, according to the distance in the Y-axis direction between sampled coordinates to be encoded of input drawing data and the sampled coordinates which become the relative origin.

10. A stroke information encoder for sampling and encoding stroke information, comprising:

a processor which forecasts sampled coordinates to be encoded using one or a plurality of previously sampled coordinates, wherein the processor calculates, as the forecast coordinates, coordinates which are positioned in line with the extension of vector A connecting together previously-sampled coordinates and coordinates sampled before the previously-sampled coordinates and which re spaced away from the previously-sampled coordinates by the distance of a mean value between the magnitude of the vector A and the magnitude of vector B which connects together the coordinates sampled before the previously-sampled coordinates and the coordinates sampled before two previously-sampled coordinates; and an encoder which encodes the differences between the forecast coordinates and sampled coordinates of an actual input point.

* * * * *